US008630268B2

(12) United States Patent
Tamaki

(10) Patent No.: US 8,630,268 B2
(45) Date of Patent: Jan. 14, 2014

(54) DISTRIBUTED ANTENNA SYSTEM, DISTRIBUTED ANTENNA SWITCHING METHOD, BASE STATION APPARATUS AND ANTENNA SWITCHING DEVICE

(75) Inventor: Tsuyoshi Tamaki, Machida (JP)

(73) Assignee: Hitachi, Ltd., Tokyo (JP)

( * ) Notice: Subject to any disclaimer, the term of this patent is extended or adjusted under 35 U.S.C. 154(b) by 71 days.

(21) Appl. No.: 13/301,366

(22) Filed: Nov. 21, 2011

(65) Prior Publication Data

US 2012/0134279 A1    May 31, 2012

(30) Foreign Application Priority Data

Nov. 25, 2010    (JP) .................................. 2010-262378

(51) Int. Cl.
*H04W 4/00* (2009.01)
*H04B 7/10* (2006.01)

(52) U.S. Cl.
USPC ........ 370/334; 370/295; 370/339; 455/422.1; 455/522; 455/562.1; 455/277.2; 375/267; 375/299; 375/347

(58) Field of Classification Search
None
See application file for complete search history.

(56) References Cited

U.S. PATENT DOCUMENTS

| 6,308,085 | B1 | 10/2001 | Shoki | |
| 7,403,748 | B1* | 7/2008 | Keskitalo et al. | ............. 455/101 |
| 2006/0203709 | A1* | 9/2006 | Laroia et al. | .................. 370/208 |
| 2006/0223476 | A1* | 10/2006 | Song et al. | ................. 455/277.2 |
| 2007/0115801 | A1* | 5/2007 | Li et al. | .......................... 370/208 |
| 2008/0095263 | A1 | 4/2008 | Xu et al. | |
| 2010/0069122 | A1 | 3/2010 | Ito | |
| 2010/0103832 | A1 | 4/2010 | Zhou et al. | |
| 2011/0134848 | A1 | 6/2011 | Tamaki | |
| 2013/0129010 | A1* | 5/2013 | Xi et al. | ........................ 375/295 |

FOREIGN PATENT DOCUMENTS

| JP | 11-261474 | 9/1999 |
| JP | 2009-542164 A | 11/2009 |
| JP | 2010-068496 | 3/2010 |
| JP | 2010-537597 A | 12/2010 |
| WO | WO 2010/013751 A1 | 2/2010 |

OTHER PUBLICATIONS

Tamaki, Tsuyoshi, et al.; Downlink MIMO Systems Using Cooperation among Base Stations in a Slow Fading Channel; ICC 2007 proceedings; 6 pages.
[online] Retrieved from the Internet: <URL: http://www.jpo.go.jp/shiryou/s_sonota/hyoujun_gijutsu/mimo/1-1-1.pdf#p.=3; pp. 1-6.
[online] Retrieved from the Internet: <URL: http://www.jpo.go.jp/shiryou/s_sonota/hyoujun_gijutsu/mimo/1-2-2.pdf#p.=3; pp. 16-18.

* cited by examiner

*Primary Examiner* — Ian N Moore
*Assistant Examiner* — Eric P Smith
(74) *Attorney, Agent, or Firm* — Foley & Lardner LLP

(57) ABSTRACT

In a distributed antenna system in which plural antennas are dispersed spatially, a base station apparatus 102 collects the terminal throughput of the uplink and downlink communication, the number of simultaneous communication terminals, and the information on a radio propagation channel from a distributed antenna to a terminal antenna, and estimates the throughput in each communication mode from the number of simultaneous communication terminals and the radio propagation channel information, selects a communication mode by comparing the estimated throughput with a request value, connects the distributed antenna and the base station apparatus 102 in an antenna connection pattern in the selected communication mode, and switches the communication mode between the base station device and the terminal to continue the communication, when the terminal throughput is below the request value, or above the request value plus a certain threshold value.

26 Claims, 38 Drawing Sheets

UPLINK COMMUNICATION (WIDE AREA)
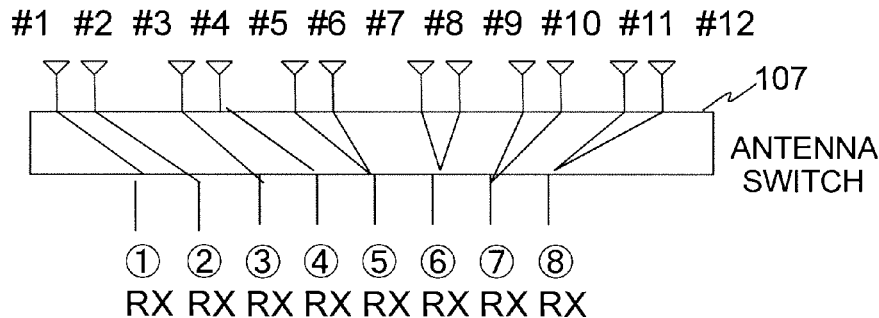
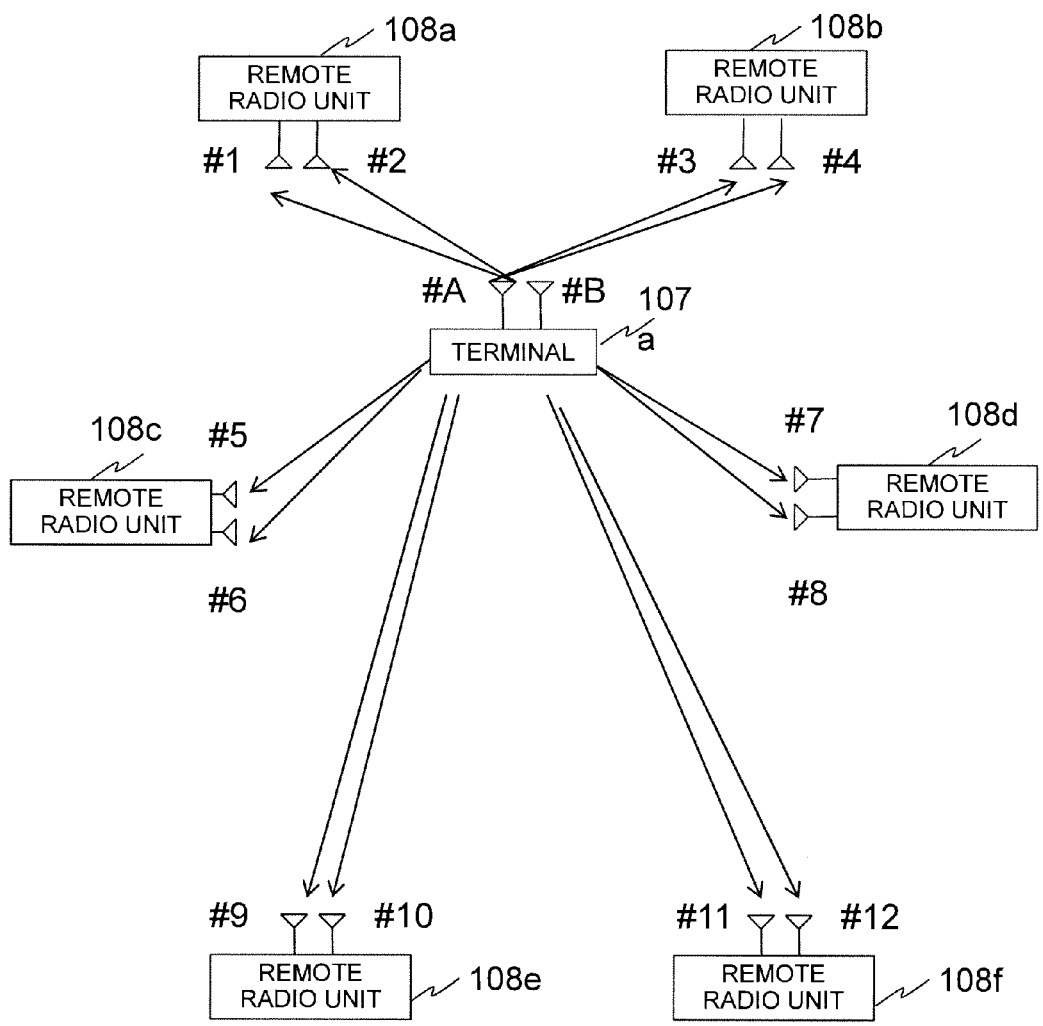
FIG.4

RELATIONSHIP BETWEEN COMMUNICATION MODE
AND THROUGHPUT

DOWNLINK THROUGHPUT OF TERMINAL 107A > 2Mbps (REQUEST VALUE)

|  | TERMINAL 107a | TERMINAL 107a+107b | TERMINAL 107a+107c | TERMINAL 107a+107b +107c |
|---|---|---|---|---|
| SIMULTANEOUS CONNECTION NUMBER | 1 | 2 | 2 | 3 |
| SU-SIMO | 5Mbps | - | - | - |
| SU-SIMO (TIME DIVISION) | - | 2.5Mbps | 2.5Mbps | 1.7Mbps |
| MU-SIMO (SIMULTANEOUS COMMUNICATION) |  | 3.0Mbps | 2.8Mbps | 1.5Mbps |
| SU-MIMO | 9.8Mbps | - | - | - |
| SU-SIMO (TIME DIVISION) | - | 4.9Mbps | 4.9Mbps | 3.3Mbps |
| MU-SIMO (SIMULTANEOUS COMMUNICATION) | - | 5.5Mbps | 5.4Mbps | 3.8Mbps |

FIG.9

(1) TERMINAL LIST INFORMATION 1208

| TERMINAL ID | NUMBER OF UPLINK COMMUNICATION BITS | NUMBER OF DOWNLINK COMMUNICATION BITS |
|---|---|---|
| 1001 | 100kbit | 5Mbit |
| 1002 | 240kbit | 2.5Mbit |
| 1005 | 155kbit | 1.3Mbit |

(2) SIMULTANEOUS COMMUNICATION TERMINAL INFORMATION 1209

| TERMINAL ID | UPLINK THROUGHPUT MEAN VALUE | UPLINK THROUGHPUT REQUEST VALUE | UPLINK UPDATE FLAG |
|---|---|---|---|
| 1001 | 100kbps | 128kbps | 1 1 1 1 |
| 1002 | 240kbps | 128kbps | 1 1 1 0 |
| 1003 | 50kbps | - (0) | 0 1 0 1 |
| 1004 | 60kbps | - (0) | 0 0 0 0 |
| 1005 | 155kbps | 128kbps | 1 0 0 0 |

NUMBER OF UPLINK SIMULTANEOUS COMMUNICATION TERMINALS =4

LATEST ---> OLD

| TERMINAL ID | DOWNLINK THROUGHPUT MEAN VALUE | DOWNLINK THROUGHPUT REQUEST VALUE | DOWNLINK UPDATE FLAG |
|---|---|---|---|
| 1001 | 5Mbps | 2Mbps | 1 1 1 1 |
| 1002 | 2.5Mbps | 2Mbps | 1 1 1 0 |
| 1003 | 1.1Mbps | - (0) | 0 0 0 0 |
| 1004 | 0.8Mbps | - (0) | 0 0 0 0 |
| 1005 | 1.3Mbps | 2Mbps | 1 0 0 0 |

NUMBER OF DOWNLINK SIMULTANEOUS COMMUNICATION TERMINALS =3

FIG.14

DATABASE STRUCTURE OF CHANNEL INFORMATION (1) TERMINAL CSI INFORMATION (CHANNEL STATE INFORMATION)
FOR EACH OF UPLINK AND DOWNLINK

| ANTENNA SW OUTPUT PORT | REMOTE RADIO UNIT ANTENNA | TERMINAL 107a | TERMINAL 107b | TERMINAL 107c |
|---|---|---|---|---|
| #1 | 106a1 | h1a,h1b | h1c,h1d | h1e,h1f |
| #2 | 106a2 | h2a,h2b | h2c,h2d | h2e,h2f |
| #3 | 106b1 | h3a,h3b | H3c,h3d | H3e,h3f |
| #4 | 106b2 | h4a,h4b | h4c,h4d | h4e,h4f |
| #5 | 106c1 | h5a,h5b | h5c,h5d | h5e,h5f |
| #6 | 106c2 | h6a,h6b | h6c,h6d | h6e,h6f |
| #7 | 106d1 | h7a,h7b | h7c,h7d | h7e,h7f |
| #8 | 106d2 | h8a,h8b | h8c,h8d | h8e,h8f |
| #9 | 106e1 | h9a,h9b | h9c,h9d | h9e,h9f |
| #10 | 106e2 | H10a,h10b | h10c,h10d | h10e,h10f |
| #11 | 106f1 | h11a,h11b | h11c,h11d | h11e,h11f |
| #12 | 106f2 | h12a,h12b | h12c,h12d | h12e,h12f |

FIG.18

THROUGHPUT ESTIMATION METHOD FROM SU-SIMO

|  | TERMINAL 107a | TERMINAL 107a+107b | TERMINAL 107a+107c | TERMINAL 107a+107b +107c |
|---|---|---|---|---|
| SIMULTANEOUS CONNECTION TERMINAL NUMBER | 1 | 2 | 2 | 3 |
| SU-SIMO | X(=5) Mbps | - | - | - |
| SU-SIMO (TIME DIVISION) | - | (X/2) Mbps | (X/2) Mbps | (X/3) Mbps |
| MU-SIMO (SIMULTANEOUS COMMUNICATION) |  | X*a Mbps | X*b Mbps | X*c Mbps |
| SU-MIMO | NX (N=2) Mbps | - | - | - |
| SU-MIMO (TIME DIVISION) | - | (NX/2) Mbps | (NX/2) Mbps | (NX/3) Mbps |
| MU-MIMO (SIMULTANEOUS COMMUNICATION) |  | NX*d Mbps | NX*e Mbps | NX*f Mbps |

FIG.19

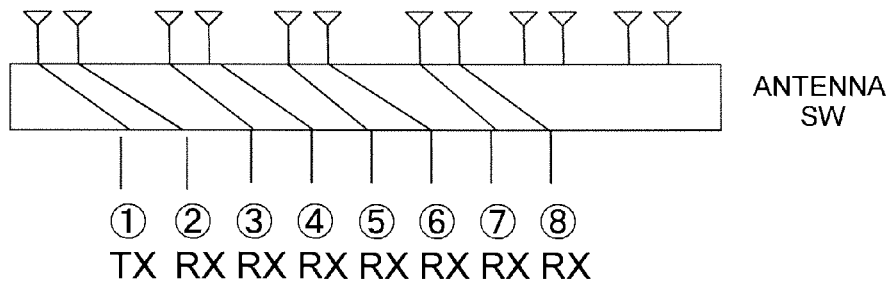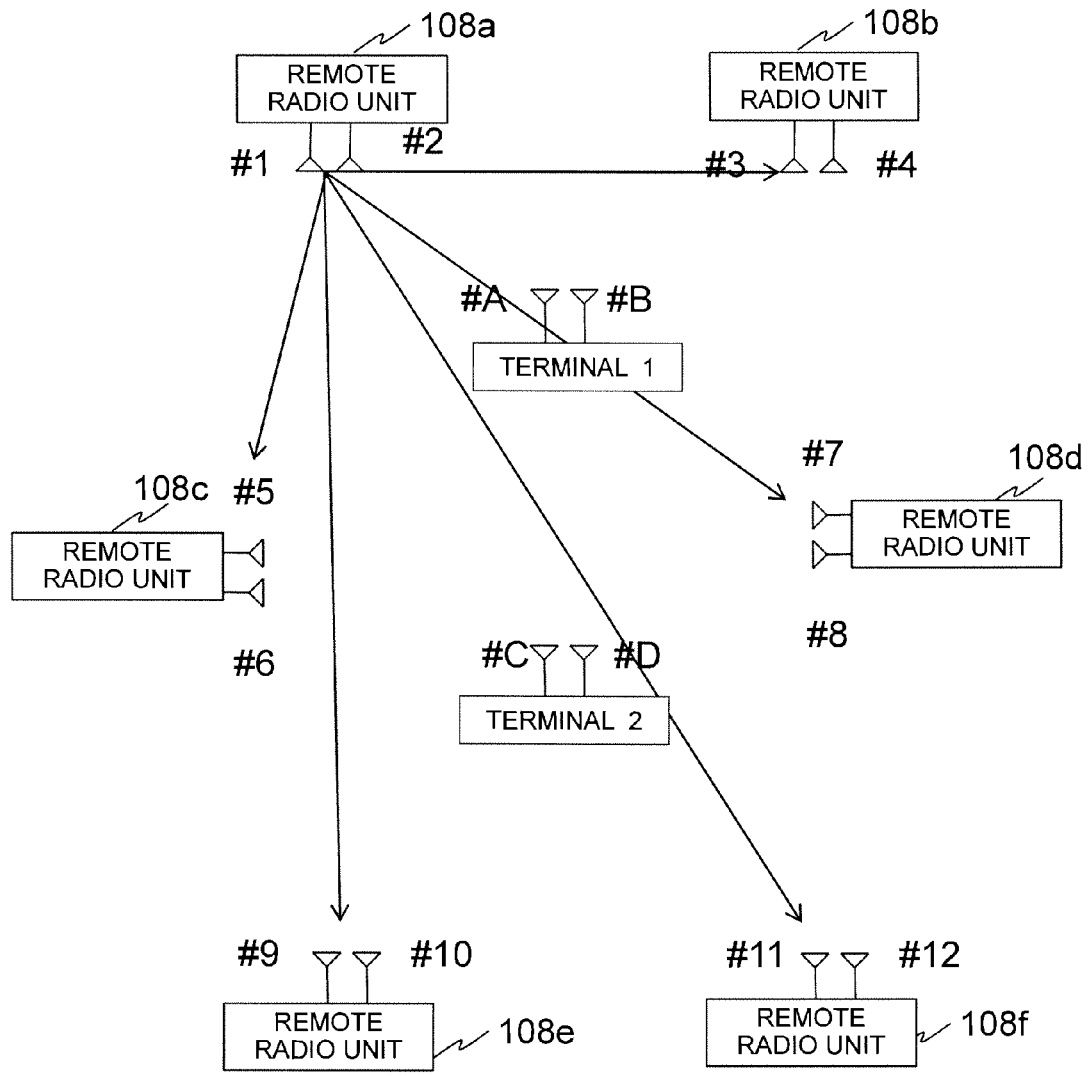
FIG.21

DATABASE STRUCTURE OF CHANNEL INFORMATION (2) CHANNEL INFORMATION (CSI, OR RECEIVED POWER)
BETWEEN REMOTE RADIO UNIT ANTENNAS

| ANTENNA SW OUTPUT PORT | REMOTE RADIO UNIT ANTENNA | #1 | #2 | #3 | #4 | ·· |
|---|---|---|---|---|---|---|
| #1 | 106a1 | - | h1,2 | h1,3 | h1,4 | ·· |
| #2 | 106a2 | h2,1 | - | h2,3 | h2,4 | |
| #3 | 106b1 | h3,1 | h3,2 | - | h3,4 | |
| #4 | 106b2 | h4,1 | h4,2 | h4,3 | - | |
| #5 | 106c1 | h5,1 | h5,2 | h5,3 | h5,4 | |
| #6 | 106c2 | h6,1 | h6,2 | h6,3 | h6,4 | |
| #7 | 106d1 | h7,1 | h7,2 | h7,3 | h7,4 | |
| #8 | 106d2 | h8,1 | h8,2 | h8,3 | h8,4 | |
| #9 | 106e1 | h9,1 | h9,2 | h9,3 | h9,4 | |
| #10 | 106e2 | h10,1 | h10,2 | H10,3 | H10,4 | |
| #11 | 106f1 | h11,1 | h11,2 | h11,3 | h11,4 | |
| #12 | 106f2 | h12,1 | h12,2 | h12,3 | h12,4 | |

ANTENNA CLUSTER A = #1,#2,#3,#4

ANTENNA CLUSTER B = #2,#3,#4

ANTENNA CLUSTER C = #3,#4

FIG.23

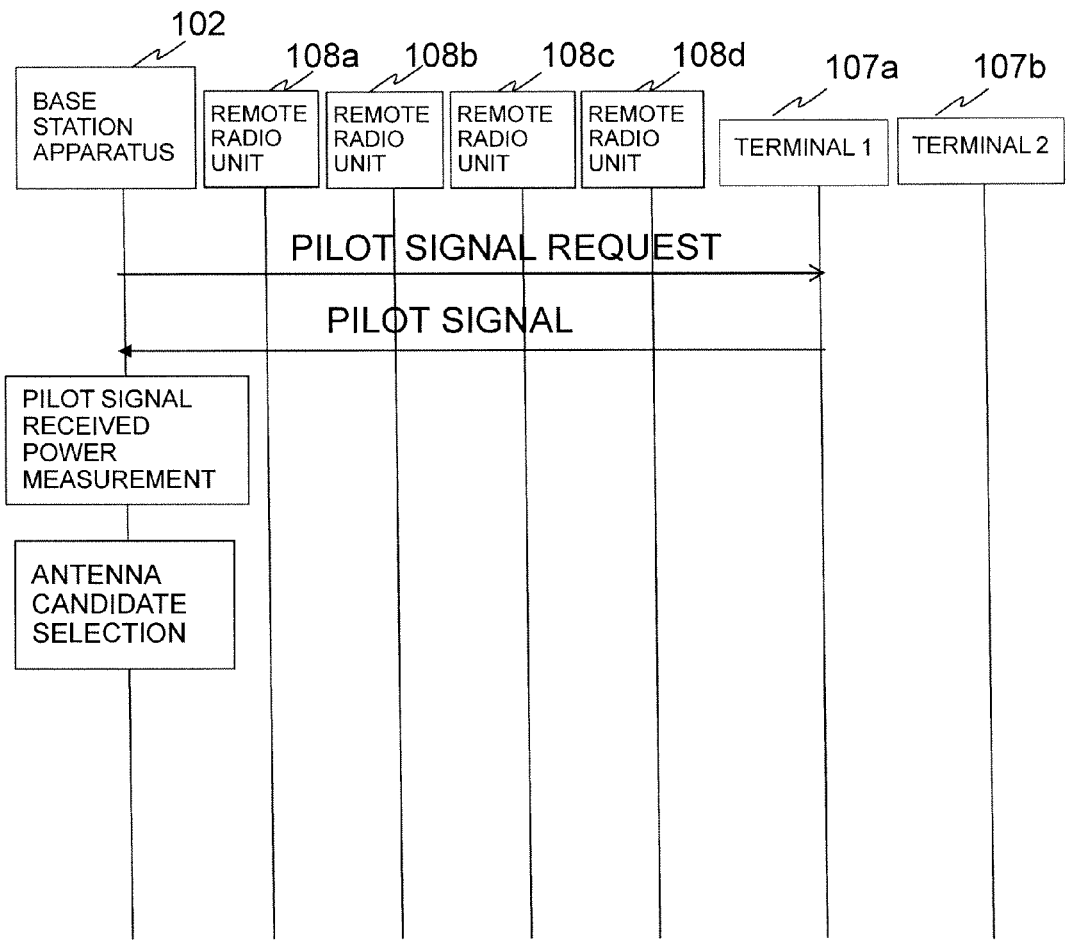
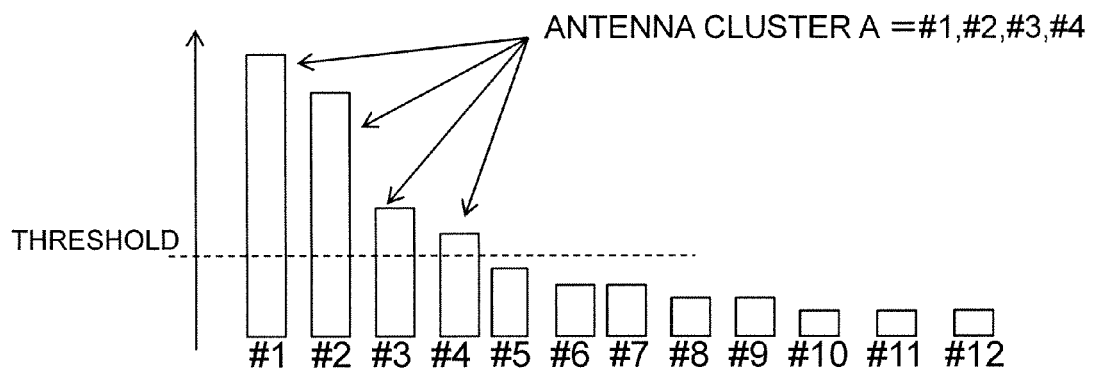
FIG.25

ANTENNA CLUSTER INFORMATION
OF BASE STATION APPARATUS

| ANTENNA CLUSTER | ANTENNA | ANTENNA | ANTENNA | ANTENNA | TERMINAL |
|---|---|---|---|---|---|
| A | #1 | #2 | #3 | #4 | 107a |
| B | #2 | #3 | #4 | - | 107b |
| C | #3 | #4 | #5 | #6 | - |
| D | #4 | #5 | #7 | #8 | - |

FIG.37

DISTRIBUTED ANTENNA SYSTEM, DISTRIBUTED ANTENNA SWITCHING METHOD, BASE STATION APPARATUS AND ANTENNA SWITCHING DEVICE

CLAIM OF PRIORITY

The present application claims priority from Japanese patent application JP 2010-262378 filed on Nov. 25, 2010, the content of which is hereby incorporated by reference into this application.

BACKGROUND OF THE INVENTION (i) Field of the Invention

The present invention relates to a distributed antenna system, a distributed antenna switching method, a base station apparatus and an antenna switching device, and more particularly to a distributed antenna system, a distributed antenna switching method, a base station apparatus and an antenna switching device for making the communication using an optimal antenna efficiently in accordance with a traffic situation in a radio communication system in which a number of antennas are geographically distributed.

(ii) Description of the Related Art

In a radio communication system represented by a portable telephone, with the emergence of a smart phone, there has been a growing demand for higher speed communications in the data communication system, providing the high speed radio infrastructure for a Long Term Evolution (LTE) method or Worldwide Interoperability for Microwave Access (WiMAX) method that is the next generation high speed radio communication method. In the conventional portable telephone system, a macro cell method for covering the wide area with one base station apparatus is adopted. To improve the radio environment inside the building to which the electric wave is difficult to reach in a macro cell, a Distributed Antenna System (DAS) for distributing the antennas inside the building is well known. In the conventional distributed antenna system, a method for routing a leakage coaxial cable from the base station apparatus to radiate the electric wave around the cable laid down is well known. Also, a method for distributing an analog transmission signal inputted or outputted by the base station apparatus via a device for multipoint connection to plural antennas along the coaxial cable is well known. In the conventional distributed antenna system, the input/output signal of the base station apparatus is distributed to plural antennas, whereby the same signal is inputted or outputted from all the antennas.

Recently, in a high speed radio communication method such as LTE or WiMAX as above described, a Multiple Input Multiple Output (MIMO) technology in which the data is transmitted from plural antennas and received at the plural antennas has been adopted from the viewpoint of improving the frequency use efficiency. With this MIMO technology, it is required to transmit or receive different signals from the plural antennas, thereby to transmit or receive different signals from the plural antennas in the distributed antenna system.

As the background art in applying the MIMO technology to the distributed antenna system, there is JP-A-2010-068496 (patent document 1). This document discloses that "a power measuring part of the terminal measures the received power of a pilot signal transmitted from each antenna of the distributed antenna system for a long term. The terminal selects a predetermined number of antennas having strong received power as the communication antenna candidates and notifies the communication antenna candidates and the corresponding received powers to the radio base station apparatus. A channel estimation part of the terminal receives the communicable antenna and its granted antenna index information from the radio base station apparatus, and makes the channel estimation for the communicable antenna. To make the MIMO communication, it is required to decide a precoding matrix for making an operation on a send signal of the base station apparatus, whereby a precoding matrix index (PMI) of the communicable antenna is obtained based on the channel estimation of the terminal, and notified by communication to the radio base station apparatus using the antenna index information to control the phase rotation amount, the power ratio and so on for each antenna making the data communication."

In applying the distributed antenna system to a macro cellular system, it may be possible to make the communication simultaneously between the antennas geographically dispersed over the wide area because of small mutual interference amount. JP-A-11-261474 (patent document 2) discloses a technique for measuring the coupling amount between the antennas in the distributed antenna system, and allowing the antennas having small mutual interference amount to communicate simultaneously on the same frequency channel to improve the repeated frequency use efficiency.

Also, in the MIMO communication, for accommodating plural users, there are a method for making the MIMO communication in one time slot with the Time Division Multiple Access (TDMA) by making the time division of the time slot for the terminal, and a method for making the multi-user MIMO communication for enabling the simultaneous communication among plural users simultaneously, whereby the examination result of each communication capacity is disclosed in non-patent document 1.

PRIOR TECHNICAL DOCUMENTS

Patent Documents

[Patent document 1] JP-A-2010-068496
[Patent document 2] JP-A-11-261474

Non-patent Documents

[Non-patent document 1] T. Tamaki, Kibeom Seong, Cioffi, J. M, "Downlink MIMO Systems Utilizing Cooperation among Base Stations in a Slow Fading Channel", in Proceedings of IEEE International Conference on ICC2007, June 2007, pp. 4728-4733.
[Non-patent document 2] http://www.jpo.go.jp/shiryou/s_sonota/hyoujun_gijutsu/mimo/1-1-1.pdf#page=3
[Non-patent document 3] http://www.jpo.go.jp/shiryou/s_sonota/hyoujun_gijutsu/mimo/1-2-2.pdf#page=3

SUMMARY OF THE INVENTION

The distributed antenna system has a merit that once the wiring between the antenna and the base station apparatus is laid, both the communication method of old generation and the communication method of new generation can be supported even when the radio standard is changed to a new standard.

In the MIMO communication, patent document 1 discloses a technology for applying the MIMO communication technology in the communication method of new generation called an LTE standard to the distributed antenna system, in which the terminal supporting the MIMO communication is presupposed.

There is no consideration for cases where the terminal not supporting the MIMO of current generation or the inexpensive terminal not supporting the MIMO communication is under the command of the distributed antenna system.

Since the terminal of current generation makes the Single Input Multiple Output (SIMO) communication based on the diversity reception with one transmitting antenna and two receiving antennas in most cases, it is required to switch between the SIMO communication and the MIMO communication.

Also, in the case where the terminal supporting the MIMO communication has a small required throughput, the SIMO communication is made using the antenna near the terminal in the distributed antenna system, even though the MIMO communication is not made, whereby the enough throughput may be attained in some cases owing to strong received power. Therefore, it is not required in some cases to always make the MIMO communication. For the MIMO communication, when the radio information between the base station apparatus and the terminal is fed back, the radio resources are used wastefully.

Conversely, when the number of simultaneous communication terminals increases during the SIMO communication, the requested throughput may not be satisfied in some cases, because the throughput is degraded, whereby the MIMO communication may be required in some cases.

In patent document 2, there is disclosed a method in which plural terminals residing at the antenna with less coupling amount between the antennas make the simultaneous communication. However, even in a site having the great coupling amount between the antennas, a multi-user MIMO process can be performed by accommodating them at the same time to have space orthogonality between the users, in which they may be often accommodated at the same time. Therefore, there is a method for making the simultaneous communication with the SIMO with less spatial interference for the multi-user, or it is possible to satisfy the requested throughput by making the multi-user MIMO communication even in the environment with great mutual interference amount. On the other hand, when the multi-user MIMO signal processing is always performed, the signal processing amount of the base station apparatus or the terminal increases, thereby making unnecessary process when the requested throughput of the terminal is low.

In non-patent document 1, as an example of multiple communication modes, comparison of the system capacity between the multi-user MIMO communication mode and the communication mode for making the MIMO communication in time division between the users is disclosed, but the switching method for the communication mode and the application method for the distributed antenna system are not disclosed.

The invention has been achieved to solve the above-mentioned problems, and it is an object of the invention to provide a distributed antenna system in which the terminal judges which of the MIMO communication and the SIMO communication is adequate, and selects the optimal antenna to be used in the distributed antenna system and the optimal radio communication mode.

In order to solve the above-mentioned problems, there is provided a distributed antenna system wherein the optimal antenna is selected in accordance with the communication mode by switching the communication mode in accordance with the traffic between the base station apparatus and the terminal, and the communication is continued by switching the connection between the antenna port of the base station apparatus and the distributed antenna.

The distributed antenna system according to the invention includes a base station apparatus having plural antenna ports, a terminal having plural antennas, a remote radio unit for accommodating one or more antennas, and an antenna switch for switching the connection between the antenna of the remote radio unit and the antenna port of the base station apparatus in uplink and downlink communications by spatially dispersing plural remote radio units. Also, though there is a method for routing the coaxial cable between the antenna switch and the remote radio unit, they may be connected via a DAS patent machine and a DAS child machine. In this case, the DAS parent machine is connected to the antenna switch, the DAS parent machine and the DAS child machine are connected via an optical fiber, and an optical fiber, an coaxial cable or an Unshielded Twisted Pair (UTP) cable is used for the connection from the DAS child machine to the remote radio unit.

The base station apparatus collects the terminal throughput of the uplink and downlink communication, the number of simultaneous communication terminals, and the information on the radio propagation channel from the distributed antenna to the terminal antenna, and judges that the communication mode is switched when the terminal throughput is below a request value, or above the request value plus a certain threshold.

The communication modes include SU-SISO/MU-SISO/SU-SIMO/MU-SIMO/SU-MIMO/MU-MIMO communication modes, for a Single User Single Input Single Output (SISO) communication, a Single Input Multiple Output (SIMO) communication, and a Multiple Input Multiple Output (MIMO) communication, and a single user mode (Single User) in which only one terminal makes the communication at a certain time and a multi-user mode (Multi-User) in which plural terminals make the simultaneous communication at a certain time.

In particular, the throughput is estimated and the communication mode in which the estimated throughput satisfies the requested throughput is selected from among the communication modes that can be supported by the terminal.

The estimation of throughput is made in each communication mode by deciding which one or more of the distributed antennas to be allocated to the transmitting/receiving antenna for the terminal and estimating the throughput from the number of simultaneous communication terminals and the radio propagation channel information.

Specifically, there are a method for estimating the throughput by computing the capacity based on the radio channel information between the antenna of the remote radio unit and the antenna of the terminal, a method for estimating the throughput in other communication modes by multiplying the actual result of SU-SISO or SU-SIMO by a factor, and a method for storing the past actual result of the terminal throughput in each communication mode, and using the past actual result value as the estimated throughput.

When the optimal communication mode is selected, an antenna connection pattern in the communication mode is set up in the antenna switch, thereby connecting the antenna of the remote radio unit and the antenna port of the base station apparatus, so that the terminal and the base station apparatus continue the communication in the optimal communication mode.

According to the first solving means of the present invention, there is provided a distributed antenna system comprising a base station apparatus having a plurality of antenna ports, a terminal having a plurality of terminal antennas, a plurality of remote radio units dispersed spatially so as to accommodate one or more distributed antennas, the distributed antenna system further comprising an antenna switch for switching the connection between the one or more distributed antennas and the plurality of antenna ports in the base station apparatus, the base station apparatus:

for collecting terminal throughput for uplink and downlink communications, number of simultaneous communication terminals, and radio propagation channel information from the each distributed antenna to the each terminal antenna;

for selecting a group of a predetermined number of the distributed antennas in descending order of the received power of a pilot signal or a control signal from the terminal, as an antenna cluster, from among the plurality of distributed antennas, or holding a group of a predetermined number of the distributed antennas in descending order of the received power of the pilot signal, as antenna cluster information, by transmitting or receiving beforehand the pilot signal between the distributed antennas, and selecting the antenna cluster corresponding to the distributed antenna having the highest received power of the pilot signal or the control signal from the terminal, utilizing the antenna cluster information, or selecting the antenna cluster corresponding to the distributed antenna for use in the current communication mode; and for communicating on one of a plurality of communication modes that are different in communication speed or throughput, the one of the plurality of communication modes being decided depending on whether only one terminal makes the communication or a plurality of terminals make the communication simultaneously at a certain time, and which one or more antennas of the selected antenna cluster and the selected terminal antennas are allocated to a transmitting/receiving antenna;

in which, for judging the switching of the communication mode, by computing an estimated throughput in any other communication mode than a first communication mode in current communication, and selecting a second communication mode in which the estimated throughput satisfies a request value and the communication speed or throughput is higher than in the first communication mode, when the terminal throughput of uplink or downlink communication is below the request value or number of simultaneous connection terminals is above a preset threshold, while on the other hand, by computing an estimated throughput in any other communication mode than the first communication mode in current communication, and selecting the second communication mode in which the estimated throughput satisfies the request value and the communication speed or throughput is lower than in the first communication mode, when the terminal throughput of uplink or downlink communication is above the request value plus a certain threshold value or the number of simultaneous connection terminals is below a preset threshold;

wherein, in computing the estimated throughput, a setting is made in which one or more antennas from among the selected antenna cluster and terminal antennas are allocated to be a transmitting/receiving antenna, and the antenna ports of the base station apparatus corresponding to the set number of distributed antenna are allocated;

the base station apparatus creates an antenna connection pattern representing the correspondence between the predetermined number of distributed antenna and the plurality of antenna ports, in the selected second communication mode and the selected predetermined number of the distributed antenna, and notifies the antenna connection pattern to the antenna switch;

the antenna switch receives the antenna connection pattern from the base station apparatus; and the antenna switch switches the correspondence between the predetermined number of distributed antenna and the plurality of antenna ports in accordance with the designated antenna connection pattern, thereby switching the communication mode between the base station apparatus and the terminal to continue the communication.

According to the second solving means of the present invention, there is provided a base station apparatus in a distributed antenna system comprising the base station apparatus having a plurality of antenna ports, a terminal having a plurality of terminal antennas, a plurality of remote radio units dispersed spatially so as to accommodate one or more distributed antennas, and an antenna switch for switching the connection between the one or more distributed antennas and the plurality of antenna ports in the base station apparatus, the base station apparatus comprising:

a signal processing part for collecting terminal throughput for uplink and downlink communications, number of simultaneous communication terminals, and radio propagation channel information from the each distributed antenna to the each terminal antenna;

an antenna selection part for selecting a group of a predetermined number of the distributed antennas in descending order of the received power of a pilot signal or a control signal from the terminal, as an antenna cluster, from among the plurality of distributed antennas, or holding a group of a predetermined number of the distributed antennas in descending order of the received power of the pilot signal, as antenna cluster information, by transmitting or receiving beforehand the pilot signal between the distributed antennas, and selecting the antenna cluster corresponding to the distributed antenna having the highest received power of the pilot signal or the control signal from the terminal, utilizing the antenna cluster information, or selecting the antenna cluster corresponding to the distributed antenna for use in the current communication mode; and a communication mode switching processing part for communicating on one of a plurality of communication modes that are different in communication speed or throughput, the one of the plurality of communication modes being decided depending on whether only one terminal makes the communication or a plurality of terminals make the communication simultaneously at a certain time, and which one or more antennas of the antenna cluster and the terminal antennas selected by the antenna selection part are allocated to a transmitting/receiving antenna;

in which the communication mode switching processing part judges the switching of the communication mode, by computing an estimated throughput in any other communication mode than a first communication mode in current communication, and selecting a second communication mode in which the estimated throughput satisfies a request value and the communication speed or throughput is higher than in the first communication mode, when the terminal throughput of uplink or downlink communication is below the request value or number of simultaneous connection terminals is above a preset threshold, while on the other hand, by computing an estimated throughput in any other communication mode than the first communication mode in current communication, and selecting the second communication mode in which the estimated throughput satisfies the request value and the communication speed or throughput is lower than in the first communication mode, when the terminal throughput of uplink or downlink communication is above the request value plus a certain threshold value or the number of simultaneous connection terminals is below a preset threshold;

wherein, in computing the estimated throughput, a setting is made in which one or more antennas from among the selected antenna cluster and terminal antennas are allocated to be a transmitting/receiving antenna, and the antenna ports of the base station apparatus corresponding to the set number of distributed antenna are allocated;

the signal processing part creates an antenna connection pattern representing the correspondence between the predetermined number of distributed antenna and the plurality of antenna ports, in the second communication mode and the predetermined number of the distributed antenna that are selected by the communication mode switching processing part and the antenna selection part, and notifies the antenna connection pattern to the antenna switch; and the antenna switch switches the correspondence between the predetermined number of distributed antenna and the plurality of antenna ports in accordance with the designated antenna connection pattern, thereby switching the communication mode between the base station apparatus and the terminal to continue the communication.

According to the third solving means of the present invention, there is provided an antenna switch device in a distributed antenna system comprising a base station apparatus having a plurality of antenna ports, a terminal having a plurality of terminal antennas, and a plurality of remote radio units dispersed spatially so as to accommodate one or more distributed antennas, the antenna switch device switching the connection between the plurality of remote radio units and the base station apparatus, the antenna switch device comprising:

a control part for receiving an antenna connection pattern from the base station apparatus, the antenna connection pattern representing the correspondence between a predetermined number of distributed antennas and the plurality of antenna ports in a second communication mode and the predetermined number of distributed antennas that are selected in order to switch a first communication mode to the second communication mode, during communication on one of the plurality of communication modes that are different in communication speed or throughput, the communication mode being decided depending on whether only one terminal makes the communication or a plurality of terminals make the communication simultaneously at a certain time, and which one or more antennas from among the selected antenna cluster and terminal antennas are allocated to be a transmitting/receiving antenna; and a reception switch combine processing part and a send switch part for making switching of the correspondence between the predetermined number of distributed antennas and the plurality of antenna ports for an uplink and a downlink communication under the control of the control part in accordance with the designated antenna connection pattern;

wherein, the communication mode is switched between the base station apparatus and the terminal by switching the connection between the one or more distributed antennas and the plurality of antenna ports of the base station apparatus to continue the communication.

According to the fourth solving means of the present invention, there is provided a distributed antenna switching method in a distributed antenna system comprising a base station apparatus having a plurality of antenna ports, a terminal having a plurality of terminal antennas, a plurality of remote radio units dispersed spatially so as to accommodate one or more distributed antennas, and an antenna switch for switching the connection between the one or more distributed antennas and the plurality of antenna ports in the base station apparatus, the base station apparatus:

for collecting terminal throughput for uplink and downlink communications, number of simultaneous communication terminals, and radio propagation channel information from the each distributed antenna to the each terminal antenna;

for selecting a group of a predetermined number of the distributed antennas in descending order of the received power of a pilot signal or a control signal from the terminal, as an antenna cluster, from among the plurality of distributed antennas, or holding a group of a predetermined number of the distributed antennas in descending order of the received power of the pilot signal, as antenna cluster information, by transmitting or receiving beforehand the pilot signal between the distributed antennas, and selecting the antenna cluster corresponding to the distributed antenna having the highest received power of the pilot signal or the control signal from the terminal, utilizing the antenna cluster information, or selecting the antenna cluster corresponding to the distributed antenna for use in the current communication mode; and for communicating on one of a plurality of communication modes that are different in communication speed or throughput, the one of the plurality of communication modes being decided depending on whether only one terminal makes the communication or a plurality of terminals make the communication simultaneously at a certain time, and which one or more antennas of the selected antenna cluster and the selected terminal antennas are allocated to a transmitting/receiving antenna;

in which, for judging the switching of the communication mode, by computing an estimated throughput in any other communication mode than a first communication mode in current communication, and selecting a second communication mode in which the estimated throughput satisfies a request value and the communication speed or throughput is higher than in the first communication mode, when the terminal throughput of uplink or downlink communication is below the request value or number of simultaneous connection terminals is above a preset threshold, while on the other hand, by computing an estimated throughput in any other communication mode than the first communication mode in current communication, and selecting the second communication mode in which the estimated throughput satisfies the request value and the communication speed or throughput is lower than in the first communication mode, when the terminal throughput of uplink or downlink communication is above the request value plus a certain threshold value or the number of simultaneous connection terminals is below a preset threshold;

wherein, in computing the estimated throughput, a setting is made in which one or more antennas from among the selected antenna cluster and terminal antennas are allocated to be a transmitting/receiving antenna, and the antenna ports of the base station apparatus corresponding to the set number of distributed antenna are allocated;

the base station apparatus creates an antenna connection pattern representing the correspondence between the predetermined number of distributed antenna and the plurality of antenna ports, in the selected second communication mode and the selected predetermined number of the distributed antenna, and notifies the antenna connection pattern to the antenna switch;

the antenna switch receives the antenna connection pattern from the base station apparatus; and the antenna switch switches the correspondence between the predetermined number of distributed antenna and the plurality of antenna ports in accordance with the designated antenna connection pattern, thereby switching the communication mode between the base station apparatus and the terminal to continue the communication.

With the invention, the optimal antenna at which the terminal satisfies the requested throughput and the optimal communication mode are selected. When the SIMO communication is selected in the situation where the traffic of the terminal is low, it is unnecessary to always feed back the MIMO communication, and it is possible to make effective use of the radio resources. Also, the signal processing amount of the SIMO communication is reduced below the signal processing amount on the MIMO communication by selecting the SIMO communication, whereby the power consumption of the terminal can be suppressed to be low.

Also, since the system throughput is maximized using the multi-user MIMO communication when a congestion occurs, it is possible to run the system to be scalable to deal with an increase or decrease in the traffic.

BRIEF DESCRIPTION OF THE INVENTION

FIG. 4 shows a form of antenna switch operation in making the uplink communication in the wide area.

FIG. 9 is an explanatory view of the communication mode and a throughput example in the downlink communication.

FIG. 14 is an explanatory view of terminal list information and simultaneous communication terminal information according to the embodiment of the invention.

FIG. 18 is an explanatory view of channel information in the base station apparatus according to the embodiment of the invention.

FIG. 19 is an explanatory view of a throughput estimation method for the communication mode switching processing part in the base station apparatus according to the embodiment of the invention.

FIG. 21 is an explanatory view of a pilot signal transmitting method for collecting channel information between antennas in a remote radio unit according to the embodiment of the invention.

FIG. 23 is an explanatory view of channel information between antennas in the remote radio unit according to the embodiment of the invention.

FIG. 25 is an explanatory view of SIMO/MIMO antenna candidate selection using the pilot signal from the terminal.

FIG. 37 is an explanatory view of antenna cluster information in the base station apparatus according to the embodiment of the invention.

BEST MODE FOR CARRYING OUT THE INVENTION

The preferred embodiments of the present invention will be described below with reference to the drawings.

A. Embodiment 1

1. Distributed Antenna System

In this embodiment, a distributed antenna system including a base station apparatus for selecting the optimal antenna and the communication mode in accordance with a traffic situation of the terminal will be described below.

Figure 1:
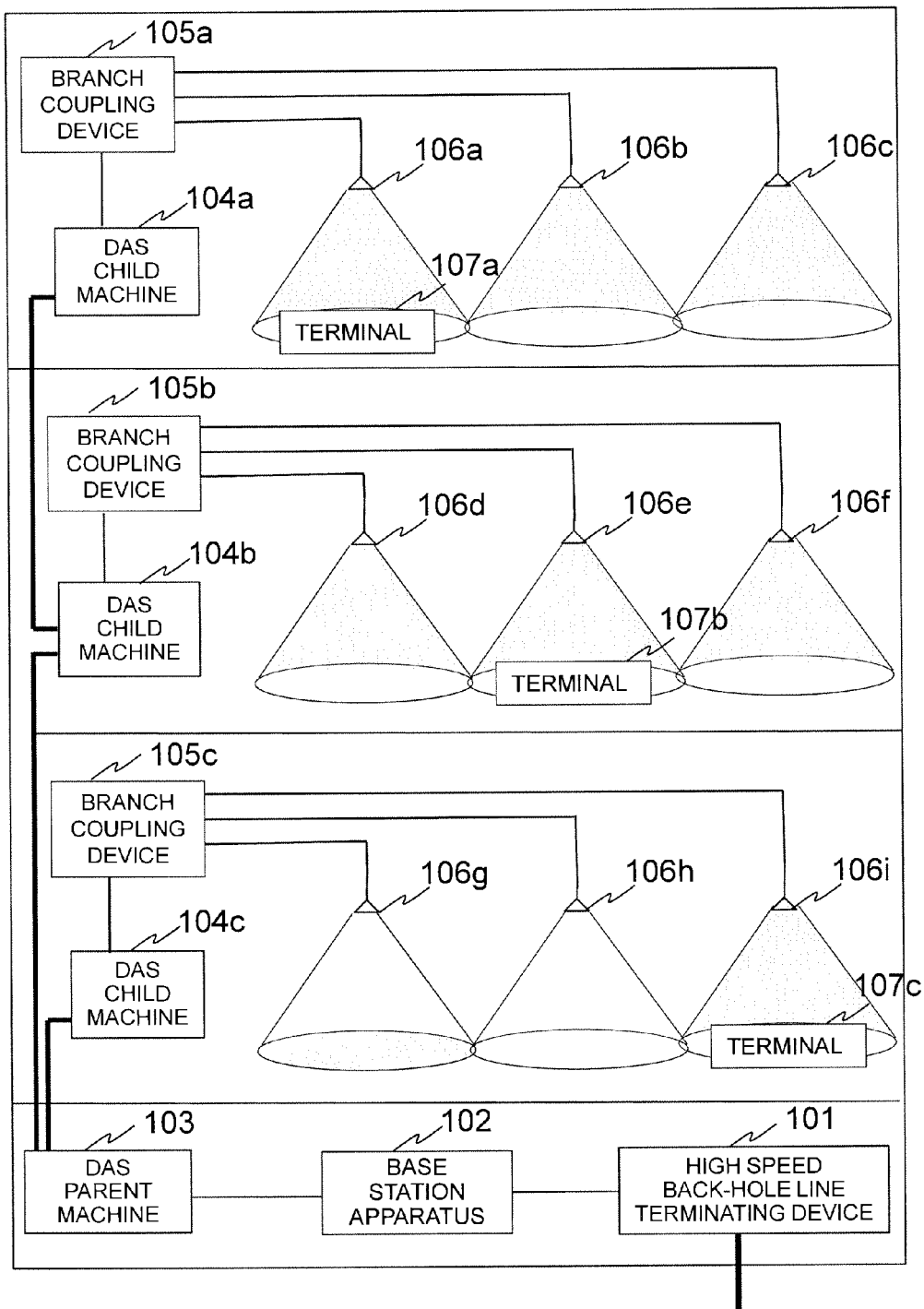
FIG. 1 is a system configuration diagram of a Passive DAS.

First of all, one embodiment of a Distributed Antenna System (DAS) of the invention will be described below, using FIG. 1. In this system configuration, antennas 106a, 106b, 106c, 106d, 106e, 106f, 106g, 106h and 106i used by a base station apparatus 102 are installed at spatially dispersed locations, to convey an input/output signal through an antenna port in the base station apparatus 102 via a DAS parent machine 103 and DAS child machines 104a, 104b and 104c. The DAS parent machine 103 and the DAS child machines 104a, 104b and 104c perform the high speed digital communication using an optical fiber and the like. There are a method of directly transmitting a radio analog signal in this section and a method of converting an analog signal into a digital signal and transmitting the digital signal. Branch coupling devices 105a, 105b and 105c cause the analog transmission signal to branch or couple in N directions. For example, a terminal 107a makes the radio communication with the base station apparatus 102 via one or more antennas 106a, 106b existing around it, and can be connected via a high speed back-hole line terminating unit 101 to an external network to make the internet connection. In an example of FIG. 1, the base station apparatus 102 has one antenna port. In this case, since the signal of one antenna port in the base station apparatus 102 branches and couples to all the antennas, only the same signal can be inputted or outputted from plural antennas, whereby the above MIMO technology can not be applied. In the case where the base station apparatus 102 has two antenna ports, for example, when the above MIMO technology is applied, it is required to connect the signals of the two antenna ports independently, in which another system from the coaxial cable up to the antenna 106a is required for coupling, for example. That is, two coaxial cables are routed, increasing the wiring amount.

Figure 2:
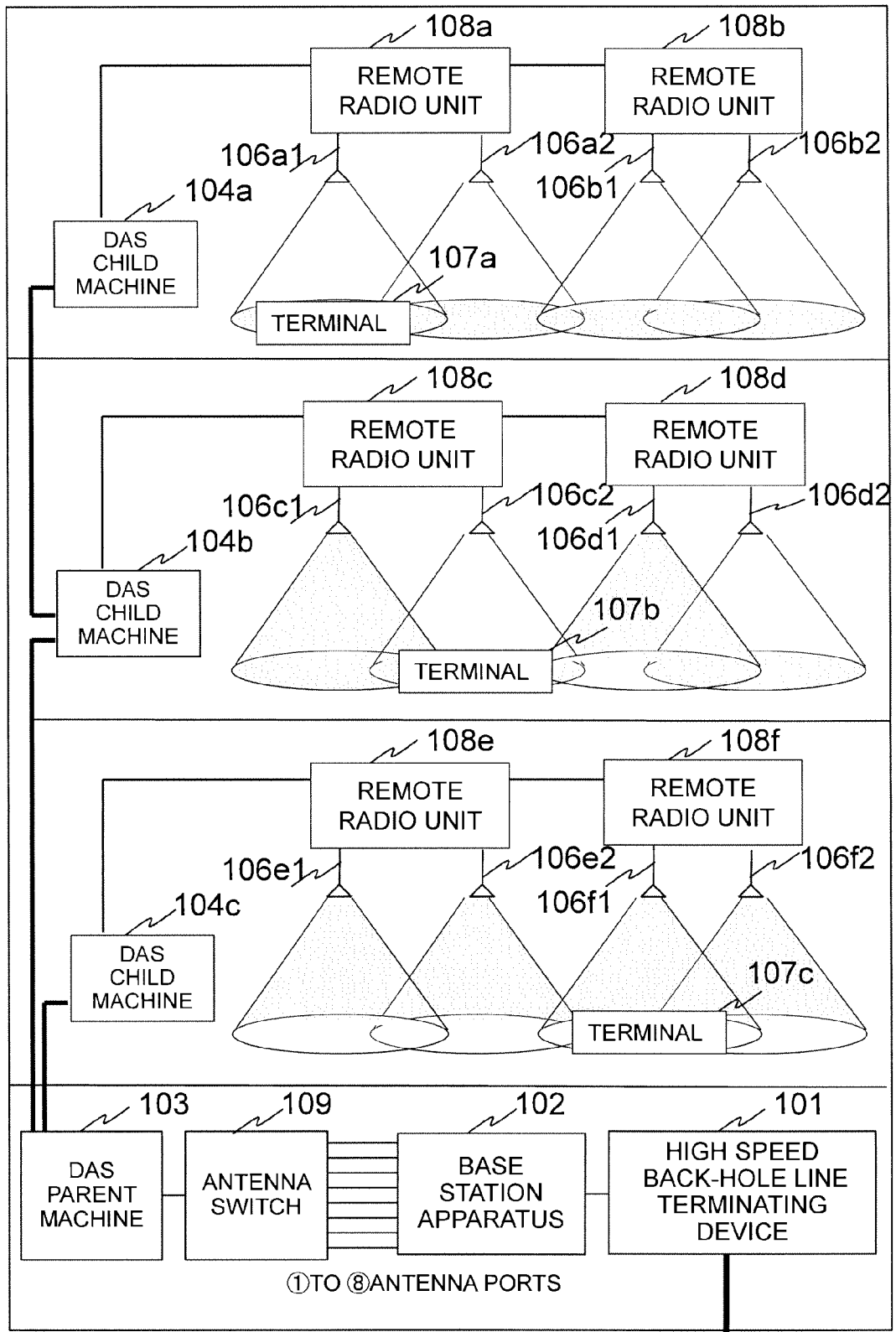
FIG. 2 is a system configuration diagram of an Active DAS according to an embodiment of the invention.

FIG. 2 is a system configuration diagram of the distributed antenna system according to this embodiment. This system includes the terminals 107a, 107b, 107c, the remote radio units 108a, 108b, 108c, 108d, 108e, 108f, the DAS (Distributed Antenna System) child machines 104a, 104b, 104c, the DAS parent machine 103, an antenna switch 109, the base station apparatus 102 and the high speed back-hole line terminating unit 101. This configuration has a feature that the antenna switch 109 is provided for supporting more antennas than the number of antenna ports provided in the base station apparatus 102. A function of the antenna switch 109 may be provided in the base station apparatus 102 or the DAS parent machine 103. By switching the connection between the plural antenna ports for the base station apparatus 102 and the plural antennas 106a1, 106a2, 106b1, 106b2, 106c1, 106c2, 106d1, 106d2, 106e1, 106e2, 106f1, 106f2 provided for the plural remote radio units 108a, 108b, 108c, 108d, 108e, 108f, using the antenna switch 109, it is possible to improve the throughput by applying the MIMO communication only in a specific location.

For example, the terminal 107a can make two MIMO communications for transmitting and receiving, using two antennas 106a1 and 106a2 for the remote radio unit 108a. Also, the antenna switch 109 makes the switching of antennas, whereby it is possible to switch between two MIMO communications for transmitting and receiving, using two antennas of the antenna 106a1 for the remote radio unit 108a and the antenna 106b1 for the remote radio unit 108b. The throughput can be improved by selecting the optimal antenna in accordance with a propagation situation. However, when a large number of antennas are equipped in the overall system, there is a problem that it takes a lot of time to search for the optimal antenna at once.

An operation example of the antenna switch 109 will be described below. In the following form, the eight input/output signals in parallel from the base station apparatus 102 in FIG. 2 are defined as <1>, <2>, <3>, <4>, <5>, <6>, <7> and <8> (indicated by the circled number in the drawing, same below). Since the eight antennas are dealt with by the base station apparatus 102, it is meant that a maximum of eight transmitting and receiving antennas can be used in the MIMO communication. In an IMT-Advanced standard, the MIMO communication is defined by the eight transmitting and receiving antennas, whereby the base station apparatus 102 in the IMT-Advanced standard can support a maximum of eight antennas. This parallel number is decided by the standard, and may be eight or more in the invention. Though the eight signal lines are illustrated for convenience sake in FIG. 2, the eight signals may be multiplexed and transmitted along one signal line. That is, it is not meant that the eight signal lines are physically required between the base station apparatus 102 and the antenna switch 109.

Also, a form in which the antenna switch 109 outputs twelve signals in parallel to the DAS parent machine 103 is shown, in which respective signals are defined as #1, #2, #3, #4, #5, #6, #7, #8, #9, #10, #11 and #12. The signals are not limited to #1 to #12, but an appropriate number of signals may be defined.

Figure 3:
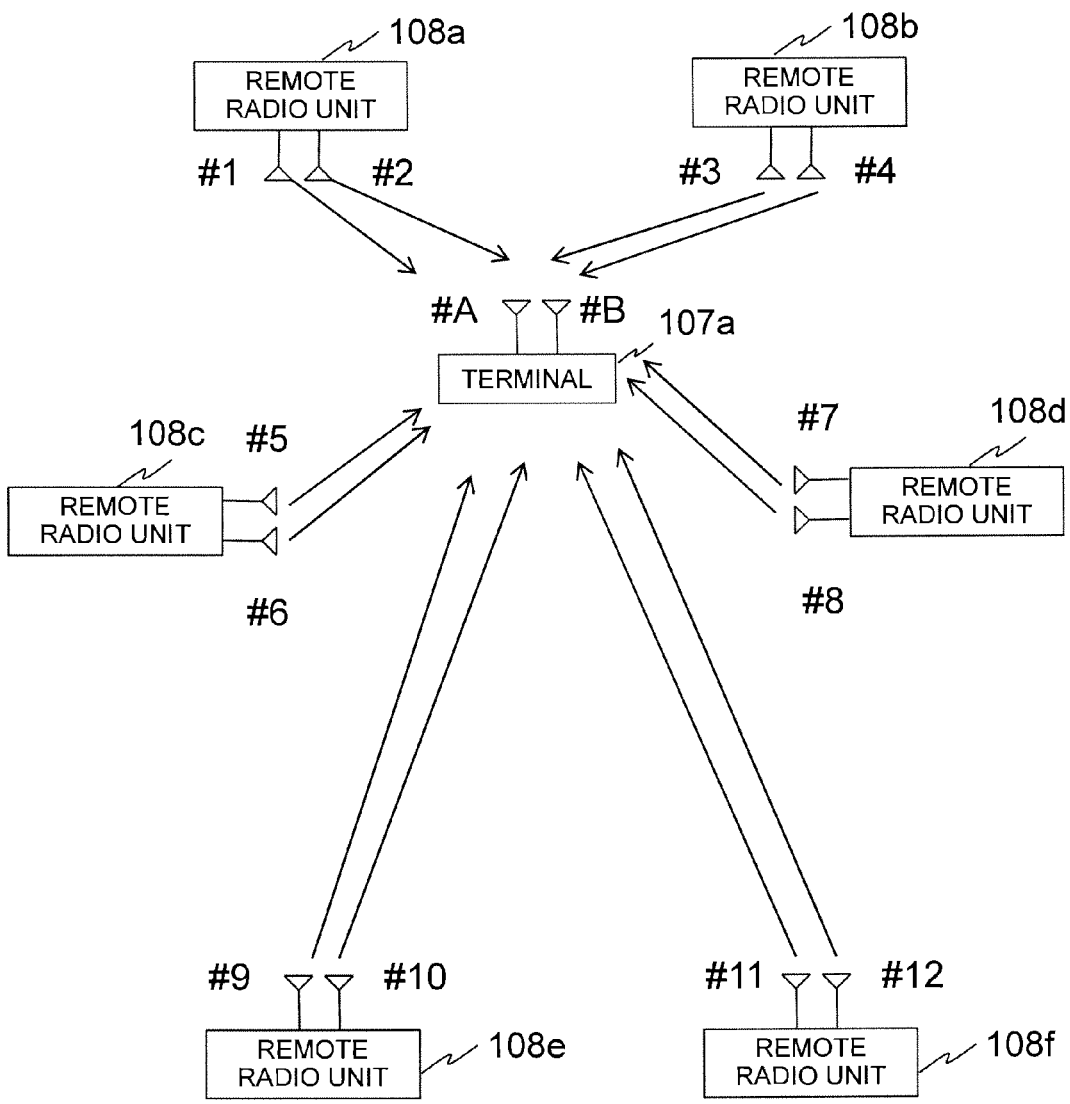
FIG. 3 shows a form of antenna switch operation in making a downlink communication in a wide area.

An operation example of the antenna switch 109 in the downlink communication will be described below using FIG. 3. The antenna switch 109 connects a transmit output signal <1> of the base station apparatus 102 to all the antenna ports #1, #2, #3, #4, #5, #6, #7, #8, #9, #10, #11 and #12. At this time, the antennas 106a1, 106a2, 106b1, 106b2, 106c1, 106c2, 106d1, 106d2, 106e1, 106e2, 106f1, 106f2 of the remote radio units 108a, 108b, 108c, 108d, 108e, 108f correspond to #1, #2, #3, #4, #5, #6, #7, #8, #9, #10, #11, #12, respectively, whereby the transmit output signal <1> of the base station apparatus 102 is transmitted from all the antennas. The communication for a broadcast packet or the like effective to cover the wide area can be realized. When it is unknown where the terminal 107a is located, it is impossible to narrow down which antenna to be used for communication, whereby this communication method is utilized to make the communication over the wide area. However, since the same signal arrives at the terminal 107a via the multiple paths, there is a delay spread due to the multi-path, possibly degrading the communication speed. To prevent interference between OFDM symbols, a guard interval of the OFDM signal may be designed. When the communication speed is degraded due to the delay spread, the optimal transmitting antenna for the terminal 107a is searched for to narrow down the transmitting antennas to one, reducing the number of multiple paths and decreasing the delay spread, whereby the communication can be stabilized.

Another method of searching for the optimal transmitting antenna will be described below using FIG. 4. In the antenna switch 109, #1 allocated to the antenna 106a1 of the remote radio unit 108a is the received signal of the antenna port <1> of the base station apparatus 102. Likewise, #2 is allocated to <2>, #3 is allocated to <3>, and #4 is allocated to <4>. The signal of making the maximum ratio combine of the received signals of #5 and #6 is the received signal of <5>. Likewise, #7 and #8 are allocated to <6>, #9 and #10 are allocated to <7>, and #11 and #12 are allocated to <8>. The pilot signal is transmitted from the terminal 107a, the base station apparatus 102 measures the received power of signal received in <1> to <8>, whereby the antenna having the highest received power is narrowed down as a candidate. When the signal received in <1> has the highest received power, the antenna of #1 is selected as the optimal transmitting antenna.

When the antenna switch 109 does not have a maximum ratio combine function, #1 is allocated to <1>, #2 is allocated to <2>, #3 is allocated to <3>, #4 is allocated to <4>, #5 is allocated to <5>, #6 is allocated to <6>, #7 is allocated to <7>, and #8 is allocated to <8>. The pilot signal is transmitted from the terminal 107a, and the base station apparatus 102 measures the received power of signal received in <1> to <8>, and the antenna having the highest power is selected as a candidate, in which the received power and the antenna number are stored. Next, #9 is allocated to <1>, #10 is allocated to <2>, #11 is allocated to <3>, and #12 is allocated to <4>, and the received power of the pilot signal transmitted from the terminal 107a is measured in <1> to <4>. The antenna having the highest received power is selected as the transmitting antenna by comparing the value of the highest received power with the value of the received power stored previously.

A method of selecting the optimal antenna will be described below using FIG. 5.

In a connection pattern 1 of the antenna switch, the send signal of one antenna port <1> in the base station apparatus 102 is connected to all the antennas and transmitted over the wide area, as described in connection with FIG. 3. The receiving antenna is set in a state where the signals from all the antennas are receivable as an antenna connection pattern as described in connection with FIG. 4.

The base station apparatus 102 transmits a periodic report signal or individual control signal, and the terminal 107a receiving this signal transmits the pilot signal and makes access. Which received signal of <1> to <8> has the highest received power is checked.

The received power of the pilot signal transmitted from the terminal is measured, and the antenna having the highest received power is specified as the transmitting antenna for the base station apparatus, whereby the antenna connection pattern is decided such that the N antennas in descending order of the received power may become the receiving antennas for the base station apparatus. In the following, an example of selecting the Single Input Multiple Output (SIMO) communication with one transmitting antenna and two receiving antennas will be described below.

Figure 5:
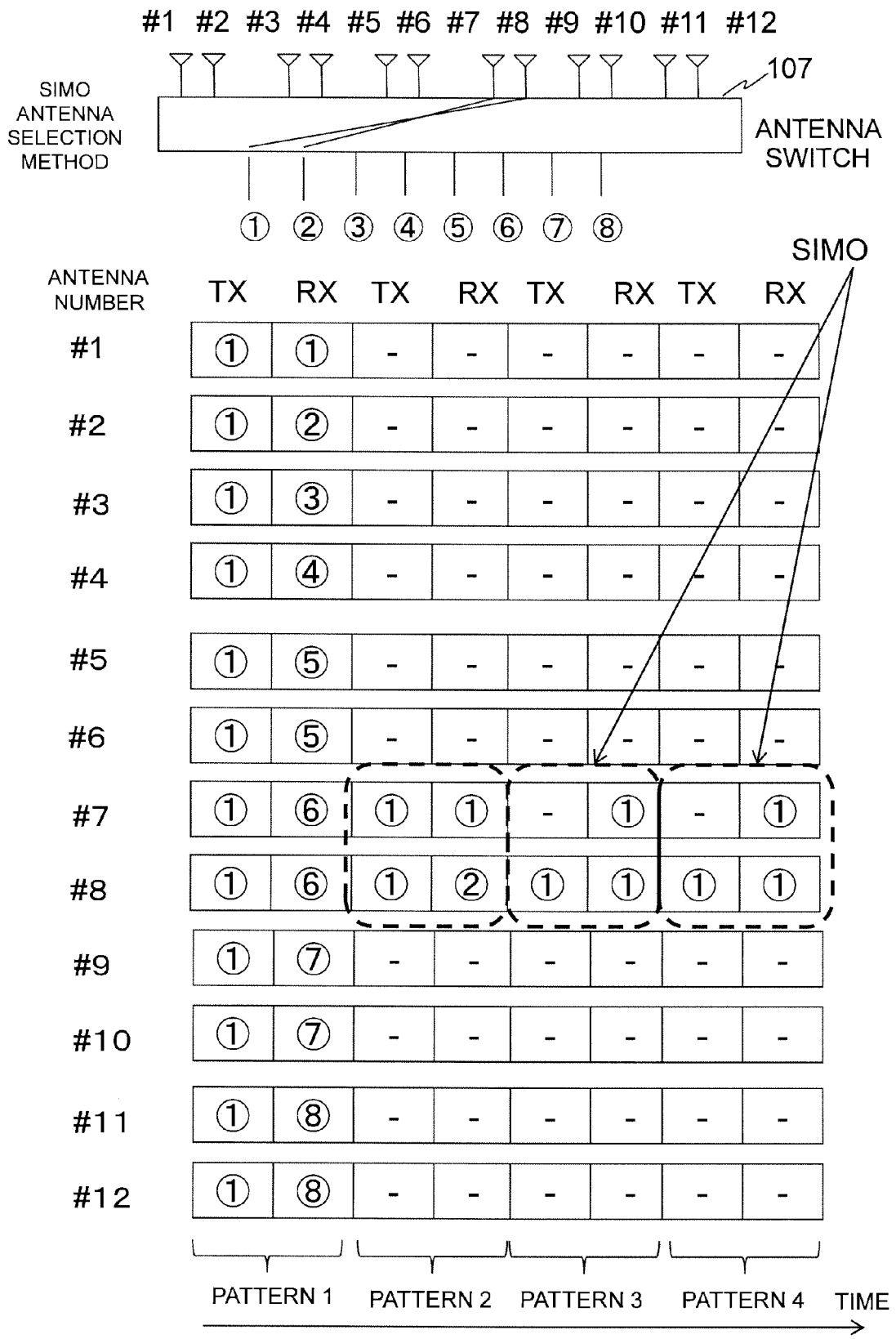
FIG. 5 is an explanatory view of a connection pattern change operation of an antenna switch in narrowing down the optimal antenna for making the SIMO communication.

In an example of FIG. 5, when the signal in which the pilot signal transmitted from the terminal is received at the antenna port of <6> has the highest received power, the antenna connection pattern is set as a pattern 2. Specifically, the send signal of <1> is connected to #7 and #8, the received signal of #7 is connected to <1>, and the received signal of #8 is connected to <2>. The terminal 107 makes access again using the pilot signal with the report signal or specific control signal from the base station apparatus 102. The base station apparatus 102, receiving the pilot signal transmitted from the terminal 107a, compares the received power between <1> and <2>. When the highest received power is <2>, #8 is selected as the optimal transmitting antenna. Thus, the connection pattern of the antenna switch is changed to a pattern 3. Specifically, the send signal of <1> is connected to #8, and the signal of making the maximum ratio combine of the received signals of #7 and #8 is connected to <1>.

When the antenna switch 109 has no function of maximum ratio combine, the maximum ratio combine may be made in the base station apparatus 102 by connecting the received signal of #7 to <1> and connecting the received signal of #8 to <2>. With the connection pattern of this pattern 3, the communication with the terminal is continued.

Since it is required to periodically receive the signal broadly, the other users can be supported by allocating the send signal of <3> to the available antenna, and allocating the received signal of the available antenna to <3> to <8>.

Figure 6:
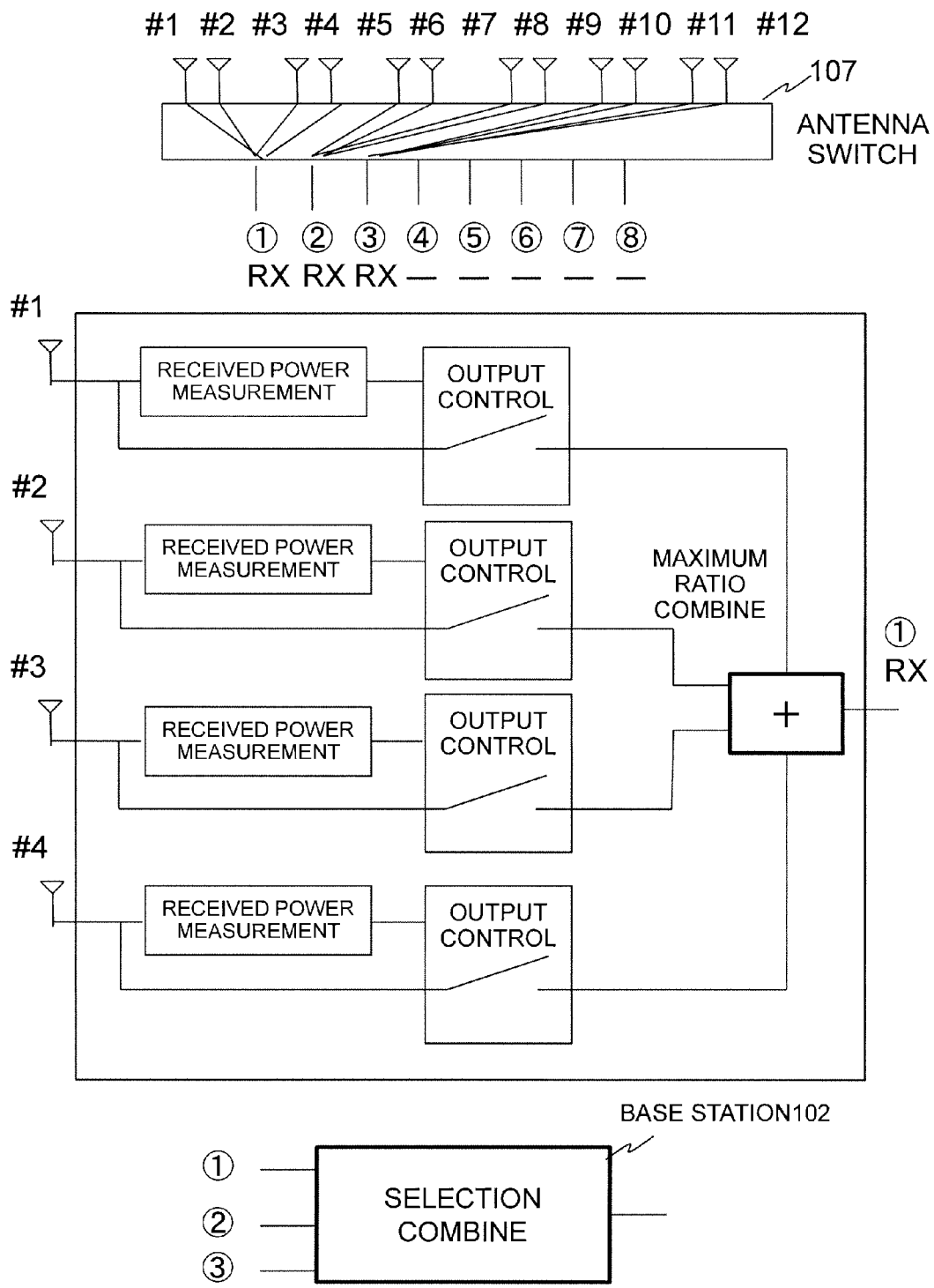
FIG. 6 is an explanatory view of a maximum ratio combine and a selective combine in making the uplink communication in the wide area.

In FIG. 6, an operation example of the antenna switch 109 in the uplink communication is shown.

With the antenna switch 109, the received signal of antenna #1, #2, #3, #4 is connected to the antenna port <1> of the base station apparatus 102, the received signal of antenna #5, #6, #7, #8 is connected to the antenna port <2> of the base station apparatus 102, and the received signal of antenna #9, #10, #11, #12 is connected to the antenna port <3> of the base station apparatus 102. With this configuration, since the signals from all the antennas can be received using three antenna ports of the base station apparatus 102, the robust communication is enabled even in a situation where the location of the terminal 107 is unknown. Also, though in the connection configuration as described in connection with FIG. 4, all the antenna ports of <1> to <8> are employed for receiving, three antenna ports may be sufficient. In the antenna switch 109, the maximum ratio combine of all the received signals from the antennas #1, #2, #3 and #4 is made. Though an example of making the maximum ratio combine of the received signals of the antennas #1 to #4 is shown herein, the maximum ratio combine of any number of antenna signals equal to or less than the number of antennas dealt with by the antenna switch 109 may be made for connection to the antenna port of the base station apparatus 102.

The maximum ratio combine of only the received signals considered significant of the antennas #1, #2, #3 and #4 may be made. For example, in a case where the antennas #1 and #2 have the received signals, but the received signals of the antennas #3 and #4 are buried below the noise level, when all the received signals of the antennas #1, #2, #3 and #4 are synthesized, the noise is added to degrade the signal to noise power ratio (SNR). Therefore, the received power is measured for each antenna, and an output control of not outputting the signal near the noise level is provided, so that the received signal from the unnecessary antenna is not synthesized.

This function of received power measurement and output control may be provided in the remote radio units 108a, 108b, 108c, 108d, 108e and 108f. Or it may be provided in the antenna switch 109. The antenna switch 109 has the function of maximum ratio combine. In an example of FIG. 6, for the received signals of <1>, <2> and <3> undergoing the maximum ratio combine, the base station apparatus 102 performs a selection combine process for selecting the received signal having the highest quality based on the received powers of <1>, <2> and <3>.

The base station apparatus 102 may perform a signal processing of the maximum ratio combine for the received signals of <1>, <2> and <3>. Also, in the case where no maximum ratio combine processing function is provided to configure the antenna switch 109 inexpensively, the connection method of the antenna switch 109 in FIG. 6 can not be realized. In this case, since the process for maximum ratio combine is performed in the base station apparatus 102, one antenna port of the base station apparatus 102 is allocated to each one antenna.

Figure 7:
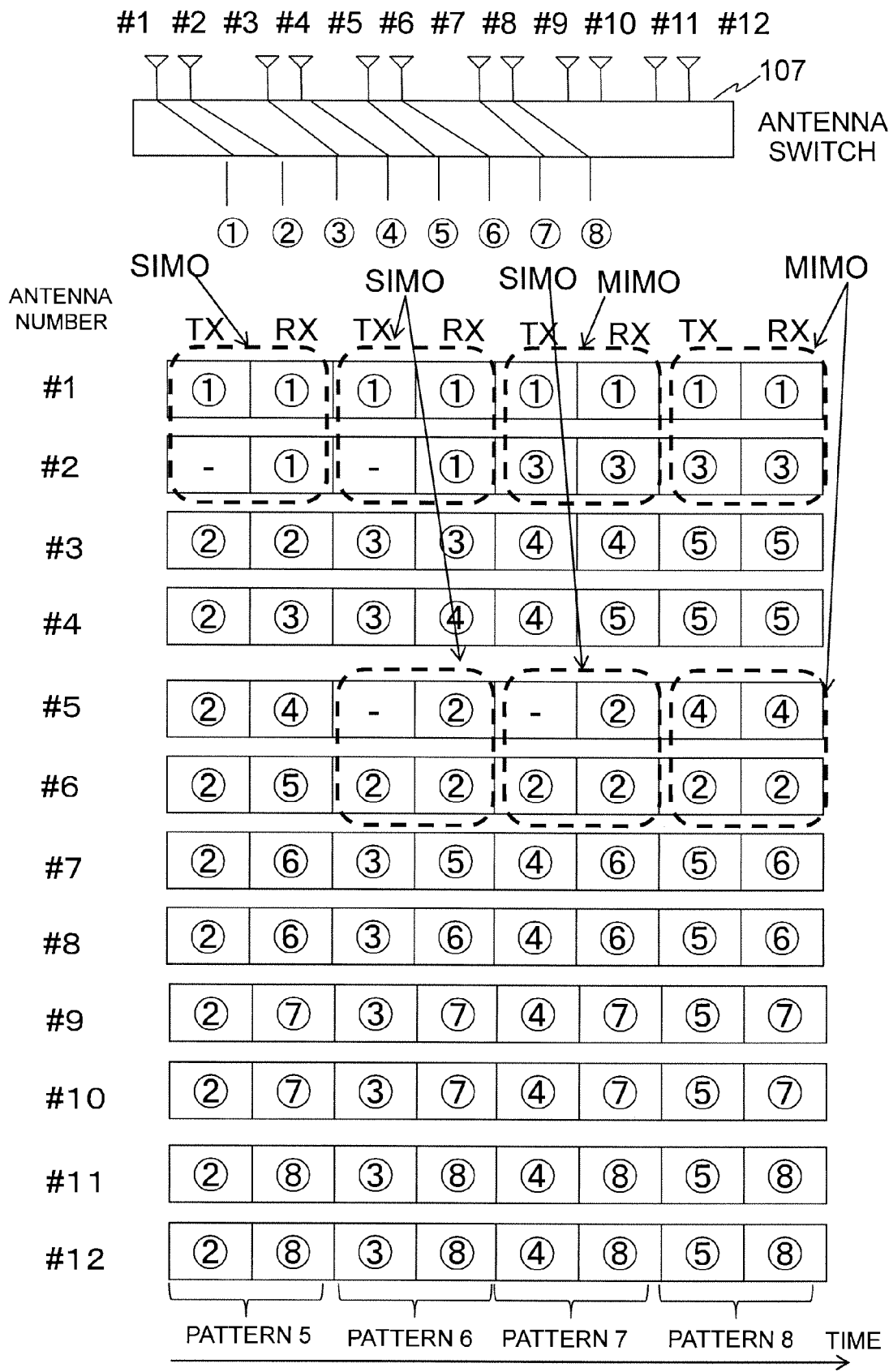
FIG. 7 is an explanatory view of a connection pattern change operation of the antenna switch in switching the communication mode between the SIMO communication and the MIMO communication.

In FIG. 7, an operation example of the antenna switch 109 according to the embodiment of the invention is shown.

In a connection pattern 4 of the antenna switch 109, the send signal of <1> is allocated to the antenna #1, but the send signal is not allocated to the antenna #2, and the send signal of <2> is allocated to the antennas #3 to #12. Also, the signal of making the maximum ratio combine of the received signals of antennas #1 and #2 is allocated to <1>, the received signal of #3 is allocated to <2>, the received signal of #4 is allocated to <3>, the received signal of #5 is allocated to <4>, the received signal of #6 is allocated to <5>, the signal of making the maximum ratio combine of the received signals of #7 and #8 is allocated to <6>, the signal of making the maximum ratio combine of the received signals of #9 and #10 is allocated to <7>, and the signal of making the maximum ratio combine of the received signals of #11 and #12 is allocated to <8>. It is supposed that the base station apparatus 102 and the terminal 107a make the SIMO communication using the antennas #1 and #2. In the connection configuration, a different send signal can be transmitted to any other antenna than the antenna in use for the SIMO communication, and the access signal transmitted from any other terminal than the terminal 107a making the SIMO communication can be received at all the antennas.

In a connection pattern 5 of the antenna switch 109, the allocation of the antennas #1 and #2 is the same as the pattern 4, but another user is connected to the antennas #5 and #6. Therefore, the send signal of <2> is allocated to the antenna #6, and the signal of making the maximum ratio combine of the received signals at the antennas #5 and #6 is allocated to <2>. The send signal of <3> is allocated to the antennas #3, #4, #7 to #12, and the received signal can be received at the antenna ports of <3> to <8>.

In a connection pattern 6 of the antenna switch 109, the user communicating at the antennas #1 and #2 switches from the SIMO communication to the MIMO communication. At this time, it is required to allocate the antenna ports of the base station apparatus 102 that are independent in transmitting and receiving at the antennas #1 and #2. Therefore, the send signal of <1> is allocated to the antenna #1, the send signal of <3> is allocated to the antenna #2, the received signal from the antenna #1 is allocated to <1> and the received signal from the antenna #2 is allocated to <3>. For the antennas #5 and #6, there is no difference from the connection pattern 5. Thereby, since the antenna ports of <1> to <3> are used for communication, the remaining antennas are mapped to the antenna ports of <4> to <8>. Specifically, the send signal of <4> is allocated to the antennas #3, #4, #7 to #12, and the received signal can be received at the antenna ports of <4> to <8>.

In a connection pattern 7 of the antenna switch 109, the user communicating at the antennas #5 and #6 switches from the SIMO communication to the MIMO communication. At this time, it is required to allocate the antenna ports of the base station apparatus 102 that are independent in transmitting and receiving at the antennas #5 and #6. Therefore, the send signal of <4> is allocated to the antenna #5, the send signal of <2> is allocated to the antenna #6, the received signal from the antenna #5 is allocated to <4> and the received signal from the antenna #6 is allocated to <2>. Thereby, since the antenna ports of <1> to <4> are used for communication, the remaining antennas are mapped to the antenna ports of <5> to <8>. Specifically, the send signal of <5> is allocated to the antennas #3, #4, #7 to #12, and the received signal can be received at the antenna ports of <5> to <8>.

2. Communication Mode and Throughput

Figure 8:
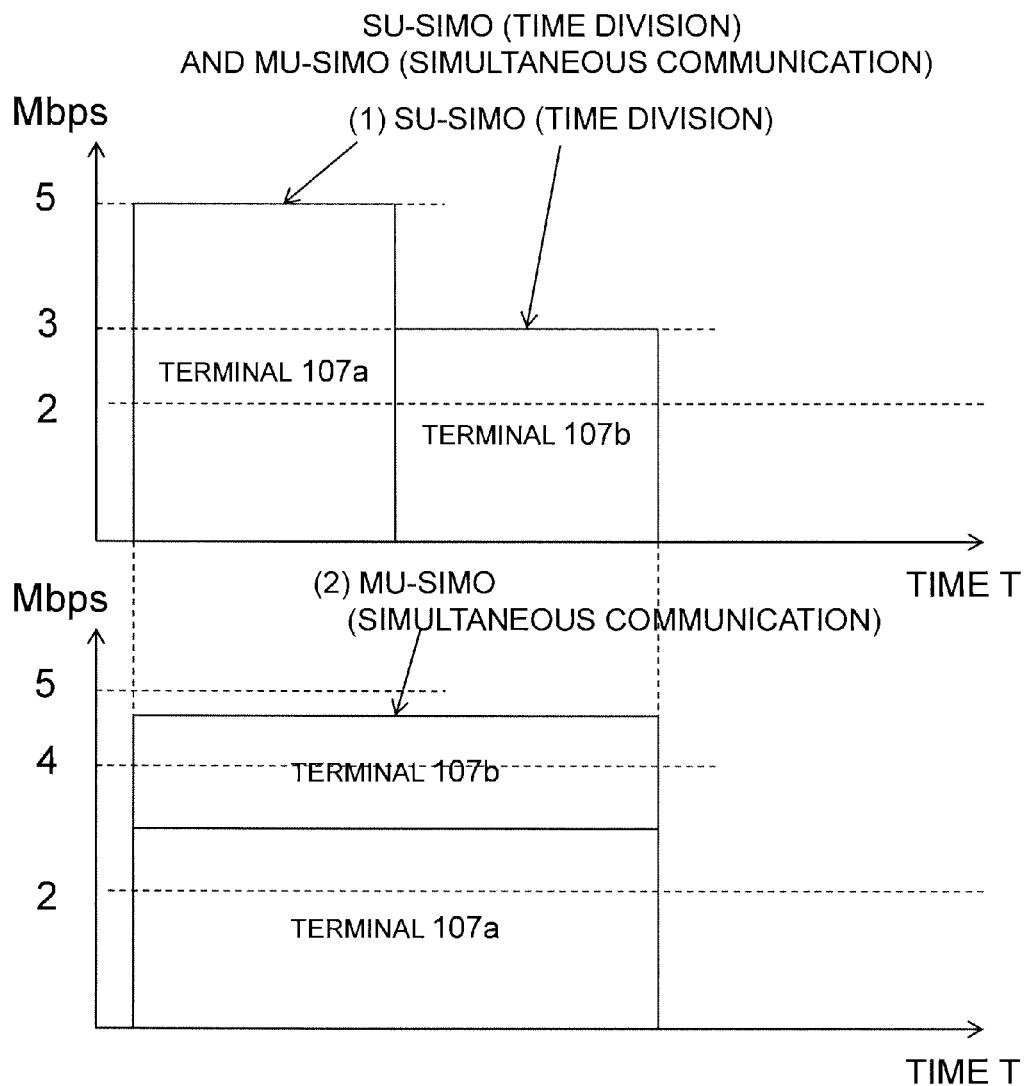
FIG. 8 is an explanatory view of SU-SIMO (time division communication) and MU-MIMO (simultaneous communication).

FIG. 8 is an explanatory view of the communication mode in the case where plural users make the SIMO communication. Herein, the antenna connection pattern 5 of FIG. 7 is supposed, in which the terminal 107a makes the SIMO communication, using the antennas #1 and #2, and the terminal 107b makes the SIMO communication, using the antennas #5 and #6.

The SIMO communication has two communication modes of a Single User SIMO (SU-SIMO) communication and a Multi-User SIMO (MU-SIMO) communication according to the algorithm of a scheduler for enabling the base station apparatus to distribute the resources. The SU-SIMO communication is a communication mode in which only one terminal (single user) makes the SIMO communication at a certain time. On the contrary, the MU-SIMO communication is a communication mode in which plural terminals (multi-user) make the SIMO communication at a certain time. The antenna connection pattern is the same or the pattern 5, whether the SU-SIMO communication or the MU-SIMO communication.

First of all, (1) in an example of the SU-SIMO (time division), the terminal 107a and the terminal 107b make the communication each using half time not to overlap temporally. In this case, when only the terminal 107a makes the communication, the throughput is 5 Mbps, but the usable time is shared with the terminal 107b, and halved, and the total time for sending the data becomes double, so that the throughput is halved, or 2.5 Mbps. Similarly, when only the terminal 107b makes the communication, the throughput is 3 Mbps, but when the terminal 107a and the terminal 107b make the time division of half, the throughput is 1.5 Mbps.

Next, (2) in an example of the MU-SIMO (simultaneous communication), the terminal 107a and the terminal 107b make the communication simultaneously. When there is no interference with each other, the terminal 107a and the terminal 107b can attain the maximum throughput, but the throughput is degraded in accordance with the mutual interference amount. In an example of FIG. 8, a degradation in the throughput due to mutual interference reaches a rate of about 60% than when there is no interference, in which the terminal 107a shows a value of 3.0 Mbps and the terminal 107b shows a value of 1.8 Mbps. In an environment where spatial division is made, when the mutual interference amount is small, the terminals should make the communication simultaneously in some cases. In the example of FIG. 8, when the MU-SIMO (simultaneous communication) of (2) is performed, the total throughput of the system is improved. In making the MU-SIMO communication, when the resource block in the frequency direction is divided into halves to avoid the interference, the throughput is degraded to half, like the SU-SIMO (time division). Also, when the MU-SIMO communication is made without avoiding the interference to have great mutual interference amount, the total throughput of the system may be degraded in some cases.

In the MIMO communication, the MIMO communication in which only one terminal (single user) makes the communication at a certain time is called the SU-MIMO communication. Also, the MIMO communication in which plural terminals (multi-user) make the communication at a certain time is called the MU-MIMO communication. In this case, there is the same relationship as that between the SU-SIMO communication and the MU-MIMO communication described above.

FIG. 9 is an explanatory view of the relationship between the communication mode and the throughput. In making the communication in the SU-SIMO, MU-SIMO, SU-MIMO and MU-MIMO as described above, a throughput example of the downlink of the terminal 107a is shown.

When only the terminal 107a makes the SU-SIMO communication, it is supposed that the throughput of 5 Mbps is attained. When the terminal 107a and the terminal 107b make the SU-SIMO communication in time division, it is supposed that the throughput of the terminal 107a is 2.5 Mbps. This is equivalent to about half of the throughput when only the terminal 107a makes the SU-SIMO communication. Similarly, when the terminal 107a and the terminal 107c make the SU-SIMO communication in time division, it is supposed that the throughput of the terminal 107a is 2.5 Mbps. This is also equivalent to about half of the throughput when only the terminal 107a makes the SU-SIMO communication. When the terminals 107a, 107b and 107c make the SU-SIMO communication in time division, it is supposed that the throughput of the terminal 107a is 1.7 Mbps. This is equivalent to about one-third of the throughput when only the terminal 107a makes the SU-SIMO communication. It is supposed that the throughput of the terminal 107a is 3 Mbps when the terminal 107a and the terminal 107b make the MU-SIMO communication simultaneously. It is supposed that the throughput of the terminal 107a is 2.8 Mbps when the terminal 107a and the terminal 107c make the MU-SIMO communication simultaneously. It is supposed that the throughput of the terminal 107a is 1.5 Mbps when the terminal 107a, the terminal 107b and the terminal 107c make the MU-SIMO communication simultaneously. These throughputs during the simultaneous communication are different depending on the combination of the terminals, because the interference situation varies with the position of the terminals 107a, 107b and 107c.

Similarly, when only the terminal 107a makes the SU-MIMO communication, it is supposed that the throughput is 9.8 Mbps because of about double speed-up with two transmitting and receiving antennas. When the terminal 107a and the terminal 107b make the SU-MIMO communication in time division, it is supposed that the throughput of the terminal 107a is 4.9 Mbps. This is equivalent to about half of the throughput when only the terminal 107a makes the SU-MIMO communication. Similarly, when the terminal 107a and the terminal 107c make the SU-MIMO communication in time division, it is supposed that the throughput of the terminal 107a is 4.9 Mbps. This is also equivalent to about half of the throughput when only the terminal 107a makes the SU-MIMO communication. When the terminals 107a, 107b and 107c make the SU-MIMO communication in time division, it is supposed that the throughput of the terminal 107a is 3.3 Mbps. This is equivalent to about one-third of the throughput when only the terminal 107a makes the SU-MIMO communication.

It is supposed that the throughput of the terminal 107a is 5.5 Mbps when the terminal 107a and the terminal 107b make the MU-MIMO communication simultaneously. It is supposed that the throughput of the terminal 107a is 5.4 Mbps when the terminal 107a and the terminal 107c make the MU-MIMO communication simultaneously. It is supposed that the throughput of the terminal 107a is 3.8 Mbps when the terminal 107a, the terminal 107b and the terminal 107c make the MU-MIMO communication simultaneously. These throughputs during the simultaneous communication are different depending on the combination of the terminals, because the interference situation varies with the position of the terminals 107a, 107b and 107c.

Taking into consideration the actual result values of the throughput in each communication mode as described above, when the requested throughput of the terminal 107a is 2 Mbps, it is required to select the MIMO communication mode when the terminals 107a, 107b and 107c make the communication simultaneously.

Figure 10:
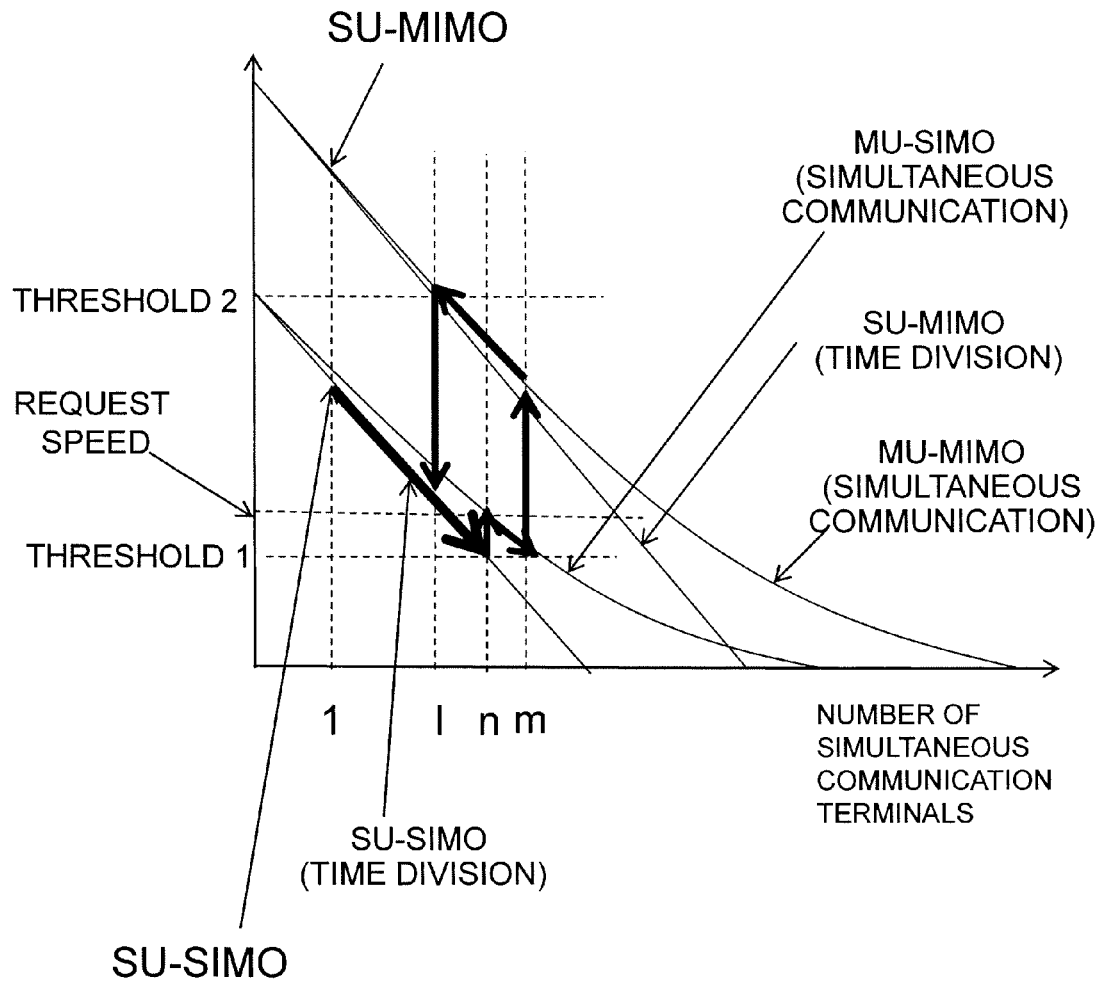
FIG. 10 is an explanatory view of an operation of switching the communication mode in accordance with the relationship between the number of simultaneous communication terminals and the throughput.

FIG. 10 is an explanatory view of the change in the terminal throughput and switching the communication mode according to the embodiment of the invention. Generally, when the number of simultaneous communication terminals increases, the throughput per terminal is degraded. The above SU-SIMO communication has the throughput that is 1/N of the throughput when one terminal makes the SU-SIMO communication, when the number of simultaneous communication terminals increases to N, evenly scheduled in time division. When the number of simultaneous communication terminals is n, the communication mode is switched when the throughput of the terminal 107a is below a threshold 1. In an example of FIG. 10, the mode is switched to the MU-SIMO (simultaneous communication). In the MU-SIMO (simultaneous communication), the combination of terminals having less mutual interference amount between the terminals is obtained by a scheduler to make the simultaneous communication. When there are a large number of terminals and the scheduling overhead is great, the communication mode may be switched to the MU-MIMO (time division).

Further, when the number of simultaneous communication terminals is m, when the throughput of the terminal 107a is below the threshold 1 in the MU-SIMO (simultaneous communication) the communication mode is switched at this time. As the candidate, the communication mode of the SU-MIMO (time division) or the MU-MIMO (simultaneous communication) is selected. In the MU-MIMO (simultaneous communication), it is required that the combination of terminal and antenna is obtained by the scheduler. In this example, it is assumed that the SU-MIMO (time division) is selected. It is supposed that when the number of simultaneous communication terminals decreases to 1, the throughput increases above a threshold 2. At this time, the communication mode is switched. At this time, the MU-SIMO (simultaneous communication) is selected. This switching of the communication mode has the effects of avoiding a situation where the excessive antenna resources are allocated to the terminal 107a in the SU-MIMO (time division) communication, reducing the computation processing amount on the communication between the base station apparatus 102 and the terminal 107a and reducing the power consumption by allocating less antennas.

In this way, the communication mode suitable for the increased or decreased number of simultaneous communication terminals is selected.

Figure 11:
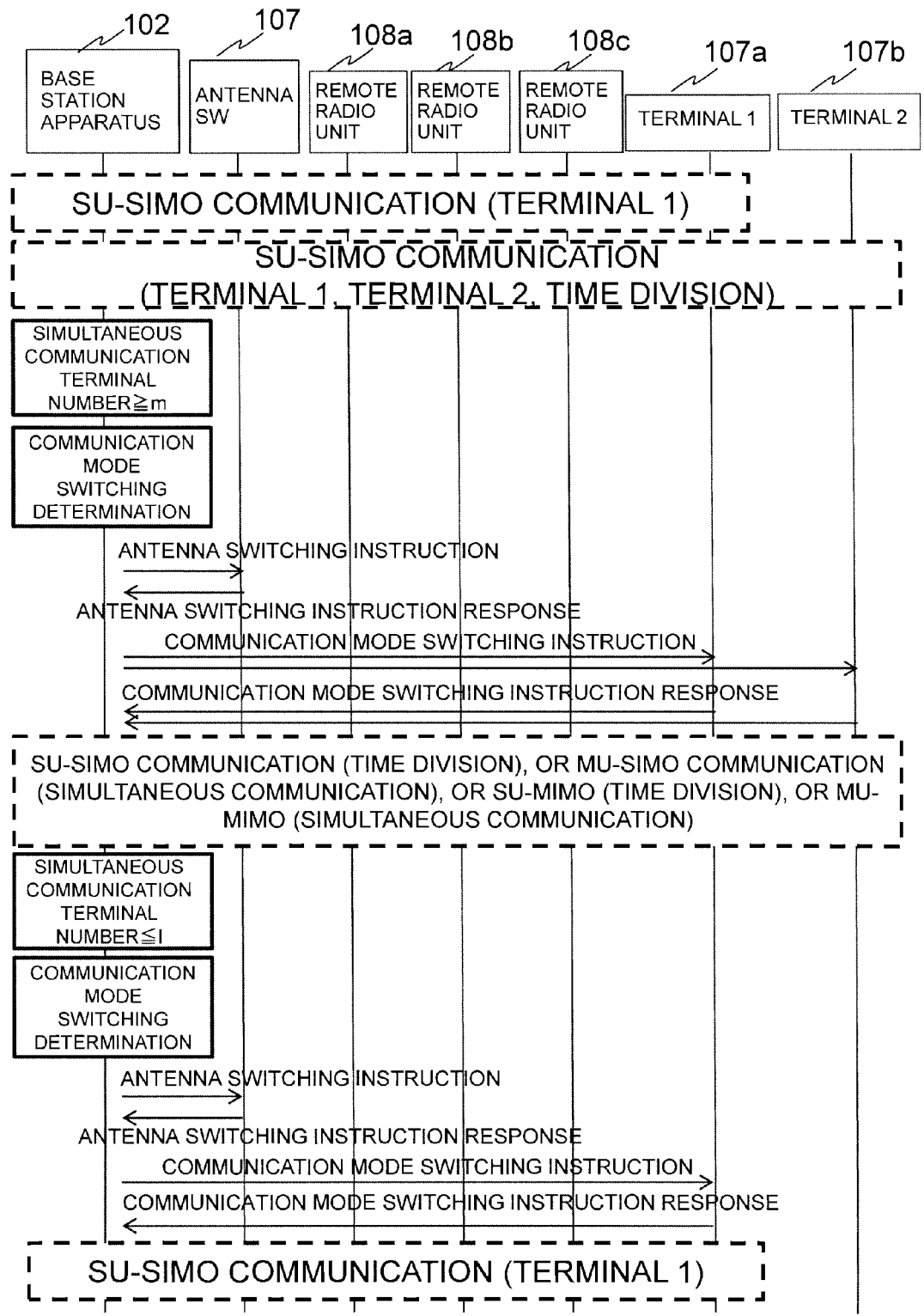
FIG. 11 is an explanatory view of a control sequence of switching the communication mode.

FIG. 11 is an explanatory view of a control sequence in switching the communication mode according to the embodiment of the invention. First of all, it is supposed that the terminal 107b joins in a situation where the terminal 107a makes the SU-SIMO communication with the base station apparatus 102, whereby the terminal 107a and the terminal 107b make the SU-SIMO communication (time division). In this way, it is assumed that the number of terminals accommodated in the SU-SIMO communication (time division) increases. In the base station apparatus 102, when the number of simultaneous communication terminals is at or above a threshold m, a communication mode switching determination process is performed to select anyone of the SU-SIMO (terminal time division), MU-SIMO (terminal simultaneous communication), SU-MIMO (terminal time division) and MU-MIMO (terminal simultaneous communication). Thereby, the required allocation of antennas is decided, and the base station apparatus 102 transmits a control signal of an antenna switching instruction to the antenna switch 109. As for the content of the antenna switching instruction, when the communication mode of the SU-MIMO (terminal time division) is selected for the terminal 107a and the terminal 107b, for example, the content of the antenna pattern 7 of FIG. 7 as the antenna pattern for making the MIMO communication between both terminals may be notified as the antenna connection pattern to the antenna switch 109.

The communication mode is not limited to the SU-SIMO (terminal time division), MU-SIMO (terminal simultaneous communication), SU-MIMO (terminal time division) and MU-MIMO (terminal simultaneous communication), but may be decided depending on a single user mode in which only one terminal makes the communication at a certain time, or a multi-user mode in which plural terminals make the simultaneous communication at a certain time, which one or more antennas of the distributed antenna are allocated to the transmitting and receiving antenna for the terminal, and which antenna of the terminal is allocated to the transmitting and receiving antenna.

In deciding the antenna number, in the case where the antenna number is decided from #1, #2, #3 and #4, for example, when the #1, #2 and #4 antennas satisfy the estimated throughput, the physically used antenna is decided. In a process for selecting the antenna ports for these three antennas, three ports are needed. Thus, for the antenna ports, on the premise that the number of ports already used in the communication is used continuously, when it is required that the number of ports is increased, the available ports are selected in ascending order of the port number. When the number of ports used is larger than the number of physical antennas newly decided, the antenna port having large port number is freed. Thereby, the connection pattern (antenna connection pattern) between the port and the physical antenna is decided.

The antenna switch 109 sets up the correspondence between the antennas #1 to #12 and the transmit and received signals of the antenna ports <1> to <8> of the base station apparatus 102 in accordance with the antenna connection pattern of the antenna switching instruction, and notifies the completion of the setting to the base station apparatus 102 with an antenna switching instruction response.

Next, the base station apparatus 102 notifies the selected communication mode to the terminal 107a and the terminal 107b with a control signal of the communication mode switching instruction. The terminal 107a and the terminal 107b notify the completion of communication mode switching to the base station apparatus 102 with a control signal of the communication mode switching instruction response, and make the communication in the selected communication mode (e.g., SU-MIMO (terminal time division) communication).

Subsequently, the base station apparatus 102, upon detecting that the number of simultaneous communication terminals is at or below the threshold 1, performs a communication mode switching determination process in the same manner to decide the antenna connection pattern accordingly. The base station apparatus 102 notifies the decided antenna connection pattern to the antenna switch 109 with a control signal of the antenna switching instruction, and the antenna switch 109, after completing the setting of the designated antenna connection pattern, reports the completion to the base station apparatus 102 with a control signal of the antenna switching instruction response. The base station apparatus 102 notifies the communication mode to the terminal 107a with a control signal of the communication mode switching instruction, and the terminal 107a notifies the completion of switching the communication mode to the base station apparatus 102 with a control signal of the communication mode switching instruction response.

In an example of FIG. 11, because the terminal 107b ceases making the communication, the SU-SIMO communication for only the terminal 107a is selected.

3. Apparatus

Figure 12:
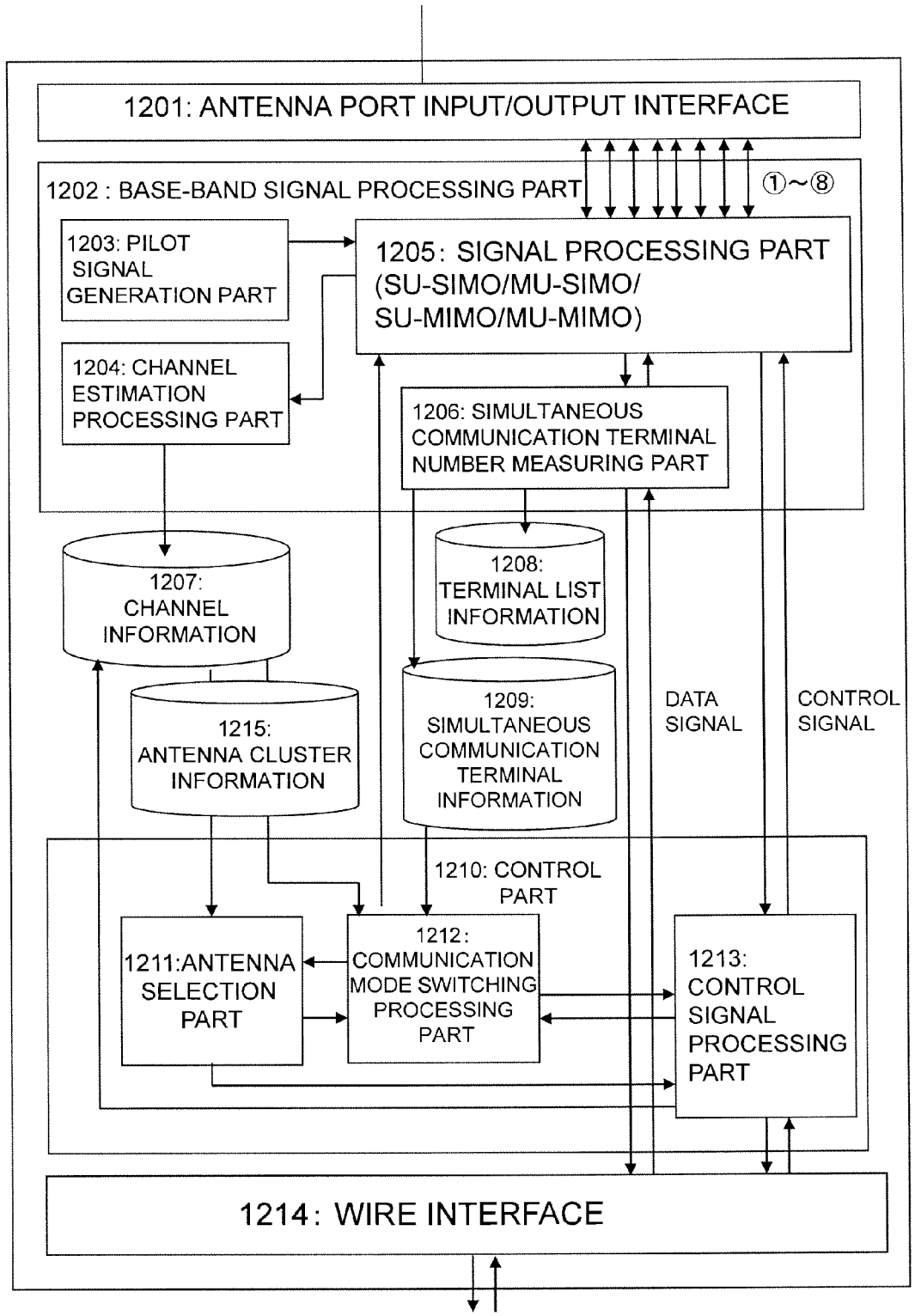
FIG. 12 is a configuration diagram of a base station apparatus according to the embodiment of the invention.

FIG. 12 is a configuration diagram of the base station apparatus 102 according to the embodiment of the invention. The base station apparatus 102 includes an antenna port input/output interface 1201, a base-band signal processing part 1202, a control part 1210, and a wire interface 1214.

In the antenna port input/output interface 1201, the signal conversion of the signals of eight antenna ports <1> to <8> is performed in accordance with the interface with the antenna switch 109. The received signal from the antenna switch 109 is converted from serial to parallel form and passed to a signal processing part 1205 of the base-band signal processing part 1203. The send signals of the antenna ports <1> to <8> from the signal processing part 1205 of the base-band signal processing part 1203 are multiplexed in the antenna port input/output interface 1201 and sent to the antenna switch 109.

The base-band signal processing part 1202 includes a pilot signal generation part 1203, a channel estimation processing part 1204, a signal processing part 1205, and a simultaneous communication terminal number measuring part 1206.

The pilot signal generation part 1203 generates a send signal known as for a terminal, thereby making it possible to estimate a radio propagation channel between the signal transmitted from the antenna and the terminal. By estimating the propagation channel, the received power between the antenna and the terminal can be measured. The pilot signal generated in the pilot signal generation part 1203 is passed to the signal processing part 1205 for making the signal processing of encoding and modulation according to the radio communication standard, and transmitted as the send signal.

Also, when the known pilot signal transmitted from the terminals 107a, 107b and 107c is received, the signal processing part 1205 performs the signal processing of demodulation and decoding according to the radio communication standard, in which the channel estimation processing part 1204 makes the channel estimation for the radio section from the terminal to the antenna, and the control part 1210 records the channel estimation result in the database of accessible channel information (or Channel State Information: CSI) 1209. Herein, the channel estimation is a process for transmitting the known pattern as the pilot signal on the transmission side, and receiving this signal to extract the channel information on what the phase and amplitude are in the radio propagation path between the transmitting and receiving antennas.

Also, antenna cluster information 1215 is held as the database.

FIG. 25 is an explanatory view of SIMO/MIMO antenna candidate selection using the pilot signal from the terminal. Also, FIG. 37 is an explanatory view of the antenna cluster information in the base station apparatus according to the embodiment of the invention.

The above antenna cluster information is generated by the method as described in connection with FIG. 25. A method for extracting the antenna cluster will be described later. Also, the antenna cluster information 1215 has a data structure as shown in FIG. 37. For example, the antenna cluster A is a group of antennas #1, #2, #3 and #4. In the examples of FIGS. 25 and 37, since the antennas in which the received power of the pilot signal transmitted by the terminal 107*a* is at or above the threshold are antennas #1, #2, #3 and #4, the antenna cluster A is generated. When the other terminal 107*b* corresponds to the antenna cluster B, for example, it is meant that the antennas #2, #3 and #4 are effective antennas.

The signal processing part 1205 is a block for making the signal processing according to the radio communication standard, making the encoding and modulation process for the send signal, and making the demodulation and decoding process for the received signal. Also, the SU-SIMO communication, MU-SIMO communication, SU-MIMO communication and MU-MIMO communication are switched based on the determination result of a communication mode switching processing part 1212 in the control part 1210, in making the communication. At this time, the input/output relationship of the antenna ports <1> to <8> is decided in accordance with the antenna connection pattern selected by an antenna selection part 1211 and the communication mode switching processing part 1212, whereby the signal processing in the SIMO communication or MIMO communication is performed using the antenna port in accordance with its connection pattern. The signal processing part 1205 obtains an antenna connection pattern representing the correspondence between the antenna port allocated to each terminal and the antenna of the remote radio unit in accordance with one or more antennas for use selected in the antenna selection part 1211 and the communication mode switching processing part 1212, the number of antennas, and the communication mode. Also, in the SU-SIMO communication (time division) or SU-MIMO communication (time division), the transmit or received signal is processed in time division with a time slot decided for each terminal. In the MU-SIMO communication (simultaneous communication) or MU-MIMO communication (simultaneous communication), the signal processing is performed in accordance with a combination of terminals to make the simultaneous communication, inputting or outputting the signal into or from the antenna ports <1> to <8>. Also, the signal processing part 1205 notifies the antenna connection pattern via the antenna port input/output interface 1201 to the antenna switch 109. A way of obtaining the antenna connection pattern in each communication mode is as shown in FIGS. 5 and 7, whereby the antenna connection pattern can be appropriately obtained dynamically or using the predetermined data in accordance with the number of antennas for use and the communication mode.

The simultaneous communication terminal measuring part 1206 measures the number of terminals making the simultaneous communication, and records the measurement result in the terminal list information 1208, recording the simultaneous communication terminal ID and the uplink and downlink throughput information in the simultaneous communication terminal information 1209 at fixed cycle intervals.

The control part 1210 includes the antenna selection part 1211, the communication mode switching processing part 1212, and a control signal processing part 1213.

The antenna selection part 1211 selects the candidate of the optimal antenna for each terminal as the antenna cluster from the channel information 1207 with a request of the communication mode switching processing part 1212 as a trigger, and notifies it to the communication mode switching processing part 1212.

The communication mode switching processing part 1212 selects which communication mode of the SU-SIMO communication, MU-SIMO communication, SU-MIMO communication and MU-MIMO communication is optimal from the simultaneous communication terminal information 1209 and the channel information 1207. The communication mode switching processing part 1212 notifies an antenna selection request to the antenna selection part 1211. Also, the communication mode switching processing part 1212, in deciding each communication mode, computes the estimated throughput of the terminal, based on the antenna cluster information decided in the antenna selection part 1211, and decides the communication mode (including the antennas for use and/or the number of antennas) in which the estimated throughput satisfies the requested throughput. It notifies the selected communication mode to the control signal processing part 1213, and notifies the decided communication mode to the terminal with a control signal of the communication mode switching instruction. The control signal processing part 1213, upon detecting that a communication mode switching instruction response is received from the terminal, notifies the communication mode switching processing part 1212 to set up the selected communication mode (including the antennas for use and/or the number of antennas) in the signal processing part 1205.

The control signal processing part 1213 generates or interprets a control signal for enabling the base station apparatus 102 to make a protocol process for the terminal or other node with the control signal.

The wire interface 1214 performs the signal processing for the wire interface with the high speed back-hole line terminating unit 101. For example, when the Ethernet line is employed, a send and receive signal processing for the Ethernet signal is performed.

Figure 27:
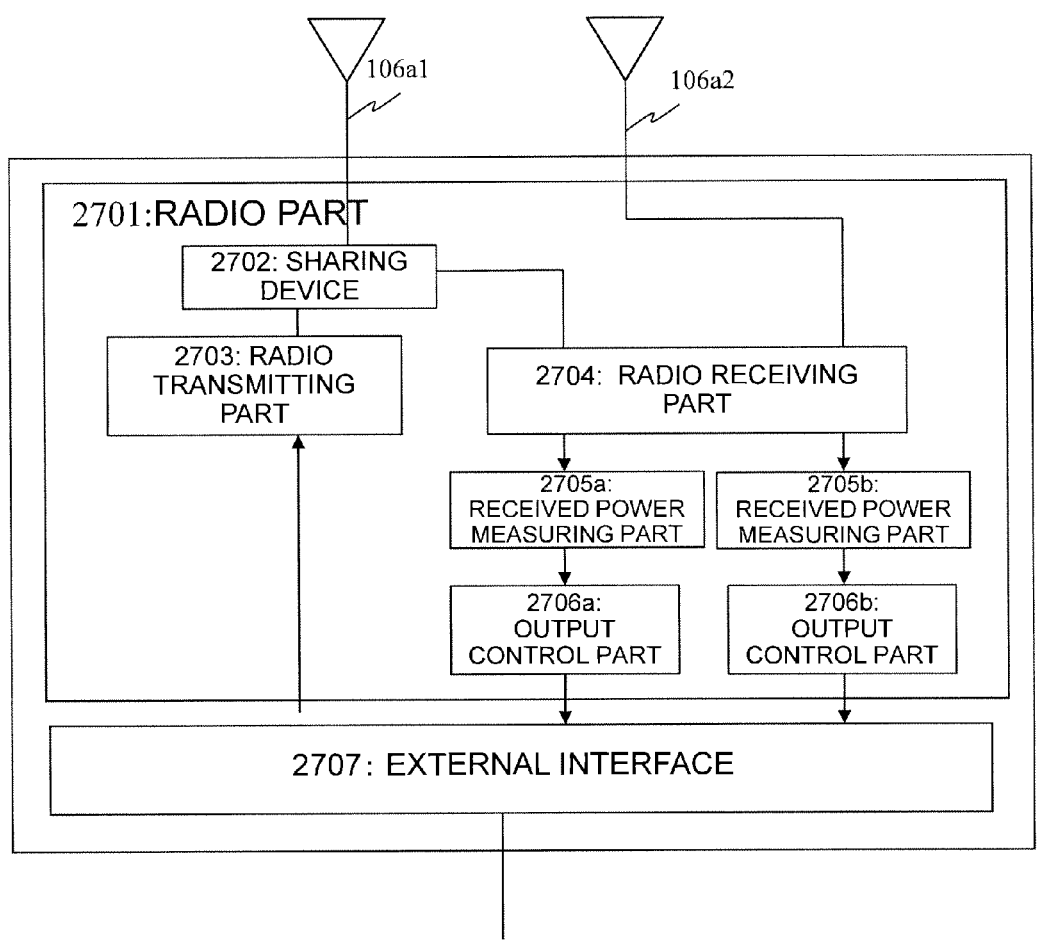
FIG. 27 is a configuration diagram of the remote radio unit according to the embodiment of the invention.

FIG. 27 is a configuration diagram of the remote radio unit 108*a* according to the embodiment of the invention.

The remote radio unit 108*a* includes one or more antennas 106*a*1, 106*a*2, a radio part 2701, and an external interface 2702. The radio part 2701 includes a sharing device 2702, a radio transmitting part 2703, a radio receiving part 2704, the received power measuring parts 2705*a*, 2705*b*, and the output control parts 2706*a*, 2706*b*.

The sharing device 2702 shares one antenna for the transmitting antenna and the receiving antenna to make the transmission and reception simultaneously, and electrically isolates the transmitting path and the receiving path, to prevent the transmitting wave from flowing into a receiver and disturbing the reception. The sharing device may be provided on the side of the antenna 106*a*2, or the sharing device may not be provided for the antenna 106*a*1 or 106*a*2 but be connected to either the radio transmitting part or radio receiving part.

The radio transmitting part 2703 converts a digital signal outputted from the external interface 2705 into an analog signal (D/A conversion), makes the conversion of the frequency band and the power amplification, and outputs the analog signal to the sharing device 2702.

The radio receiving part 2704 performs a filtering process for the received signal from the antenna 106a1, 106a2, converts it into an analog signal in the base-band, then converts it into a digital signal (A/D conversion), and outputs it to the external interface 2705.

The received power measuring parts 2705a, 2705b are employed to suppress the useless output buried in the noise, as described in connection with FIG. 6. The output control parts 2706a, 2706b provide the control to inhibit the output to the base station apparatus, when the measurement result of the received power measuring part 2705a, 2706b is at or below the threshold, as described in connection with FIG. 6. Though in the embodiment of FIG. 27, the received power measuring parts 2705a, 2705b and the output control parts 2706a, 2706b have been described, these functions may not be provided.

The external interface 2705 makes the transmission/reception in accordance with a communication interface with the DAS child machine 104a. Other than the DAS child machine 104a, it is possible to directly communicate with the antenna switch 109 or the base station apparatus 102, whereby the external interface 2705 makes the signal conversion in accordance with the interface with the associated device. Also, in an OFDM communication method, since the base-band send signal has the swollen information amount through an IFFT process, the IFFT process may be performed in the external interface 2705 to have the base-band signal before the IFFT as an opening into the external interface 2705. For the base-band received signal, the FFT is performed in the external interface 2705, and the base-band signal processing following the FFT is performed in the base station apparatus 102, whereby the communication amount up to the remote radio unit 108 can be reduced.

Figure 28:
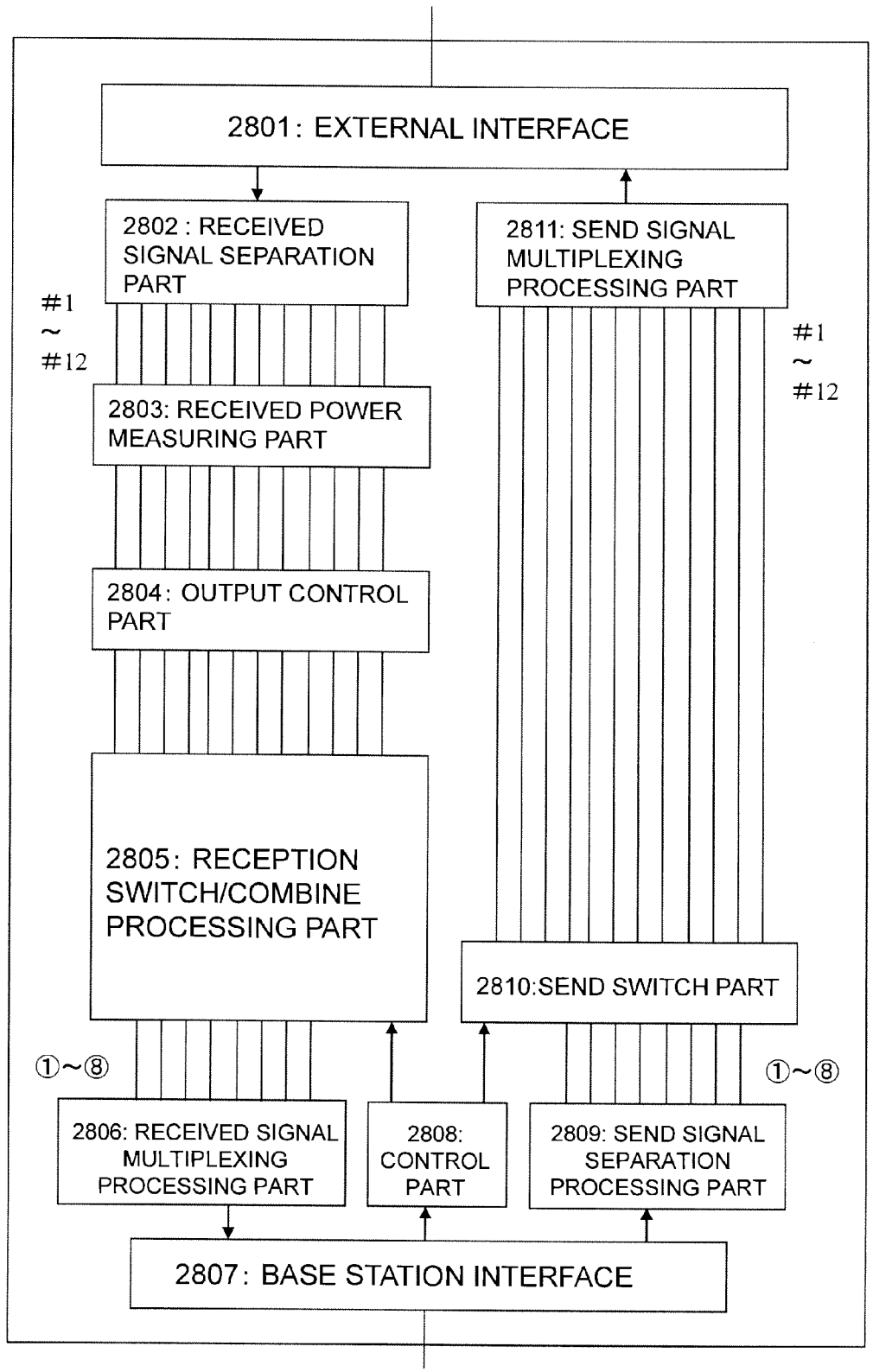
FIG. 28 is a configuration diagram of an antenna switch according to the embodiment of the invention.

FIG. 28 is a configuration diagram of the antenna switch 109 according to the embodiment of the invention.

The antenna switch 109 includes an external interface 2801, a received signal separating part 2802, a received power measuring part 2803, an output control part 2804, a reception switch/combine processing part 2805, a received signal multiplexing processing part 2806, a base station interface 2807, a control part 2808, a send signal separation processing part 2809, a send switch part 2810, and a send signal multiplexing processing part 2811.

The external interface 2801 makes the signal conversion in accordance with an interface with the DAS parent machine 103. The received signal separation part 2802 separates the received signal into signals of all the antennas connectable to the outside by performing the serial-to-parallel conversion for the received signal.

The received power measuring part 2803 and the output control part 2804 have a received power measuring function and an output control function within the antenna switch as described in connection with FIG. 6, realizing a function of not outputting the signal from the unnecessary antenna.

The reception switch/combine processing part 2805 performs a process for associating the received signals of the antennas #1 to #12 with the antenna port <1> to <8> of the base station apparatus 102 in accordance with the antenna connection pattern, as described in connection with FIGS. 5 and 7. The signals between the antennas mapped onto the same antenna port are added to make the maximum ratio combine.

The base station interface 2807 performs the signal conversion in accordance with the external interface of the base station apparatus 102.

The control part 2808 receives the antenna connection pattern from the base station apparatus 102 via the base station interface 2807. The control part 2808, upon receiving a control signal of the antenna switching instruction as shown in FIG. 11, performs a control signal process for setting the antenna connection pattern in the reception switch/combine processing part 2805 and the send switch part 2810, and returning an antenna switching instruction response to the base station apparatus 102.

The send signal separation part 2809 separates the signal from the base station interface 2807 into the signals of the antenna ports <1> to <8> of the base station apparatus 102 by performing the serial-to-parallel conversion.

The send switch part 2810 performs a process for passing the send signal of the antenna port <1> to <8> in the base station apparatus 102 to the antennas #1 to #12 in accordance with the antenna connection pattern as described in connection with FIGS. 5 and 7.

The send signal multiplexing processing part 2811 performs a parallel-to-serial conversion process to pass the signals of the antennas #1 to #12 to the external interface 2801.

Figure 29:
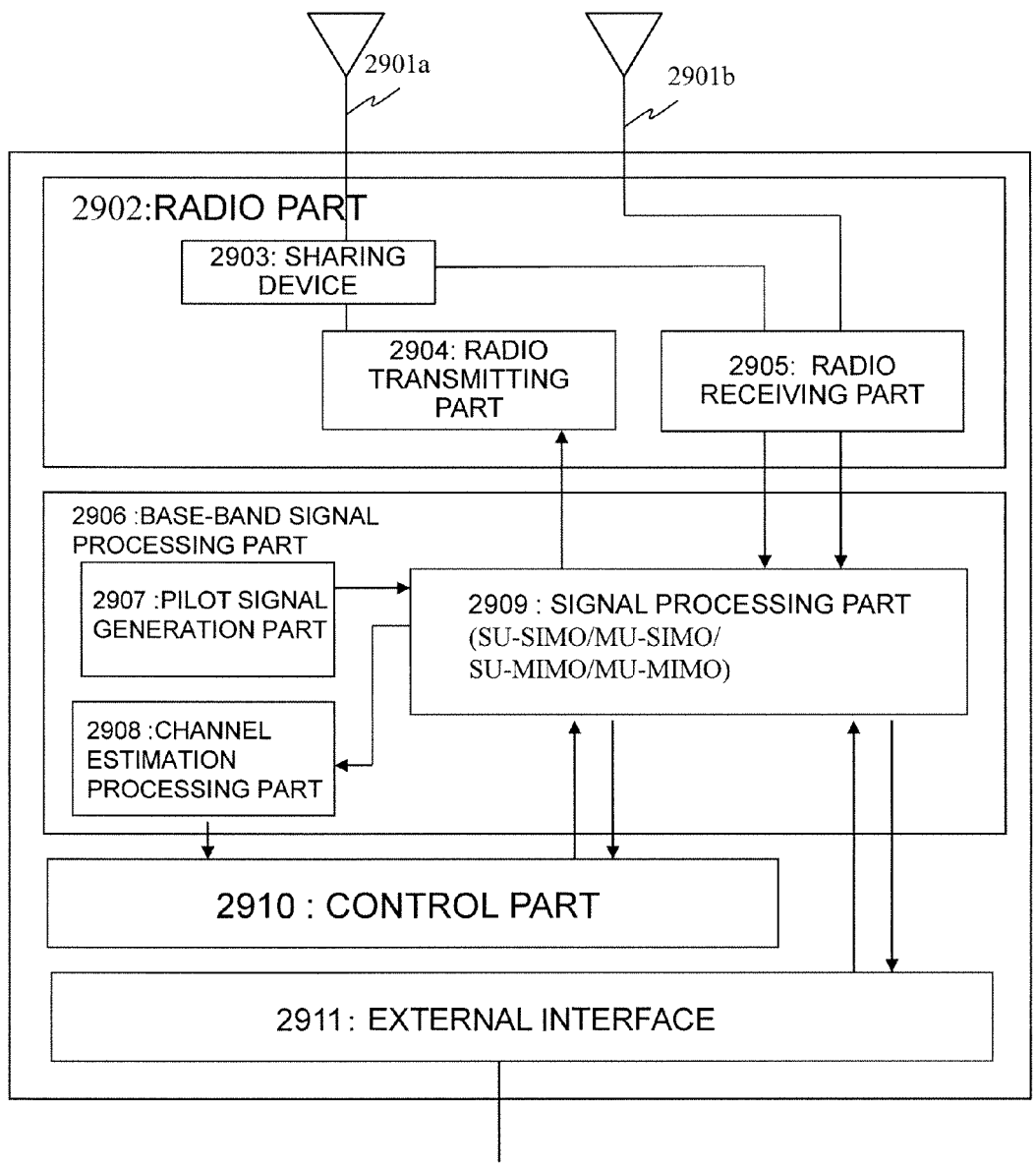
FIG. 29 is a configuration diagram of a terminal according to the embodiment of the invention.

FIG. 29 is a configuration diagram of the terminal unit 107a according to the embodiment of the invention.

The terminal unit 107a includes the antennas 2901a, 2901b, a radio part 2902, a base-band signal processing part 2906, a control part 2910, and an external interface 2911.

The radio part 2910 includes a sharing device 2903, a radio transmitting part 2904, and a radio receiving part 2905. They have the same functions as the sharing device 2702, the radio transmitting part 2703, and the radio receiving part 2704 as described in the remote radio unit of FIG. 27.

The base-band signal processing part 2906 includes a pilot signal generation part 2907, a channel estimation processing part 2908, and a signal processing part 2909. They have the same functions as the pilot signal generation part 1203, the channel estimation processing part 1204, and the signal processing part 1205 as described in connection with FIG. 12.

The control part 2910 performs a protocol process for the control message.

The external interface 2911 provides the interface for making the data communication with the externally connected apparatus. In the case of a mobile router, the personal computer connection is enabled by the Ethernet (registered trademark) connection.

4. Operation 4-1. Simultaneous Communication Terminal Number Measuring Part 1206

Figure 13:
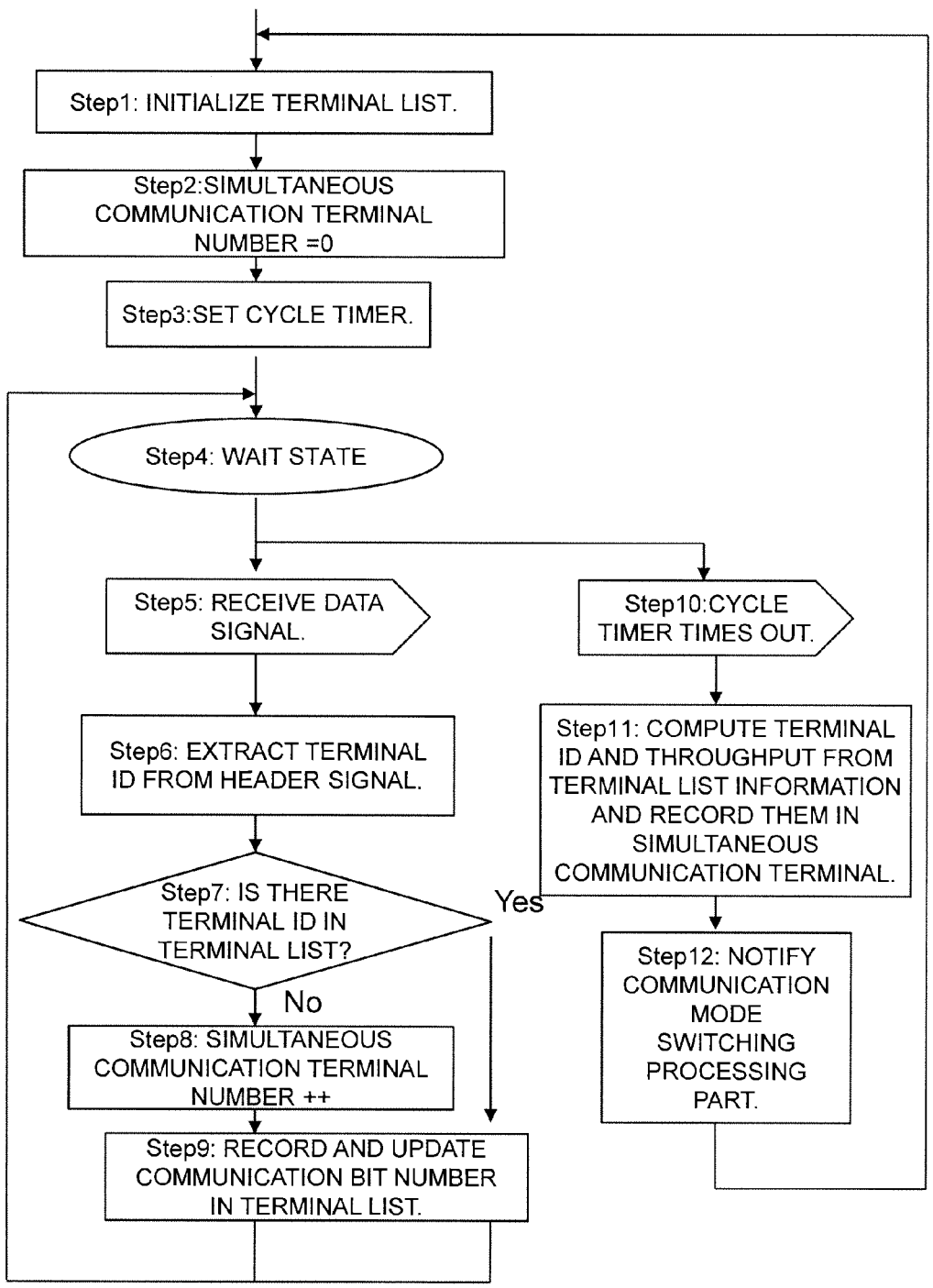
FIG. 13 is an explanatory view of the algorithm for a simultaneous communication terminal number measuring part in the base station apparatus according to the embodiment of the invention.

FIG. 13 is an explanatory view of the algorithm for the simultaneous communication terminal number measuring part 1206 in the base station apparatus 102 according to the embodiment of the invention. The simultaneous communication terminal number measuring part 1206 has a function of measuring the number of terminals making the simultaneous communication at fixed cycle intervals. It produces a terminal list of counting the terminals in a fixed cycle, and updating the terminal list in the simultaneous communication terminal information 1210 (the details of the terminal list will be described later in connection with FIG. 14). This process is performed by the simultaneous communication terminal number measuring part 1206.

First of all, the terminal list is initialized (Step 1). Then, the simultaneous communication terminal number is initialized to 0 (Step 2). The timer value of a cycle timer is set up (Step 3), and the operation is put in a wait state (Step 4).

When the data signal is received in the wait state (Step 5), the terminal ID stored in a header signal of the data signal is extracted (Step 6).

It is checked whether or not the information of the extracted terminal ID is recorded in the terminal list (Step 7).

When the terminal ID is not recorded in the terminal list, the number of simultaneous communication terminals is incremented by one because of the new simultaneous communication terminal (Step 8). When the terminal ID is already recorded in the terminal list, the operation goes to Step 9 to discriminate whether the communication is uplink or downlink, and update the total number of uplink communication bits and the total number of downlink communication bits in the terminal list (Step 9).

And the operation returns to the wait state at Step 4.

When the cycle timer times out in the wait state (Step 10), the uplink and downlink throughputs are computed from the terminal ID recorded in the terminal list by dividing the number of uplink communication bits and the number of downlink communication bits by the interval of the cycle timer, and recorded in the simultaneous communication terminal information 1209 (Step 11).

Each information of the simultaneous communication terminal information 1209 is notified to the communication mode switching processing part 1212 (Step 12).

And the operation returns to Step 1.

The simultaneous communication terminal number has the maximum number that is the number of terminals for which the terminal 107 has established the communication session in a calling process of the base station apparatus 102. Though an example of counting the number of actually communicating terminals among the terminals having established the communication session at a fixed cycle is shown in FIG. 13, there is another form of counting the number of simultaneous communication terminals in a protocol process for establishing the communication session.

FIG. 14 (1) is an explanatory view of the terminal list information 1208 for the base station apparatus 102 according to the embodiment of the invention. The terminal list information 1208 includes the terminal ID, and the elements of the number of uplink communication bits and the number of downlink communication bits. The terminal list information 1208 is reset at a fixed cycle as described in connection with FIG. 13, in which the ID of actually communicating terminal, and the values of measuring the number of uplink and downlink communication bits are recorded. At the time when the cycle timer times out, the information is updated to the simultaneous communication terminal information 1209, the terminal list information 1208 is initialized again, and the measurement results are recorded.

FIG. 14 (2) is an explanatory view of the simultaneous communication terminal information 1209 for the base station apparatus 102 according to the embodiment of the invention. The simultaneous communication terminal information 1209 has the terminal ID and the information elements of a throughput mean value, a throughput request value, and an update flag for each of the uplink communication and the downlink communication.

For example, the number of uplink communication bits for the terminal ID 1001 is 100 kbit in the terminal list information 1208 of FIG. 14 (1), but when the interval of the cycle timer is one second, the throughput becomes 100 kbps. This throughput of 100 kbps is updated to the uplink throughput mean value. The latest flag of the uplink update flag is set to 1. Herein, the uplink update flag indicates a data update situation for N times (N=4 in an example of FIG. 14 (2)) in the past. In the terminal list information 1208 of FIG. 14 (1), there are the uplink and downlink communication amounts for the terminal IDs of 1001, 1002 and 1005, whereby as the information here the update flag is set to 1. A history of the update flag up to the previous time is left, in which the terminal with the terminal ID of 1003 had the uplink communication at the previous cycle in this example. For the update flag, the most significant bit indicates the latest value. For example, when the update flag is 0101, the latest update flag is 0, and the flag updated one time before is 1.

The terminal ID in which this update flag is set at least once in the past N times is counted as the simultaneous communication terminal number. In an example of FIG. 14 (2), the number of uplink simultaneous communication terminals is 4 with the terminal ID of 1001, 1002, 1003 and 1005. The number of downlink simultaneous communication terminals is 3 with the terminal ID of 1001, 1002 and 1005.

4-2. Communication Mode Switching Processing Part 1212

Figure 15:
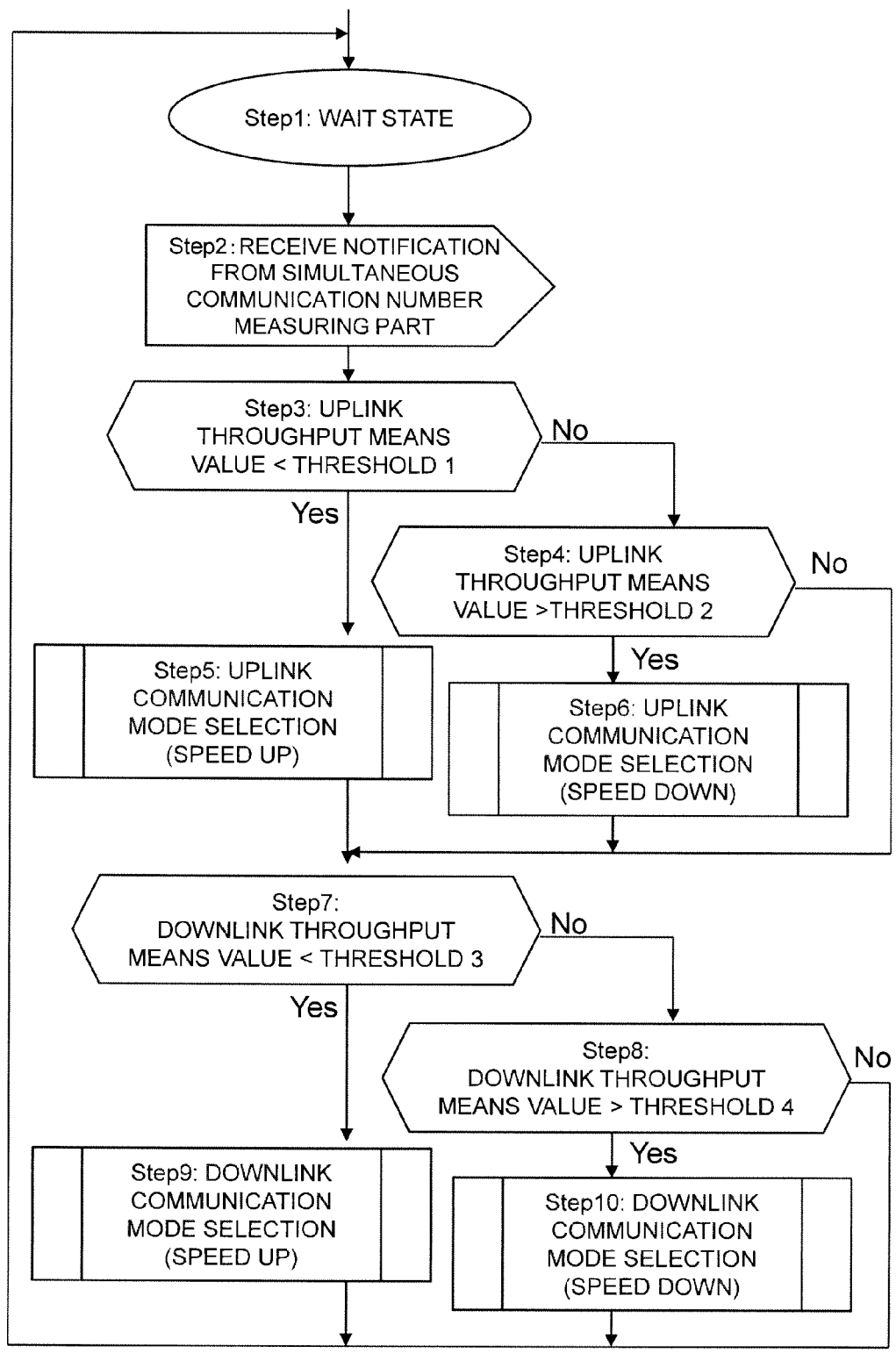
FIG. 15 is an explanatory view of the algorithm for a communication mode switching processing part in the base station apparatus according to the embodiment of the invention.

FIG. 15 is an explanatory view of the algorithm for the communication mode switching processing part 1212 in the base station apparatus 102 according to the embodiment of the invention. This process is performed by the communication mode switching processing part 1212.

In a wait state at Step 1, notification of each information of the simultaneous communication terminal information 1209 is received from the simultaneous communication terminal number measuring part 1206 (Step 2).

It is checked whether or not there is any terminal in which the uplink throughput mean value is smaller than a threshold 1 (Step 3).

When there is at least one terminal in which the uplink throughput mean value is smaller than the threshold 1, the operation goes to Step 5, or otherwise goes to Step 4. At Step 5, trying to make the uplink communication throughput the request speed or more, the optimal communication mode is selected by the communication mode (SU-SIMO/MU-SIMO/SU-MIMO/MU-MIMO) selection as will be described later in connection with FIG. 30, and the operation goes to Step 7.

At Step 4, it is checked whether or not there is any terminal in which the uplink throughput mean value is larger than a threshold 2 of uplink throughput. When there is at least one terminal in which the uplink throughput mean value is larger than the threshold 2, the operation goes to Step 6, or otherwise goes to Step 7.

At Step 6, trying to make the uplink communication throughput about the request speed because of being excessive, the optimal communication mode is selected by the communication mode (SU-SIMO/MU-SIMO/SU-MIMO/MU-MIMO) selection as will be described later in connection with FIG. 31, and the operation goes to Step 7.

At Step 7, it is checked whether or not there is any terminal in which the downlink throughput mean value is smaller than a threshold 3 of downlink throughput.

When there is at least one terminal in which the downlink throughput mean value is smaller than the threshold 3, the operation goes to Step 9, or otherwise goes to Step 8.

At Step 9, trying to make the downlink communication throughput the request speed or more, the optimal communication mode is selected by selecting (speed Up) the communication mode (SU-SIMO/MU-SIMO/SU-MIMO/MU-MIMO) as will be described later in connection with FIG. 30, and the operation returns to Step 1.

At Step 8, it is checked whether or not there is any terminal in which the downlink throughput mean value is larger than a threshold 4 of downlink throughput.

When there is at least one terminal in which the downlink throughput mean value is larger than the threshold 4, the operation goes to Step 10, or otherwise returns to Step 1.

At Step 10, trying to make the downlink communication throughput about the request speed because of being excessive, the optimal communication mode is selected by the communication mode (SU-SIMO/MU-SIMO/SU-MIMO/MU-MIMO) selection (speed Down) as will be described later in connection with FIG. 31, and the operation returns to Step 1.

Herein, when the threshold 1 is set to the request value of throughput, it is supposed that the lower value than the request value is set, but the higher value than the request value may be set.

Similarly, when the threshold 2 is set to the request value of throughput, it is supposed that the higher value than the request value is set, but the lower value than the request value may be set.

Similarly, when the threshold 3 is set to the request value of throughput, it is supposed that the lower value than the request value is set, but the higher value than the request value may be set.

Similarly, when the threshold 4 is set to the request value of throughput, it is supposed that the higher value than the request value is set, but the lower value than the request value may be set.

Figure 30:
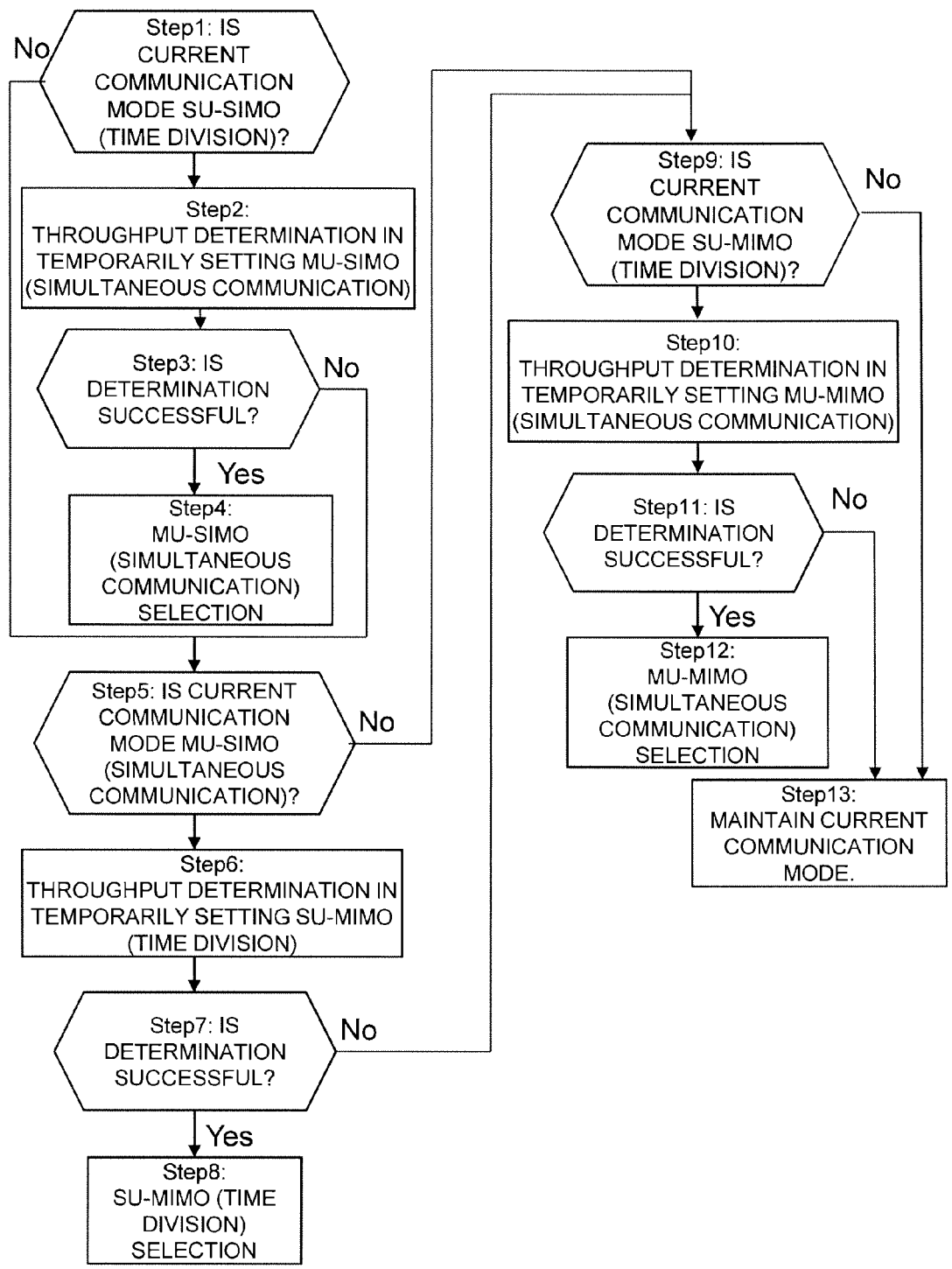
FIG. 30 is an explanatory view of a selection (speed UP) algorithm of SU-SIMO/MU-SIMO/SU-MIMO/MU-MIMO communication mode for the communication mode switching processing part in the base station apparatus according to the embodiment of the invention.

FIG. 30 shows a selection algorithm of communication mode (SU-SIMO/MU-SIMO/SU-MIMO/MU-MIMO) when the throughput does not satisfy the request speed in the communication mode switching processing part 1212 of the base station apparatus 102 according to the embodiment of the invention. This process is performed by the communication mode switching processing part 1212.

In this algorithm, when the request speed is not satisfied in the current communication mode, the estimated throughput is obtained in the communication mode expected to have the higher throughput than in the current communication mode, and the communication mode in which the estimated throughput can satisfy the request speed is selected.

First of all, at Step 1, it is checked whether or not the current communication mode is SU-SIMO (time division). When the communication mode is SU-SIMO (time division), the operation goes to Step 2, or otherwise goes to Step 5.

Figure 22:
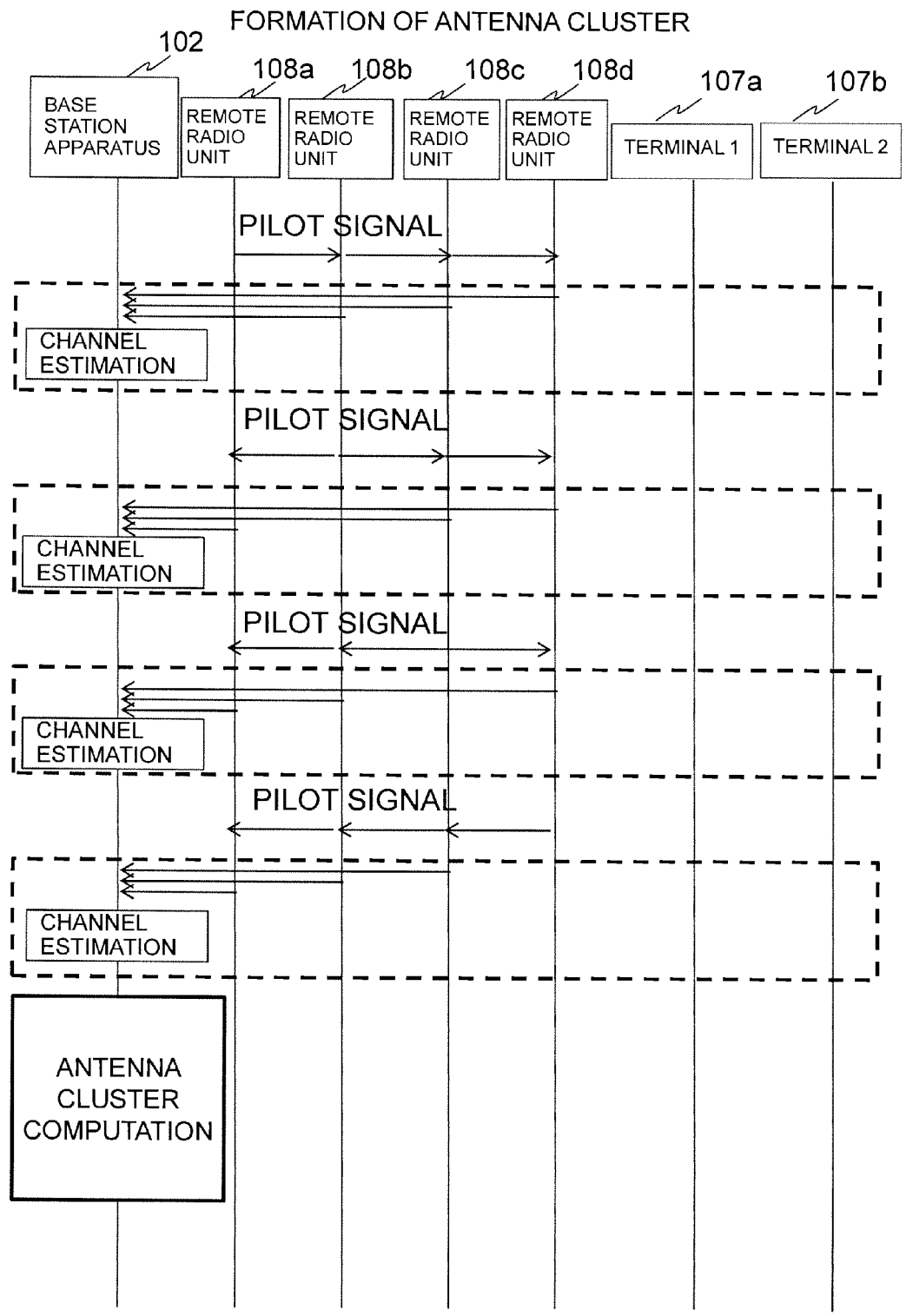
FIG. 22 is an explanatory view of an control sequence for collecting channel information between antennas in the remote radio unit for antenna cluster computation according to the embodiment of the invention.

At Step 2, the communication mode is temporarily set to MU-SIMO (simultaneous communication), the selection determination process for the MU-SIMO (simultaneous communication) as will be described later in connection with FIG. 22 is performed, and the operation goes to Step 3.

At Step 3, when the determination result of MU-SIMO (simultaneous communication) at Step 2 is successful, the operation goes to Step 4, or when the determination result is unsuccessful, the operation goes to Step 5.

At Step 4, the communication mode of MU-SIMO (simultaneous communication) is selected.

At Step 5, it is checked whether or not the current communication mode is MU-SIMO (simultaneous communication). When the communication mode is MU-SIMO (simultaneous communication), the operation goes to Step 6, or otherwise goes to Step 9.

Figure 34:
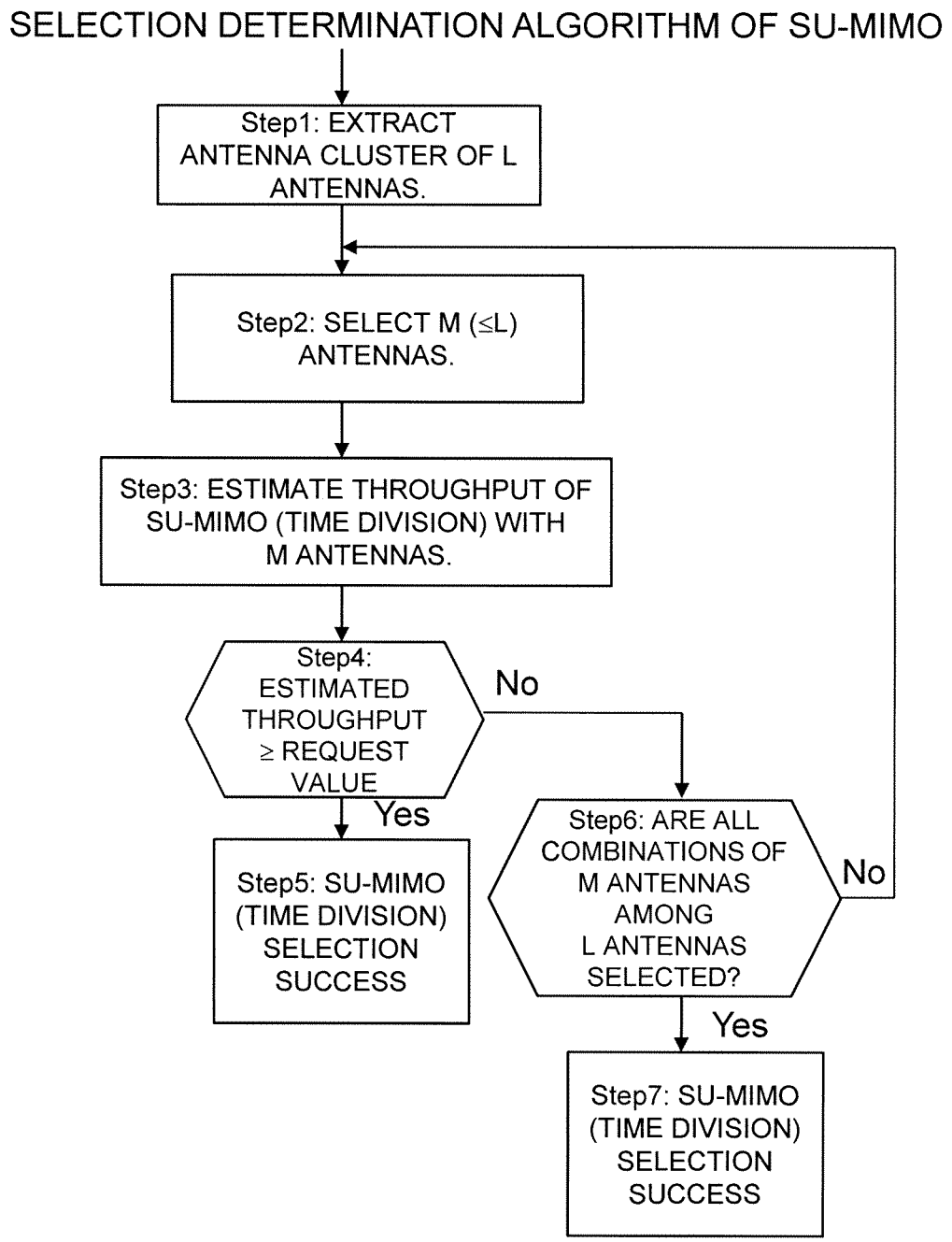
FIG. 34 shows the algorithm of an SU-MIMO determination process for the communication mode switching processing part in the base station apparatus according to the embodiment of the invention.

At Step 6, the communication mode is temporarily set to SU-MIMO (time division), the selection determination process for the SU-MIMO (time division) as will be described later in connection with FIG. 34 is performed, and the operation goes to Step 7.

At Step 7, when the determination result of SU-MIMO (time division) at Step 6 is successful, the operation goes to Step 8, or otherwise goes to Step 9.

At Step 8, the communication mode of SU-MIMO (time division) is selected.

At Step 9, it is checked whether or not the current communication mode is SU-MIMO (time division). When the communication mode is SU-MIMO (time division), the operation goes to Step 13, or otherwise goes to Step 10.

Figure 35:
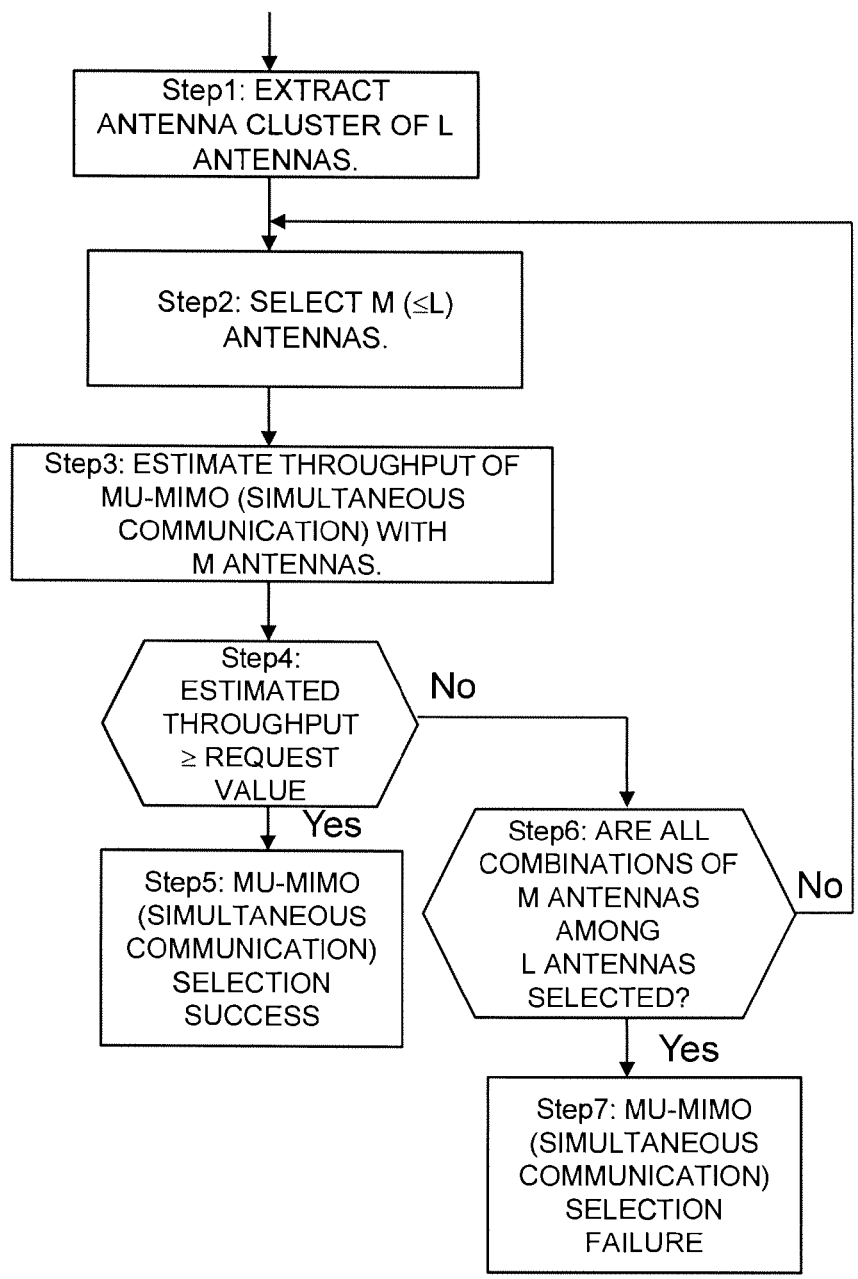
FIG. 35 shows the algorithm of an MU-MIMO determination process for the communication mode switching processing part in the base station apparatus according to the embodiment of the invention.

At Step 10, the communication mode is temporarily set to MU-MIMO (simultaneous communication), the selection determination process for the MU-MIMO (simultaneous communication) as will be described later in connection with FIG. 35 is performed, and the operation goes to Step 11.

At Step 11, when the determination result of MU-MIMO (simultaneous communication) at Step 10 is successful, the operation goes to Step 12, or otherwise goes to Step 13.

At Step 12, the communication mode of MU-MIMO (simultaneous communication) is selected.

At Step 13, the current communication mode is continued without being processed.

The communication mode switching processing part 1212 notifies the selected communication mode and an antenna selection request in its communication mode to the antenna selection part 1211, when the communication mode is selected at each of Steps 4, 8 and 12.

Figure 31:
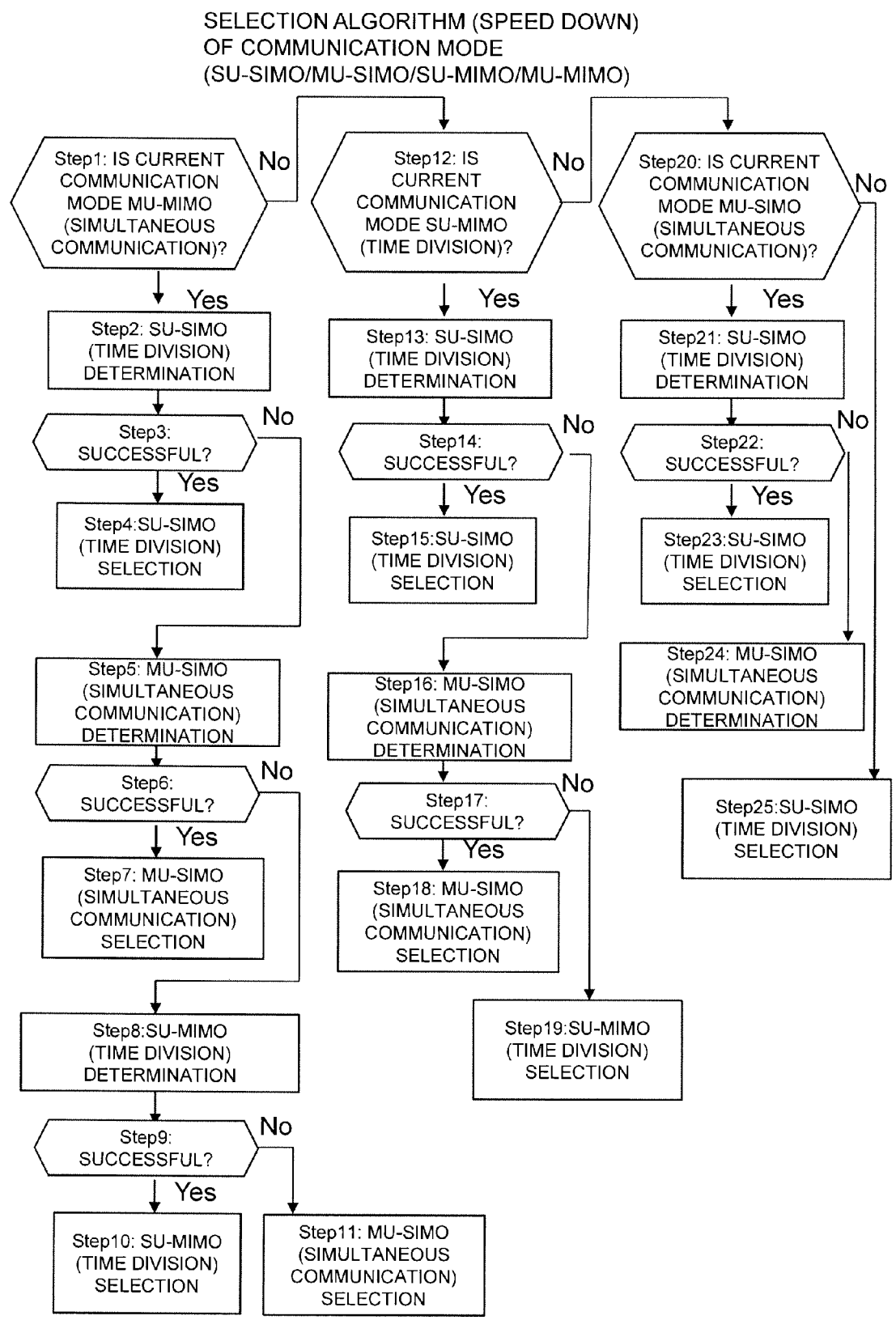
FIG. 31 is an explanatory view of a selection (speed Down) algorithm of SU-SIMO/MU-SIMO/SU-MIMO/MU-MIMO communication mode for the communication mode switching processing part in the base station apparatus according to the embodiment of the invention.

FIG. 31 shows a selection algorithm of communication mode (SU-SIMO/MU-SIMO/SU-MIMO/MU-MIMO) of about the request speed when the throughput is higher (or much higher) than the request speed in the communication mode switching processing part 1212 of the base station apparatus 102 according to the embodiment of the invention. This process is performed by the communication mode switching processing part 1212.

First of all, at Step 1, it is checked whether or not the current communication mode is MU-MIMO (simultaneous communication). When the communication mode is MU-MIMO (simultaneous communication), the operation goes to Step 2, or otherwise goes to Step 12.

Figure 32:
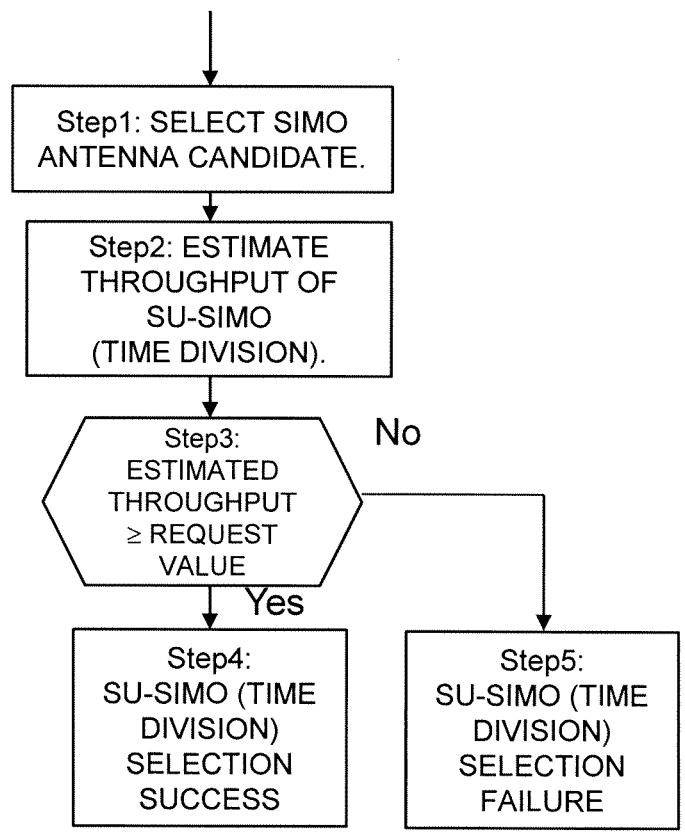
FIG. 32 shows the algorithm of an SU-SIMO determination process for the communication mode switching processing part in the base station apparatus according to the embodiment of the invention.

At Step 2, the selection determination process for the SU-SIMO (time division) as will be described later in connection with FIG. 32 is performed, and the operation goes to Step 3.

At Step 3, when the determination result of SU-SIMO (time division) at Step 2 is successful, the operation goes to Step 4, or otherwise goes to Step 5.

At Step 4, the communication mode of SU-SIMO (time division) is selected.

Figure 33:
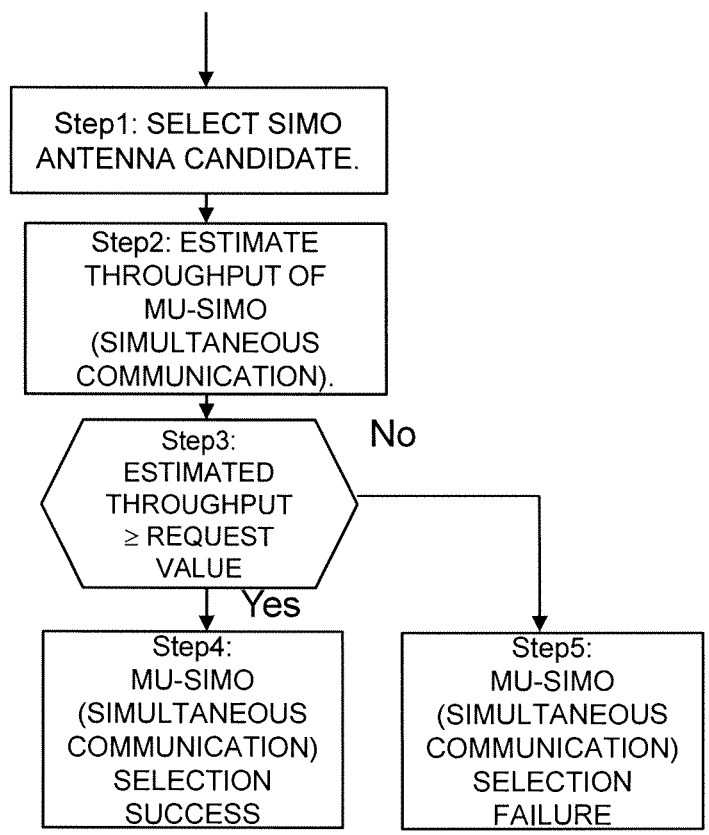
FIG. 33 shows the algorithm of an MU-SIMO determination process for the communication mode switching processing part in the base station apparatus according to the embodiment of the invention.

At Step 5, the selection determination process for the MU-SIMO (simultaneous communication) as will be described later in connection with FIG. 33 is performed, and the operation goes to Step 6.

At Step 6, when the determination result of MU-SIMO (simultaneous communication) at Step 5 is successful, the operation goes to Step 7, or otherwise goes to Step 8.

At Step 7, the communication mode of MU-SIMO (simultaneous communication) is selected.

At Step 8, the selection determination process for the SU-MIMO (time division) as will be described later in connection with FIG. 34 is performed, and the operation goes to Step 9.

At Step 9, when the determination result of SU-MIMO (time division) at Step 8 is successful, the operation goes to Step 10, or otherwise goes to Step 11.

At Step 10, the communication mode of SU-MIMO (time division) is selected.

At Step 11, the communication mode of MU-SIMO (simultaneous communication) is selected.

At Step 12, it is checked whether or not the current communication mode is SU-MIMO (time division). When the communication mode is SU-MIMO (time division), the operation goes to Step 13, or otherwise goes to Step 20.

At Step 13, the selection determination process for the SU-SIMO (time division) as will be described later in connection with FIG. 32 is performed, and the operation goes to Step 14.

At Step 14, when the determination result of SU-SIMO (time division) at Step 13 is successful, the operation goes to Step 15, or otherwise goes to Step 16.

At Step 16, the selection determination process for the MU-SIMO (simultaneous communication) as will be described later in connection with FIG. 33 is performed, and the operation goes to Step 17.

At Step 17, when the determination result of MU-SIMO (simultaneous communication) at Step 16 is successful, the operation goes to Step 18, or otherwise goes to Step 19.

At Step 18, the communication mode of MU-SIMO (simultaneous communication) is selected.

At Step 19, the communication mode of SU-MIMO (time division) is selected.

At Step 20, it is checked whether or not the current communication mode is MU-SIMO (simultaneous communication).

When the communication mode is MU-SIMO (simultaneous communication), the operation goes to Step 21, or otherwise goes to Step 25.

At Step 21, the selection determination process for the SU-SIMO (time division) as will be described later in connection with FIG. 32 is performed, and the operation goes to Step 22.

At Step 22, when the determination result of SU-SIMO (time division) at Step 21 is successful, the operation goes to Step 23, or otherwise goes to Step 24.

At Step 23, the communication mode of SU-SIMO (time division) is selected.

At Step 24, the communication mode of MU-SIMO (simultaneous communication) is selected.

At Step 25, the communication mode of SU-SIMO (time division) is selected.

The communication mode switching processing part 1212 notifies the selected communication mode and an antenna selection request in its communication mode to the antenna selection part 1211, when the communication mode is selected at each of Steps 4, 7, 10, 11, 15, 18, 19, 23, 24 and 25.

FIG. 32 shows the algorithm of a selection determination process for the SU-SIMO (time division) according to the embodiment of the invention. This process is performed by the communication mode switching processing part 1212.

First of all, at Step 1, the SIMO antenna candidate is selected and the operation goes to Step 2. A way of selecting the SIMO antenna candidate includes narrowing down the antennas based on the received power of the pilot signal as described in connection with FIG. 5.

At Step 2, the estimated value of throughput in the SU-SIMO communication is computed, and the operation goes to Step 3. A computation method for the estimated value of throughput will be described later.

At Step 3, it is checked whether or not the computed estimated throughput is at or above the request value. When the estimated throughput is at or above the request value, the operation goes to Step 4, or otherwise goes to Step 5.

At Step 4, the selection determination result of SU-SIMO (time division) is judged to be successful.

At Step 5, the selection determination result of SU-SIMO (time division) is judged to be unsuccessful.

Herein, for the request value of throughput, it is supposed that the terminal grasps a call class for communication in accordance with the communication protocol, when the terminal is connected in communication with the base station. In accordance with this call class, it is supposed that the base station apparatus holds the predetermined request value of throughput.

In the following, the request value is the preset value for each call class.

FIG. 33 shows the algorithm of a selection determination process for the MU-SIMO (simultaneous communication) according to the embodiment of the invention. This process is performed by the communication mode switching processing part 1212.

At Step 1, the antenna candidate for use in the SIMO communication is selected and the operation goes to Step 2. A way of selecting the SIMO antenna candidate includes narrowing down the antennas based on the received power of the pilot signal as described in connection with FIG. 5.

Then, at Step 2, the estimated value of throughput in the MU-SIMO (simultaneous communication) is computed, and the operation goes to Step 2. A computation method for the estimated value of throughput will be described later.

At Step 3, it is checked whether or not the computed estimated throughput is at or above the request value. When the estimated throughput is at or above the request value, the operation goes to Step 4, or otherwise goes to Step 5.

At Step 4, the selection determination result of MU-SIMO (simultaneous communication) is judged to be successful.

At Step 5, the selection determination result of MU-SIMO (simultaneous communication) is judged to be unsuccessful.

FIG. 34 shows the algorithm of a selection determination process for the SU-MIMO (time division) according to the embodiment of the invention. This process is performed by the communication mode switching processing part 1212.

At Step 1, L antenna cluster (antenna group) is extracted, and the operation goes to Step 2. A way of extracting L antenna cluster will be described below.

At Step 2, a combination of M antennas equal to or less than L antennas is extracted, and the operation goes to Step 3. Herein, for the M antenna extraction, firstly, a combination of two antennas is extracted from L antennas. Thereafter, when returning in the determination at Step 6, a combination of another two antennas is extracted from L antennas. Thereafter, the extraction is made for all the combinations, such as a combination of three antennas from L antennas, a combination of four antennas from L antennas, and a combination of L antennas from L antennas.

At Step 3, the estimated throughput in making the SU-MIMO (time division) with the extracted M antennas is computed, and the operation goes to Step 4. A computation method for the estimated throughput will be described later.

At Step 4, it is checked whether or not the computed estimated throughput is at or above the request value. When the estimated throughput is at or above the request value, the operation goes to Step 5, or otherwise goes to Step 6.

At Step 5, the determination processing result of SU-MIMO (time division) is judged to be successful. Herein, the extracted M antennas are stored, and thereafter, when the MIMO communication is made, the M antennas are employed for communication.

At Step 6, it is checked whether or not M antenna candidate is extracted and investigated for all the combinations of L antenna cluster. When there is any combination of antennas not yet investigated, the antennas of another combination are selected, and the operation returns to Step 2, or when all the combinations of antennas are investigated, the operation returns to Step 7.

At Step 7, the determination processing result of SU-MIMO (time division) is judged to be unsuccessful.

Figure 36:
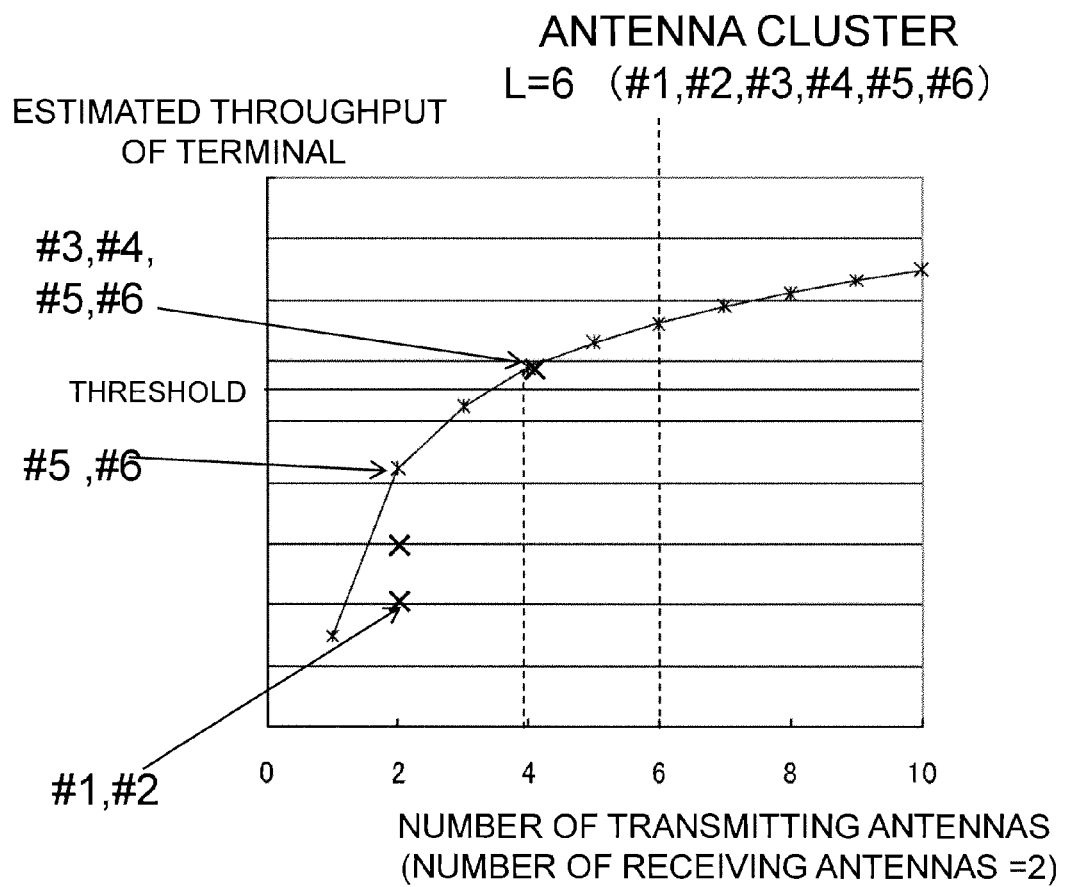
FIG. 36 is an explanatory view of deciding the number of transmitting antennas in the base station apparatus according to the embodiment of the invention.

FIG. 36 is an explanatory view of deciding the number of transmitting antennas in the base station apparatus according to the embodiment of the invention.

An example of extracting M antennas from L antennas in FIG. 34 will be described below, using FIG. 36. In an example of FIG. 36, it is supposed that the antenna cluster includes six antennas #1 to #6. First of all, the estimated throughput is computed with a combination of M=2 antennas #1 and #2. Since the estimated throughput is at or below the threshold, another combination of antennas #1 and #3 is investigated. Though the combination of antennas #5 and #6 has the highest estimated throughput in M=2, the threshold is not satisfied. Therefore, the combination is similarly obtained with M=3. In an example of FIG. 36, in M=4, when the estimated throughput exceeds the threshold with a combination of antennas #3, #4, #5 and #6, the antennas #3, #4, #5 and #6 are decided as the antennas for MIMO communication.

FIG. 35 shows the algorithm of a selection determination process for the MU-MIMO (simultaneous communication) according to the embodiment of the invention. This process is performed by the communication mode switching processing part 1212.

At Step 1, L antenna cluster (antenna group) is extracted, and the operation goes to Step 2. A way of extracting L antenna cluster will be described later.

At Step 2, a combination of M antennas equal to or less than L antennas is extracted and the operation goes to Step 3. Herein, for the M antenna extraction, firstly, a combination of two antennas is extracted from L antennas. Thereafter, when returning in the determination at Step 6, a combination of another two antennas is extracted from L antennas. Thereafter, the extraction is made for all the combinations, such as a combination of three antennas from L antennas, a combination of four antennas from L antennas, and a combination of L antennas from L antennas. The extraction of this combination is made in the same way as described in connection with FIG. 36.

At Step 3, the estimated throughput in making the MU-MIMO (simultaneous communication) with the extracted M antennas is computed, and the operation goes to Step 4. A computation method for the estimated throughput will be described later.

At Step 4, it is checked whether or not the computed estimated throughput is at or above the request value. When the estimated throughput is at or above the request value, the operation goes to Step 5, or otherwise goes to Step 6.

At Step 5, the determination processing result of MU-MIMO (simultaneous communication) is judged to be successful. Herein, the extracted M antennas are stored, and thereafter when the MIMO communication is made, the M antennas are employed for communication.

At Step 6, it is checked whether or not M antenna candidate is extracted and investigated for all the combinations of L antenna cluster. When there is any combination of antennas not yet investigated, the antennas of another combination are selected, and the operation returns to Step 2, or when all the combinations of antennas are investigated, the operation returns to Step 7.

At Step 7, the determination processing result of MU-MIMO (simultaneous communication) is judged to be unsuccessful.

An extraction method for the antenna cluster will be described below using FIG. 25. The base station apparatus 102 notifies a control message of the pilot signal transmitting request to the terminal 107a to force the terminal 107a to transmit the pilot signal. The base station apparatus 102 measures the received power of the pilot signal transmitted from the terminal 107a, and selects the group of antennas at or above the threshold as the antenna cluster. In an example of FIG. 25, since the received power of the pilot signal for the antennas #1, #2, #3 and #4 is above the threshold, the group of four antennas is defined as the antenna cluster. When the number of antennas in which the received power is at or above the threshold is L or greater, L antennas in descending order of the received power are selected for the antenna cluster. Herein, L of L antennas is a fixed value preset in the system as the maximum number that can be dealt with in the MIMO signal processing of the base station apparatus.

4-3. Channel Information and Estimation of Throughput

FIG. 18 is an explanatory view of channel information 1207 in the base station apparatus 102 according to the embodiment of the invention.

It has channel impulse response information between each antenna #1 to #12 and each of the terminal antennas as data for each of uplink and downlink. The known pilot signal is transmitted from antenna #1, in which the channel information that is the result of channel estimation for the signal received at antenna A of the terminal 107a is designated as h1a and the channel information that is the result of channel estimation for the signal received at antenna B of the terminal 107a is designated as h1b. The results of h1a and h1b are obtained by feeding back the channel information from the terminal 107a to the base station apparatus 102. In a Frequency Division Duplex (FDD) system having different frequencies between uplink and downlink, it is required to make the feedback in this way to investigate the downlink channel information, whereas in a Time Division Duplex (TDD) system using the common frequency for uplink and downlink, the pilot signal transmitted from the antenna A of the terminal 107a is received at the antenna #1, and the channel estimation is made in the base station apparatus 102 to obtain h1a, which is utilized for estimation of the downlink channel information.

From the channel information obtained in this way, the throughput in making the SIMO communication and the MIMO communication can be estimated. In the following, an estimation method for the throughput using the channel information will be described.

When the terminal 107a makes the SIMO communication at the antenna #1, the downlink communication capacity C1_SIMO can be computed in the following formula 1.

$$C1\_SIMO = \log_2(1+\gamma_1+\gamma_2)$$

$$\gamma_1 = P \times |h_{1a}|^2/\sigma^2, \gamma_2 = P \times |h_{1b}|^2/\sigma^2 \quad \text{(Formula 1)}$$

In the following, P represents the total sending power transmitted from the base station apparatus 102. In the formula 1, it corresponds to the sending power transmitted from the antenna #1. $\sigma^2$ represents the thermal noise power.

Similarly, when the terminal 107b makes the SIMO communication at the antenna #6, when in the formula 1 h1a is replaced with h6c and h1b is replaced with h6d, the downlink communication capacity C2_SIMO can be obtained in the following formula 2.

$$C2\_SIMO = \log_2(1+\gamma_1+\gamma_2)$$

$$\gamma_1 = P \times |h_{6c}|^2/\sigma^2, \gamma_2 = P \times |h_{6d}|^2/\sigma^2 \quad \text{(Formula 2)}$$

Herein, when the terminals 107a and 107b make the SU-SIMO (time division), the time is halved for each terminal, and the downlink communication capacities C1_SIMO (time division) and C2_SIMO (time division) of the terminals

107a, 107b are given in the following formulae 3 and 4, respectively.

$$C1\_SU\_SIMO(\text{time division}) = C1\_SIMO/2 \quad \text{(Formula 3)}$$

$$C2\_SU\_SIMO(\text{time division}) = C2\_SIMO/2 \quad \text{(Formula 4)}$$

Next, the downlink communication capacity when the terminal 107a and the terminal 107b make the MU-SIMO (simultaneous communication) will be described below. The signal is transmitted with half the sending power or P/2 from the antenna #1 and the antenna #6. The downlink communication capacity C1_MU_SIMO (simultaneous communication) of the terminal 107a is obtained in the following formula 5.

$$C1\_MU\_SIMO(\text{simultaneous communication}) = \log_2(1+\gamma_1+\gamma_2)$$

$$\gamma_1 = (P/2) \times |h_{1a}|^2/(\sigma^2 + |h_{6a}|^2),$$

$$\gamma_2 = (P/2) \times |h_{1b}|^2/(\sigma^2 + |h_{6b}|^2) \quad \text{(Formula 5)}$$

Similarly, the downlink communication capacity C2_MU_SIMO (simultaneous communication) of the terminal 107b is obtained in the following formula 5'.

$$C2\_MU\_SIMO(\text{simultaneous communication}) = \log_2(1+\gamma_1+\gamma_2)$$

$$\gamma_1 = (P/2) \times |h_{6c}|^2/(\sigma^2 + |h_{1c}|^2),$$

$$\gamma_2 = (P/2) \times |h_{6d}|^2/(\sigma^2 + |h_{1d}|^2) \quad \text{(Formula 5')}$$

Next, the communication capacity when the terminal 107a makes the MIMO communication with the antennas #1, #2 is obtained in the following formula 6. The sending power is evenly distributed.

$$C1\_MIMO = \log_2(1+(\gamma_1/2)) + \log_2(1+(\gamma_2/2))$$

$$\gamma_1 = (P/2) \times \lambda_1/\sigma^2, \gamma_2 = (P/2) \times \lambda_2/\sigma^2 \quad \text{(Formula 6)}$$

Where $\lambda_1$ and $\lambda_2$ denote the eigen-values of a channel matrix $H_{11}(t)$ at time t. The eigen-value can be obtained as the singular value decomposition of the matrix. The eigen-value of the channel matrix was described in detail in non-patent document 2. Herein, the channel matrix $H_{11}(t)$ is represented in the following formula 7.

[Math. 1]

$$H_{11}(t) = \begin{pmatrix} h_{1a} & h_{1b} \\ h_{2a} & h_{2b} \end{pmatrix} \quad \text{(Formula 7)}$$

Similarly, for the terminal 107b, the communication capacity C2_MIMO in making the MIMO communication using the antennas #5, #6 is calculated in accordance with the formula 6 by obtaining the eigen-values $\lambda_1$ and $\lambda_2$ of the channel matrix $H_{22}(t)$ represented in the following formula 8.

[Math. 2]

$$H_{22}(t) = \begin{pmatrix} h_{6c} & h_{6d} \\ h_{5c} & h_{5d} \end{pmatrix} \quad \text{(Formula 8)}$$

Though the above case is an example of two transmitting antennas and two receiving antennas, the communication capacity for two or more transmitting antennas and two or more receiving antennas was described in detail in non-patent document 3.

The communication capacities when the terminal 107a and the terminal 107b make the SU-MIMO communication in time division are given in the following formulae 9 and 10.

$$C1\_SU\_MIMO(\text{time division}) = C1\_MIMO/2 \quad \text{(Formula 9)}$$

$$C2\_SU\_MIMO(\text{time division}) = C2\_MIMO/2 \quad \text{(Formula 10)}$$

The capacity when the terminal 107a and the terminal 107b make the MU-MIMO communication is obtained in the following formula 11.

[Math. 3]

$$H_1(t) = \begin{pmatrix} h_{1a} & h_{1b} \\ h_{2a} & h_{2b} \\ h_{5a} & h_{5b} \\ h_{6a} & h_{6b} \end{pmatrix} \quad \text{(Formula 11)}$$

$$H_2(t) = \begin{pmatrix} h_{1c} & h_{1d} \\ h_{2c} & h_{2d} \\ h_{5c} & h_{5d} \\ h_{6c} & h_{6d} \end{pmatrix}$$

$$C_n\_MU\_MIMO =$$

$$\max_{\substack{\{Q_{k(t)}\}_{k=1}^{K}:Q_{k(t)} \geq 0 \\ \sum_{k=1}^{K} Tr(Q_k(t)) \leq P}} \sum_{k=1}^{2} \log \frac{\left| I + H_k(t)\left(\sum_{n=1}^{k} Q_n(t)\right)H'_k(t)\right|}{\left| I + H_k(t)\left(\sum_{n=1}^{k-1} Q_n(t)\right)H'_k(t)\right|}$$

Where n indicates 1 for the terminal 107a and 2 for the terminal 107b. Qn(t) is a covariance matrix. H'$_k$(t) is a complex conjugate transposed matrix of H$_k$(t). Also, Tr(Q$_i$(t)) represents the trace. ‖ denotes the determinant. The details were described in formula (3) of non-patent document 1.

4-4. Antenna Selection Part 1211

Figure 26:
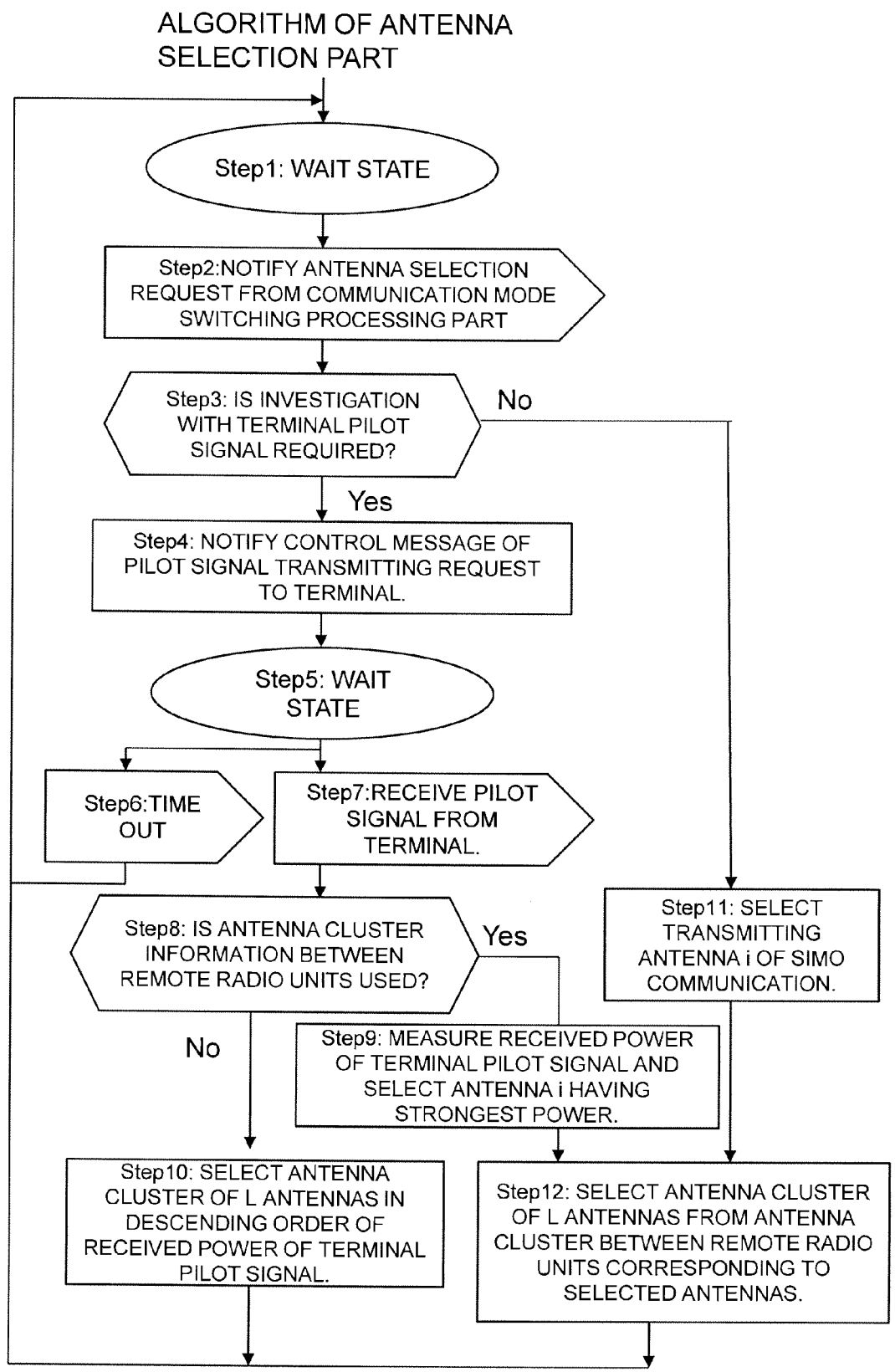
FIG. 26 is an explanatory view of the algorithm for an antenna selection part in the base station apparatus according to the embodiment of the invention.

FIG. 26 is an explanatory view of the algorithm for the antenna selection part 1211 in the base station apparatus 102 according to the embodiment of the invention. This process is performed by the antenna selection part 1211.

From a wait state (Step 1), a notification of antenna selection request is received from the communication mode switching processing part 1212 (Step 2).

It is judged whether or not the investigation with the pilot signal transmitted by the terminal as described in connection with FIG. 25 is required (Step 3). When the investigation with the pilot signal is required, the operation goes to Step 4, or otherwise goes to Step 11.

When the investigation with the pilot signal is required, a control message of requesting the transmission of the pilot signal is notified to the terminal (Step 4).

The operation waits for receiving the pilot signal from the terminal (Step 5).

When a reception wait timer for the pilot signal from the terminal times out (Step 6), the operation returns to Step 1 as antenna candidate selection failure.

When the pilot signal is received from the terminal (Step 7), the operation goes to Step 8.

At Step 8, it is judged whether or not the antenna cluster information between the remote radio units as described in connection with FIG. 23 is employed, in which when it is employed, the operation goes to Step 9, or otherwise goes to Step 10.

At Step 9, the received power of the pilot signal from the terminal is measured, and the antenna i having the highest received power is selected. Then, the operation goes to Step 12.

At Step 10, L antennas are selected as antenna candidates in descending order of the received power of the pilot signal transmitted from the terminal, and the operation goes to Step 1.

At Step 12, the antenna cluster for the antenna i selected at Step 9 is selected as the antenna candidate, and the operation goes to Step 1.

On the other hand, at Step 3, when the investigation with the pilot signal is not required, the transmitting antenna i for use in the SIMO communication is selected at Step 11. Then, the operation goes to Step 12.

From the L antennas of the antenna cluster selected herein, the communication mode switching processing part 1212 decides the M antennas satisfying the request speed of the terminal as described in connection with FIGS. 34, 35 and 36.

Herein, the number L of antennas selected at Step 10 is the number in which the received power is at or above the threshold.

Also, the judgment at Step 3 depends on a system policy of selecting the antenna by making the investigation with the pilot signal or without making the investigation with pilot signal for a certain number of times. Also, when the terminal is not moved, and the antenna relationship between the remote radio unit and the terminal is fixed at any time, there is a way of making no investigation with the pilot signal transmitted from the terminal.

When the base station apparatus 102 and the terminal 107*a* make the switching from the SIMO communication with one transmitting antenna to the MIMO communication, the antenna cluster corresponding to one transmitting antenna of the SIMO communication can be selected as the antenna candidate for use in the MIMO communication, even when the investigation with the pilot signal is not made at Step 3. Thereby, in an environment where the switching frequency between the SIMO communication and the MIMO communication is high, it is possible to reduce a protocol overhead of transmitting the pilot signal from the terminal by utilizing the antenna cluster of the antennas investigated beforehand between the remote radio units.

A case where the investigation with the pilot signal transmitted from the terminal is unnecessary in the event of No at Step 3 of FIG. 26 will be described below.

A method of generating the antenna cluster based on the received power received at the base station apparatus by transmitting the pilot signal from the terminal can be applied to a system in which the uplink and downlink communications have the same frequency. Because it is possible to imagine the same situation in the downlink radio propagation path by the uplink pilot signal. On the other hand, when the uplink and downlink frequencies are different, the radio propagation characteristics are different, whereby it is required that the base station apparatus transmits the pilot signal to grasp the channel information of the downlink radio propagation path and generate the antenna cluster. In the following, a case where the base station apparatus transmits the pilot signal to generate the antenna cluster will be described below.

Figure 20:
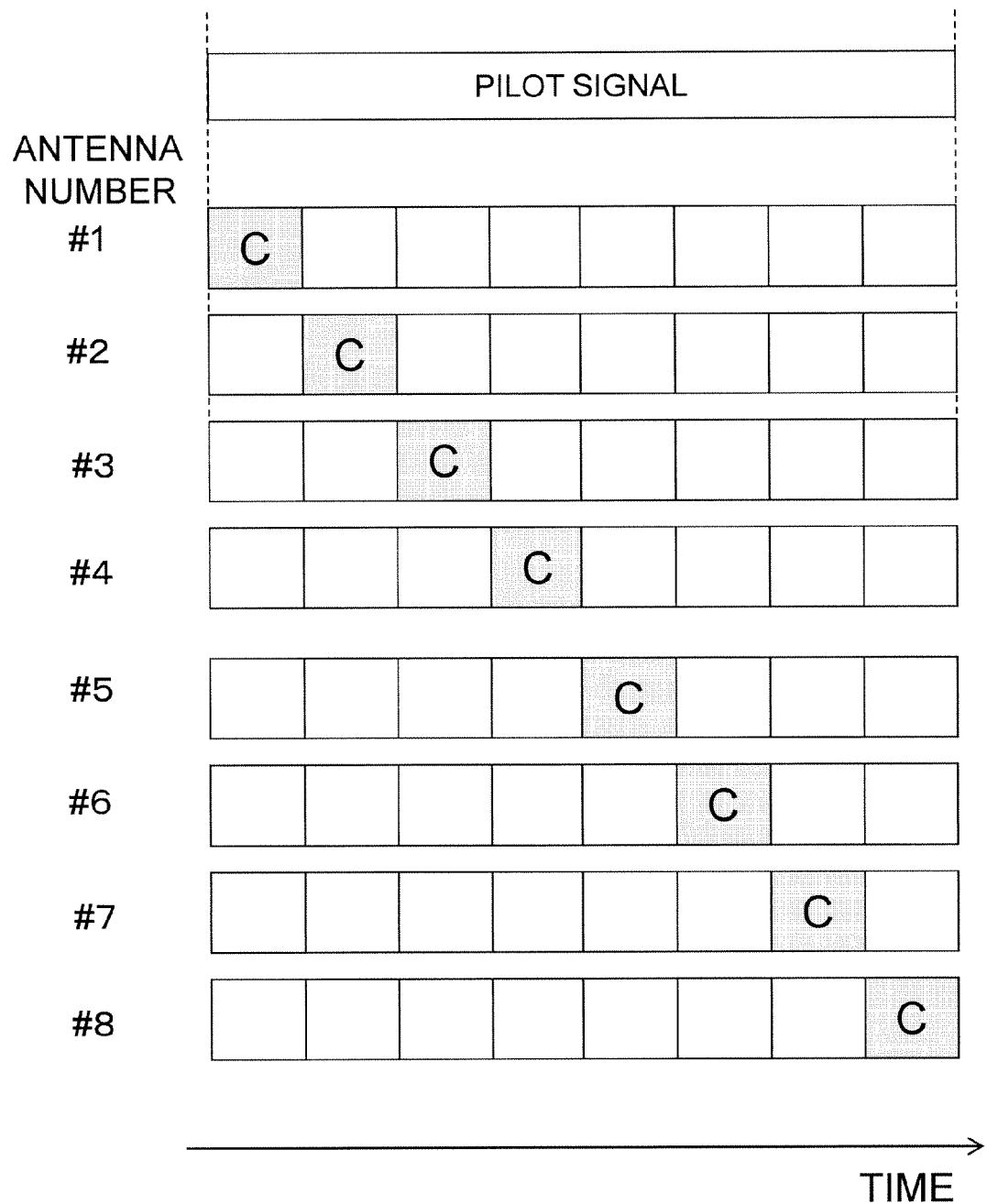
FIG. 20 is an explanatory view of transmitting overhead of a pilot signal.

FIG. 20 is an explanatory view of the pilot signal transmitted by the base station apparatus. The pilot signal is employed to transmit the known signal pattern and make the processing of channel estimation in the MIMO communication. It is also called a preamble signal. In the distributed antenna system having a number of antennas, when the antenna candidate between the antennas #1 to #12 and the terminal is not narrowed down, it is required that the pilot signal is issued from all the antennas, and fed back by making the channel estimation at the terminal. In an example of FIG. 20, a transmitting method called a scattered type is employed, in which the pilot signal is transmitted from only one antenna at each symbol timing. With this transmitting method, there is a problem that it takes a longer time for transmitting the pilot signal when a number of antennas are provided.

In a time space encoding type, the pilot signal is transmitted from all the transmitting antennas simultaneously at each symbol timing. Assuming that the pilot signal transmitted from the ith transmitting antenna at the jth symbol is $C_{i,j}$, and the signal received by the ith receiving antenna at the jth symbol is $R_{i,j}$, the transfer function is obtained by operating an inverse matrix of $C_{i,j}$ on $R_{i,j}$. Therefore, when the number of transmitting antennas increases, plural symbol times are required to obtain the transfer function, increasing the overhead.

FIG. 21 is an explanatory view of transmitting the pilot signal from the base station according to the embodiment of the invention. The pilot signal is transmitted by connecting the antenna port <1> of the base station apparatus 102 to the antenna #1. By performing the channel estimation process for the signals received at the antenna #2 to #8 in the antenna ports <2> to <8> of the base station apparatus 102, the channel information between the signal transmitted from the antenna #1 of the remote radio unit 108*a* and the antennas #2 to #8 can be measured.

FIG. 22 is an explanatory view of forming the antenna cluster with the pilot signal transmitted by the base station apparatus according to the embodiment of the invention. The pilot signal is transmitted from the antenna of the remote radio unit 108*a* and received at the antennas of the other remote radio units 108*b*, 108*c*, 108*d*, 108*e* and 108*f*, and the received signals are returned to the base station apparatus 102. This is realized by setting the antenna connection pattern as described in connection with FIG. 21 in the antenna switch 109. The base station apparatus 102 can collect the channel information between antennas by performing the channel estimation process. Then, the antenna connection patterns are switched, the pilot signal is transmitted from the antenna of the remote radio unit 108*b* and received at the antennas of other remote radio units 108*a*, 108*c*, 108*d*, 108*e* and 108*f*, and the received signals are returned to the base station apparatus 102. In this way, the channel information between antennas of all the remote radio units is collected. Using the collected channel information, the combination of antennas having high reception strength can be obtained as the antenna cluster. The process as shown in FIG. 22 may be performed by collecting information between the remote radio units in the night-time with less traffic of data communication. Or it may be performed only once at the time of installation or changing the layout, or at the frequency of once per week, or once per month.

FIG. 23 is an explanatory view of channel information between antennas of the remote radio unit according to the embodiment of the invention. The channel information of the pilot signal is stored in a sequence as described in connection with FIG. 22. The channel information obtained when the signal transmitted from the ith antenna is received at the jth antenna is designated as $h_{i,j}$. A way of obtaining the antenna cluster of the antenna #1 is shown below.

The norm $|h_{i,j}|$ of $h_{i,j}$ is computed, and it is assumed that a set of j satisfying $|h_{i,j}| \geq$ threshold has N elements. Herein, the norm $|h_{i,j}|$ represents the received power between the antenna i and the antenna j.

Among this set of N elements, L antennas are extracted in descending order to have the antenna cluster. Herein, L is the preset fixed value. When L is greater than N, the antenna cluster is composed of N antennas.

Figure 24:
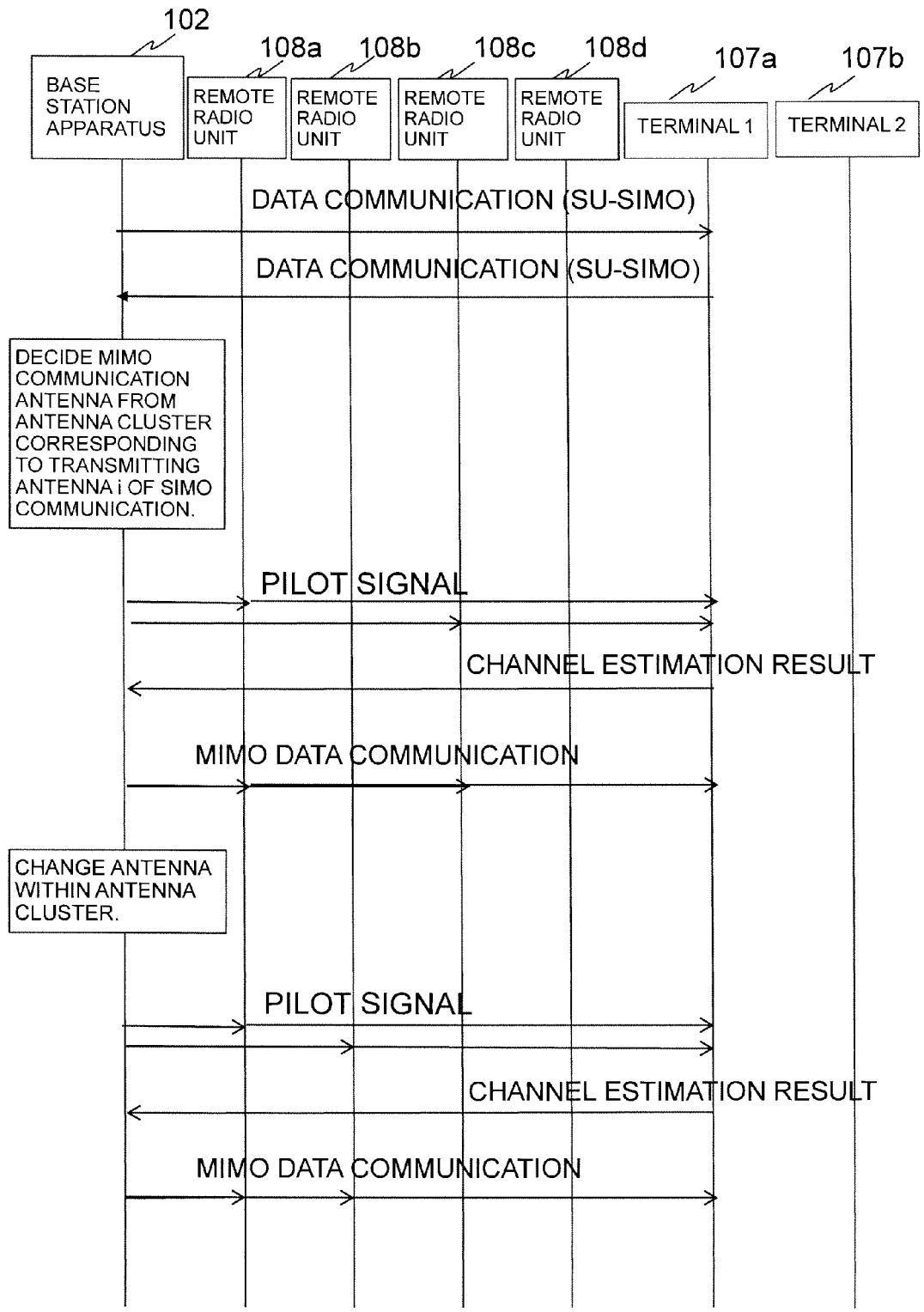
FIG. 24 is an explanatory view of MIMO candidate antenna selection and an MIMO communication control sequence in switching the SIMO communication to the MIMO communication according to the embodiment of the invention.

FIG. 24 is a sequence chart of an operation example for making the MIMO communication using the antenna cluster generated from the channel information between the remote radio unit antennas.

First of all, it is supposed that the SU-SIMO communication is performed between the base station apparatus 102 and the terminal 107*a*. Subsequently, an example in which there is a need for switching over to the MIMO communication will be described below.

At Step 11 as described in connection with FIG. 26, the transmitting antenna i making the SU-SIMO communication is selected. For example, it is assumed that the transmitting antenna i is the antenna #2. From FIG. 23, the antenna cluster corresponding to the antenna #2 is the antenna cluster A, and the antennas #1, #2, #3 and #4 are extracted. With this method, since the channel information between the remote radio units is collected beforehand, and the antenna cluster information is already formed, it is unnecessary to transmit the pilot signal again in making the communication for the investigation, whereby the overhead can be reduced.

The pilot signal is transmitted from the selected antenna of the antenna cluster to the terminal 107*a*. The terminal 107*a* makes the MIMO data communication by feeding back the channel estimation result. The combination of antennas in which the estimated throughput of the terminal satisfies the requested throughput is obtained from plural antennas of the antenna cluster to specify the antenna for use in the MIMO communication, and make the MIMO communication, as described in connection with FIG. 36. Every time of switching the antenna for use in the MIMO communication, the throughput is measured and learned, and the combination of antennas having the actual results of high throughput is preferentially investigated to decide the antenna for use in the MIMO communication.

B. Modifications

B-1. Switching the Communication Modes

Embodiment 2

An embodiment 2 in which the terminal makes a Single Input Single Output (SISO) communication, not the SIMO communication, will be described below.

In the above explanation of the embodiment 1, the SIMO communication may be replaced with the SISO communication.

This case may occur with the low-priced terminal supporting only the SISO communication, or the terminal supporting both the SIMO communication and the SISO communication, but making only the SISO communication rather than the SIMO communication when the battery remaining amount is small.

Embodiment 3

An embodiment 3 that is modification of the embodiment 1 for the method for searching for the optimal transmitting antenna as described in connection with FIG. 5 will be described below.

The base station apparatus 102 grants the antenna ID to every antenna, in which a control signal with the antenna ID is transmitted from each antenna, and the terminal 107*a* receiving the control signal feeds back the antenna ID having the highest received power to the base station apparatus 102 to specify the transmitting antenna for use in the base station apparatus 102.

Embodiment 4

In an embodiment 4, an algorithm for the communication mode switching processing part of the base station 102 in place of FIG. 15 in the embodiment 1 will be described below.

Figure 16:
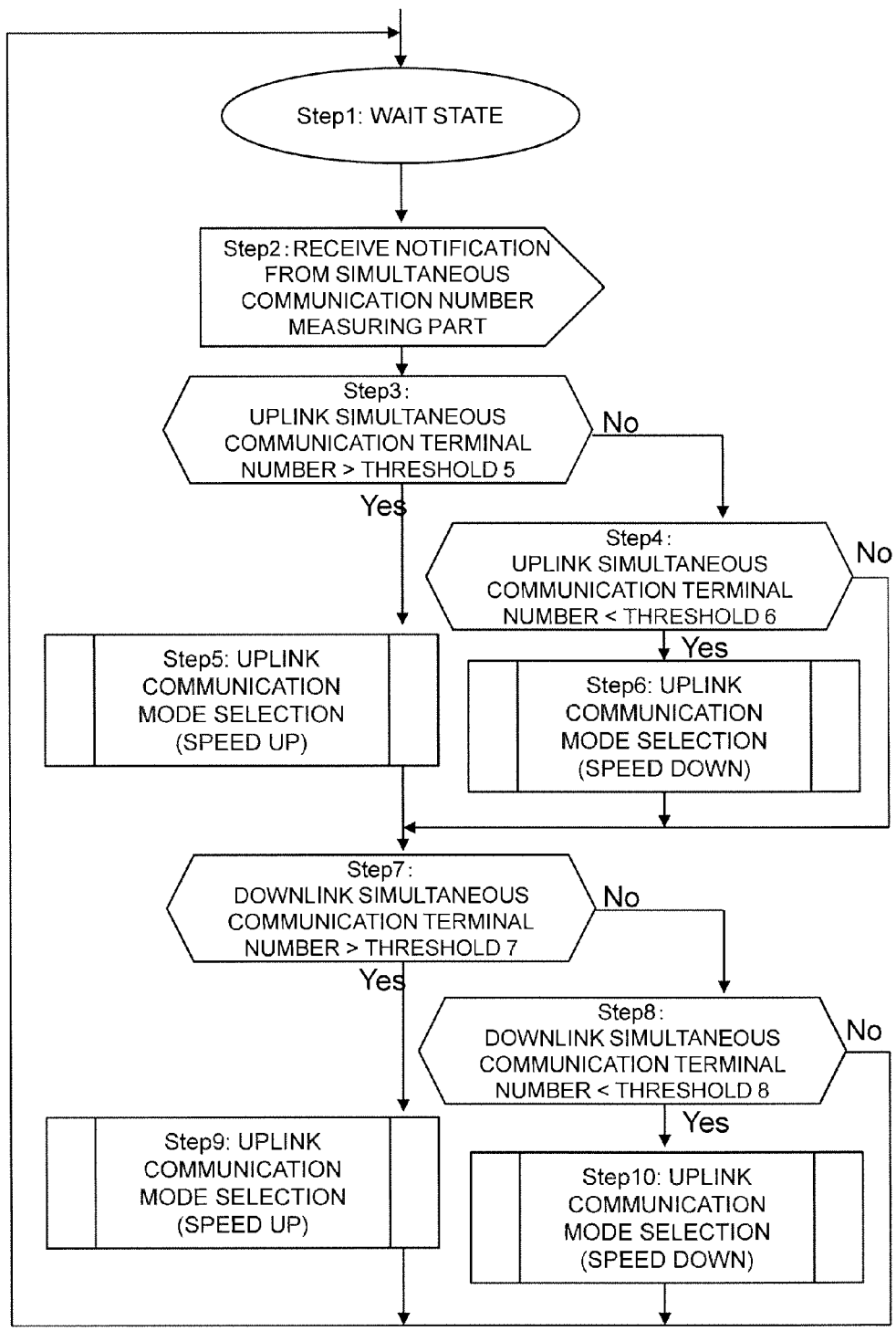
FIG. 16 is an explanatory view of the algorithm for the communication mode switching processing part in the base station apparatus according to an embodiment 4.

FIG. 16 is an explanatory view of the algorithm for the communication mode switching processing part 1212 in the base station apparatus 102 according to this embodiment. This process is performed by the communication mode switching processing part 1212.

The contents of condition judgments at Step 3, Step 4, Step 7 and Step 8 of FIG. 15 in the embodiment 1 are different, but the operation has the same algorithm.

At Step 3, the uplink simultaneous communication terminal number is compared with a threshold 5. When the uplink simultaneous communication terminal number is greater than the threshold 5, the operation goes to Step 5, or otherwise goes to Step 4.

At Step 4, the uplink simultaneous communication terminal number is compared with a threshold 6. When the uplink simultaneous communication terminal number is smaller than the threshold 6, the operation goes to Step 6, or otherwise goes to Step 7.

At Step 7, the downlink simultaneous communication terminal number is compared with a threshold 7. When the downlink simultaneous communication terminal number is greater than the threshold 7, the operation goes to Step 9, or otherwise goes to Step 8.

At Step 8, the downlink simultaneous communication terminal number is compared with a threshold 8. When the downlink simultaneous communication terminal number is smaller than the threshold 8, the operation goes to Step 10, or otherwise goes to Step 1.

These thresholds 5 to 8 may be appropriately preset.

Embodiment 5

In an embodiment 5, an algorithm for selecting the SU-SIMO/MU-SIMO/SU-MIMO/MU-MIMO communication of the communication mode switching processing part 1212 in the base station apparatus 102 in place of FIG. 17 in the embodiment 1 will be described below.

Figure 17:
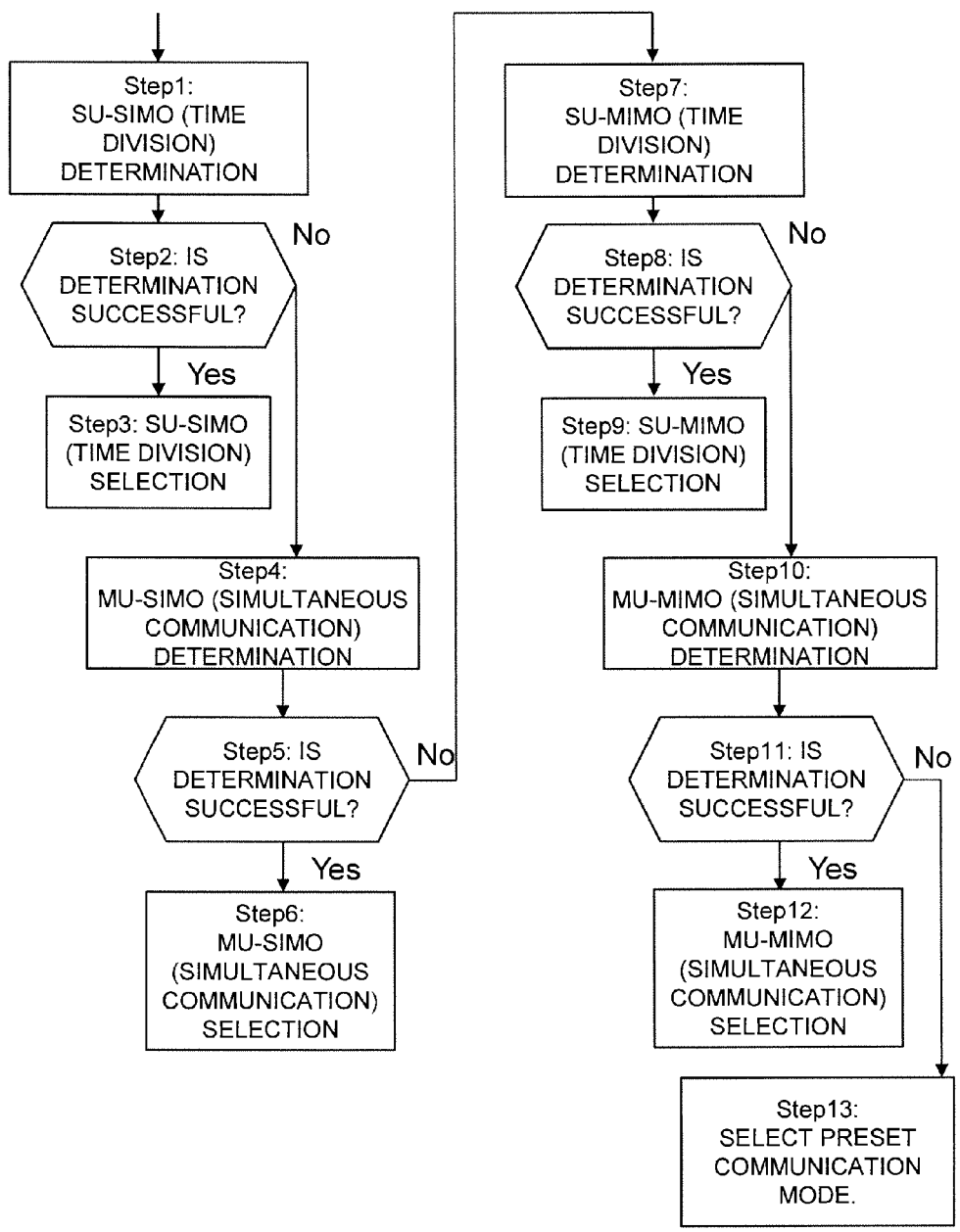
FIG. 17 is an explanatory view of a selection algorithm of SU-SIMO/MU-SIMO/SU-MIMO/MU-MIMO communication mode for the communication mode switching processing part in the base station apparatus according to another embodiment of the invention.

At Step 10 of the algorithm of FIG. 17 in the embodiment 1, the communication mode of scenario set beforehand is selected. The Steps 11 to 13 of the algorithm of FIG. 17 are unnecessary.

This is effective when the computation is difficult because of large computation amount of throughput estimation for the MU-MIMO or the base station apparatus 102 does not support the signal processing of MU-MIMO.

B-2. Throughput Estimation

Embodiment 6

An embodiment 6 that is modification of the embodiment 1 for estimating the throughput for the multi-user MIMO using the channel information of FIG. 18 will be described below.

The total capacity is obtained by the following computation according to the formula 12, and the communication capacity of the terminal 107*a* and the terminal 107*b* may be approximated by the formulae 13 and 14.

[Math. 4]

$$H(t) = \begin{pmatrix} h_{1a} h_{1b} h_{1c} h_{1d} \\ h_{2a} h_{2b} h_{2c} h_{2d} \\ h_{5a} h_{5b} h_{5c} h_{5d} \\ h_{6a} h_{6b} h_{6c} h_{6d} \end{pmatrix}$$ (Formula 12)

$$C\_MU\_MIMO = \sum_{k=1}^{2} \log\left|I + \frac{P}{4\sigma^2} H(t)H'(t)\right|$$

C1_MU_MIMO (approximation) = C_MU_MIMO/2 (Formula 13)

C2_MU_MIMO (approximation) = C_MU_MIMO/2 (Formula 14)

Embodiment 7

An embodiment 7 that is modification of the embodiment 1 for estimating the throughput using the channel information of FIG. 18 will be described below.

FIG. 19 is an explanatory view of a throughput estimation method according to this embodiment. Herein, the downlink throughput will be described as an example, but the uplink throughput can be estimated in the same way.

First of all, the actual result value of the downlink throughput when the terminal 107 makes the SU-SIMO communication is recorded. In this example, it is 5 Mbps, in which this value is denoted as X.

When the terminal 107a and the terminal 107b make the SU-SIMO (time division) communication, the value (X/2) Mbps in which the X is divided by the simultaneous connection terminal number or 2 is the estimated throughput. Similarly, when there are three terminals 107a, 107b and 107c, the value (X/3) Mbps is the estimated throughput.

For the throughput in making the MU-SIMO (simultaneous communication), the result when the terminal 107a and the terminal 107b actually made the MU-SIMO (simultaneous communication) in the past is stored, and the values a and b indicating the percentage to the value of X at the time of the SU-SIMO communication are stored. The estimated throughput is computed by making use of the stored values of a and b. The throughput is estimated by utilizing the previous throughput result with the MU-MIMO.

Next, when only the terminal 107a makes the SU-MIMO communication, the throughput is estimated as N×X Mbps, assuming that the smaller number of transmitting/receiving antennas is N. In an example of FIG. 19, N=2 and X=5, whereby the throughput is estimated to be 10 Mbps.

When the terminal 107a and the terminal 107b make the SU-MIMO (time division) communication, the value (N×X/2) Mbps in which N×X is divided by the simultaneous connection terminal number or 2 is the estimated throughput. Similarly, when there are three terminals 107a, 107b and 107c, the (N×X/3) Mbps is the estimated throughput.

For the throughput in making the MU-MIMO (simultaneous communication), the result when the terminal 107a and the terminal 107b actually made the MU-MIMO (simultaneous communication) in the past is stored, and the values d and e indicating the percentage to the value of N×X at the time of SU-MIMO communication are stored. The estimated throughput is computed by utilizing the stored values of d and e.

Embodiment 8

An embodiment 8 that is modification of the embodiment 7 for estimating the throughput of FIG. 19 will be described below.

The estimated throughput may be obtained by holding the past throughput actual result value in each communication mode selected in the past in a table format of FIG. 19 in the embodiment 7, and referring to the throughput value for the communication made in the past. When there is no actual result, the estimated throughput may be a large value to always satisfy the request value. Thereby, with the algorithm as described in connection with FIG. 17 of the embodiment 1, the communication mode without actual results in the past is selected. The actual result of the throughput in the selected communication mode is stored, and the past actual result value is referred to as the estimated throughput in switching the communication modes.

B-3. Antenna Selection

Embodiment 9

An embodiment 9 that is modification of the embodiment 1 for Step 11 of FIG. 26 will be described below.

The pilot signal is transmitted from the base station apparatus 102 to the terminal 107a. The terminal receiving the pilot signal measures the received power of the pilot signal. The antenna having the highest received power is fed back to the base station apparatus 102. The base station apparatus 102 selects the antenna i designated by the terminal as the transmitting antenna i.

B-4. Communication Mode Selection

Embodiment 10

An embodiment 10 that is modification of the embodiment 1 for the selection algorithm (speed UP) for the communication mode (SU-SIMO/MU-SIMO/SU-MIMO/MU-MIMO) in FIG. 30 and the selection algorithm (speed Down) for the communication mode (SU-SIMO/MU-SIMO/SU-MIMO/MU-MIMO) in FIG. 31 will be described below.

The algorithm of FIG. 17 as shown below is applied instead of FIGS. 30 and 31.

FIG. 17 shows an algorithm for selecting the communication mode (SU-SIMO/MU-SIMO/SU-MIMO/MU-MIMO) according to the embodiment of the invention. This process is performed by the communication mode switching processing part 1212.

First of all, at Step 1, the determination for the SU-SIMO (time division) is made and the operation goes to Step 2. The determination for the SU-SIMO (time division) is made in accordance with the algorithm as described in connection with FIG. 32.

At Step 2, when the determination result for the SU-SIMO (time division) is successful, the operation goes to Step 3, or otherwise goes to Step 4.

At Step 3, the communication mode of the SU-SIMO (time division) is selected.

At Step 4, the determination for the MU-SIMO (simultaneous communication) is made and the operation goes to Step 5. The determination for the MU-SIMO (simultaneous communication) is made in accordance with the algorithm as described in connection with FIG. 33.

At Step 5, when the determination result for the MU-SIMO (simultaneous communication) is successful, the operation goes to Step 6, or otherwise goes to Step 7.

At Step 6, the communication mode of the MU-SIMO (simultaneous communication) is selected.

At Step 7, the determination for the SU-MIMO (time division) is made and the operation goes to Step 8. The determination for the SU-MIMO (time division) is made in accordance with the algorithm as described in connection with FIG. 34.

At Step 8, when the determination result for the SU-MIMO (time division) is successful, the operation goes to Step 9, or otherwise goes to Step 10.

At Step 9, the communication mode of the SU-MIMO (time division) is selected.

At Step 10, the determination for the MU-MIMO (simultaneous communication) is made and the operation goes to Step 11. The determination for the MU-MIMO (simultaneous communication) is made in accordance with the algorithm as described in connection with FIG. 35.

At Step 11, when the determination result for the MU-MIMO (simultaneous communication) is successful, the operation goes to Step 12, or otherwise goes to Step 13.

At Step 12, the communication mode of the MU-MIMO (simultaneous communication) is selected.

At Step 13, the communication mode of the SU-SIMO (time division) is selected.

Embodiment 11

An embodiment 11 that is modification of the embodiment 10 for Step 13 of FIG. 17 will be described below.

The current communication mode is continued without switching the communication modes.

Embodiment 12

An embodiment 12 that is modification of the embodiment 10 for Step 13 of FIG. 17 will be described below.

The base station apparatus collects the traffic class of the terminal, and allocates the SU-SIMO (time division) to the user terminal of best effort, and allocates the communication mode of MU-MIMO (simultaneous communication) to the user terminal of QoS (Quality of Service) call, for example.

Embodiment 13

An embodiment 13 that is modification of the embodiment 1 for the selection algorithm (speed Down) for the communication mode (SU-SIMO/MU-SIMO/SU-MIMO/MU-MIMO) in FIG. 31 will be described below.

The algorithm of FIG. 17 as described in the embodiment 10 is applied.

Embodiment 14

In an embodiment 14, the algorithm of FIG. 17 in the embodiment 10 is applied only in place of the selection algorithm (speed UP) for the communication mode (SU-SIMO/MU-SIMO/SU-MIMO/MU-MIMO) in FIG. 30 of the embodiment 1.

Embodiment 15

In an embodiment 15, the algorithm of FIG. 17 in the embodiment 10 is applied only in place of the selection algorithm (speed Down) for the communication mode (SU-SIMO/MU-SIMO/SU-MIMO/MU-MIMO) in FIG. 31 of the embodiment 1.

Embodiment 16

In an embodiment 16, a generation method for a antenna cluster according to modification of the embodiment 1 in place of the generation method for the antenna cluster in FIG. 25 of the embodiment 1 will be described below.

The base station apparatus transmits a downlink pilot signal, and the terminal measures the channel information and feeds back this channel information to the base station apparatus. The received power is obtained from this channel information, and the antenna cluster is composed of the antennas in which the received power is at or above the threshold.

B-5. Remote Radio Unit

Embodiment 17

Figure 38:
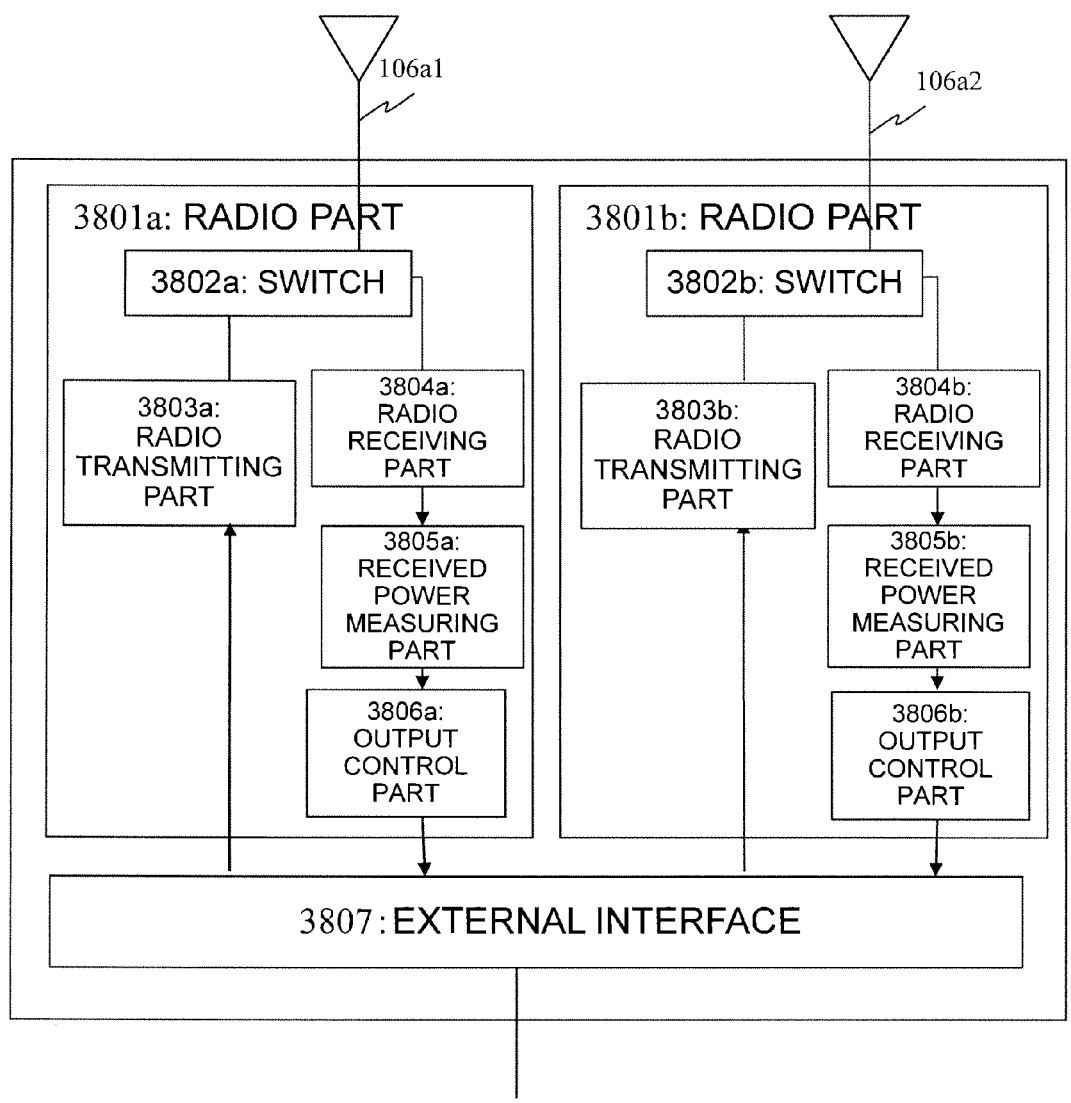
FIG. 38 is a configuration diagram of the remote radio unit according to another embodiment of the invention.

In an embodiment 17, modification of the embodiment 1 in place of the remote radio unit of FIG. 27 in the embodiment 1 will be described below. FIG. 38 is an explanatory view of the remote radio unit according to this embodiment.

The radio part is provided for each antenna independently, such as the radio part 3801*a* for the antenna 106*a*1 and the radio part 3801*b* for the antenna 106*a*2. Also, the radio part 3801*a* is switched between transmission and reception in time division by a switch 3802. This remote radio unit corresponds to a Time Division Duplex (TDD) system. The other functions are the same as shown in FIG. 27.

Embodiment 18

In an embodiment 18, modification of the embodiment 17 in place of the remote radio unit of FIG. 38 in the embodiment 17 will be described below. The sharing device 2702 of FIG. 27 is employed in place of the switch 3802 of the radio part 3801*a* of FIG. 38, to prevent wraparound of transmission and reception, and enable the simultaneous use. The other functions are the same as shown in FIG. 38. This remote radio unit corresponds to a Frequency Division Duplex (FDD) system.

Embodiment 19

In an embodiment 18, modification of the embodiment 17 in place of the remote radio unit of FIG. 38 in the embodiment 17 will be described below. The radio part 3801*a* of FIG. 38 has only a radio transmitting part 3803*a*, and the radio part 3801*b* has only a radio receiving part 3804*b*, a received power measuring part 3805*b* and an output control part 3806*b*. In this case, the antenna 106*a*1 is only for transmission, and the antenna 106*a*2 is only for reception, in which the system works in one direction. This case can be supported by the TDD or FDD, but it is required to manage the antennas each as an antenna only for transmission or only for reception in the base station apparatus.

B-6. Request Value

Embodiment 20

In an embodiment 20, the request value of FIGS. 32 to 35 in the embodiment 1 is the value held as the predetermined threshold in the base station without depending on the call class.

B-7. Antenna Switch

Embodiment 21

In an embodiment 21, the base station apparatus 102 has the function of the antenna switch device 109 of FIG. 2 in the embodiment 1.

Embodiment 22

In an embodiment 22, the DAS parent machine 103 has the function of the antenna switch device 109 of FIG. 2 in the embodiment 1.

What is claimed is:

1. A distributed antenna system comprising:
a base station apparatus comprising a plurality of antenna ports;
a terminal having a plurality of terminal antennas;
a plurality of remote radio units dispersed spatially so as to accommodate one or more distributed antennas; and
an antenna switch configured to switch a connection between the one or more distributed antennas and the plurality of antenna ports in the base station apparatus,
wherein the base station apparatus is configured to collect a terminal throughput for uplink and downlink communications, a number of simultaneous communication terminals, and radio propagation channel information from each of the one or more distributed antennas to each of the plurality of terminal antennas;
wherein each of the one or more distributed antennas is configured to receive one of a pilot signal or a control signal from the terminal;
wherein the base station apparatus is configured to select an antenna cluster comprising a first group consisting of a predetermined number of the one or more distributed antennas in descending order of a first received power of the one of the pilot signal or the control signal, or
wherein the base station is configured to identify and store antenna cluster information identifying a second group consisting of a predetermined number of the one or more distributed antennas in descending order of a second received power of the one of the pilot signal or the control signal, by transmitting or receiving, substantially prior to the selection of the antenna cluster, the one of the pilot signal or the control signal between the distributed antennas, and
wherein the base station apparatus is configured to select a current antenna cluster by determining the antenna cluster that contains a distributed antenna with the highest received first power of the one of the pilot signal or the control signal, by utilizing the antenna cluster information, or by selecting the antenna cluster that contains the distributed antenna that is used in a current communication mode; and
wherein the base station apparatus is configured to communicate in one of a plurality of communication modes that are different in communication speed or throughput, and to select one of the plurality of communication modes based on whether only one terminal participates in the communication or a plurality of terminals participate in the communication simultaneously, and
wherein one or more antennas of the selected antenna cluster and the selected terminal antennas are allocated to a transmitting/receiving antenna;
wherein the base station apparatus is configured to judge the switching of the communication mode by,
when the terminal throughput of the uplink or downlink communication is below the request value or the number of simultaneous connection terminals is above a present threshold, computing a first estimated throughput in one or more other communication modes, and selecting a second communication modes for which the first estimated throughput satisfies a request value and the communication speed or the throughput of the second communication mode is higher than the communication speed or the throughput of the first communication mode, and,
when the terminal throughput of the uplink or downlink communication is greater than the sum of the request value and a certain threshold value or when the number of simultaneous connection terminals is less than a preset threshold, computing a second estimated throughput in the one or more other communication modes and selecting the second communication mode for which the second estimated throughput satisfies the request value and the communication speed or the throughput of the second communication mode is lower than the communication speed or the throughput of the first communication mode;
wherein computing the estimated throughput comprises:
allocating one or more antennas of the selected antenna cluster and of the terminal antennas as one or more transmitting/receiving antennas and allocating the antenna ports of the base station apparatus corresponding to the one or more transmitting/receiving antennas;
creating, by the base station apparatus, an antenna connection pattern representing the correspondence between the predetermined number of the one or more distributed antennas and the plurality of antenna ports in the selected second communication mode and the selected predetermined number of the distributed antennas;
notifying, by the base station apparatus, the antenna switch of the antenna connection pattern;
receiving, by the antenna switch, the antenna connection pattern from the base station apparatus; and
switching, by the antenna switch, the correspondence between the predetermined number of distributed antennas and the plurality of antenna ports in accordance with the designated antenna connection pattern; and
switching the communication mode between the base station apparatus and the terminal in order to continue the communication.

2. The distributed antenna system according to claim 1, wherein the estimated throughput is the result of a capacity computation based on the radio propagation channel information between the antenna of one of the plurality of remote radio units and one of the plurality of terminal antennas.

3. The distributed antenna system according to claim 1, wherein the communication mode switching processing part stores an actual throughput measured in the communication mode selected in a previous communication, and wherein the estimated throughput used in switching the communication modes is the measured throughput.

4. The distributed antenna system according to claim 1, wherein the antenna switch is configured to select an antenna connection pattern that is capable of connecting a send signal of one of the plurality of antenna port in the base station apparatus to all the distributed antennas for transmission over a wide area and of receiving the signal from all the distributed antennas;
wherein the antenna switch is configured to switch the antenna connection pattern by measuring the received power of a signal transmitted by the terminal; and
wherein the antenna having the highest received power is made the transmitting antenna of the base station apparatus and a predetermined number of antennas in descending order of the received power are made the receiving antennas of the base station apparatus.

5. The distributed antenna system according to claim 4, wherein the antenna connection pattern for connecting the antenna of one of the plurality of remote radio units and one of the plurality of antenna ports of the base station apparatus is set in the antenna switch so as to receive the pilot signal or the control signal transmitted from one antenna of one of the plurality of remote radio units at any other antenna than the transmitting antenna; and the base station apparatus is configured to obtain the received power by performing a channel estimation of one of the pilot signal or the control signal and to form the antenna cluster by selecting one or more antennas from among the antennas that receives one of the pilot signal or the control signal in descending order of the received power of the one of the pilot signal or the control signal received at a given one of the receiving antennas.

6. The distributed antenna system according to claim 1, wherein, when the base station apparatus and the terminal switch from a communication with one transmitting antenna of one of the plurality of remote radio units to a Multiple Input Multiple Output (MIMO) communication using a plurality of transmitting/receiving antennas, the antenna cluster corresponding to the one transmitting antenna of the one of the plurality of remote radio units is selected as a antenna candidate for use in the MIMO communication to make the MIMO communication.

7. The distributed antenna system according to claim 1, wherein the communication modes include two or more of Single User-Single Input Single Output (SU-SISO), Multiple User-Single Input Single Output (MU-SISO), Single User-Single Input Multiple Output (SU-SIMO), Multiple User-Single Input Multiple Output (MU-SIMO), Single User-Multiple Input Multiple Output (SU-MIMO), and Multiple User-Multiple Input Multiple Output (MU-MIMO), each of which are combinations of any one of Single Input Single Output (SISO) communication, Single Input Multiple Output (SIMO) communication, or Multiple Input Multiple Output (MIMO) communication, and a Single User mode (SU) in which only one terminal participates in the communication at a certain time or a Multiple User mode (MU) in which a plurality of terminals participate in the communication simultaneously.

8. The distributed antenna system according to claim 1, wherein a result of a maximal-ratio combining of any number of antenna signals equal to or less than the number of antennas that the antenna switch device selects for connection to one of the plurality of antenna ports of the base station apparatus.

9. The distributed antenna system according to claim 1, further comprising an output limiting functional part configured to measure the received power of each antenna and to suppress the output of received powers near a noise level.

10. A base station apparatus in a distributed antenna system that comprises the base station apparatus, a terminal having a plurality of terminal antennas, a plurality of remote radio units dispersed spatially so as to accommodate one or more distributed antennas, and an antenna switch for switching the connection between the one or more distributed antennas and the plurality of antenna ports in the base station apparatus,
wherein the base station apparatus comprises:
a plurality of antenna ports;
a signal processing part configured to collect a terminal throughput for uplink and downlink communications, a number of simultaneous communication terminals, and radio propagation channel information from each of the distributed antennas to each of the terminal antennas;
an antenna selection part configured to select an antenna cluster comprising a first group consisting of a predetermined number of the one or more distributed antennas in descending order of a first received power of one of a pilot signal or a control signal that is received, or
to identify and store antenna cluster information identifying a second group consisting of a predetermined number of the one or more distributed antennas in descending order of a second received power of the one of the pilot signal or the control signal by transmitting or receiving, substantially prior to the selection of the antenna cluster, the one of the pilot signal or the control signal between the distributed antennas, and
to select a current antenna cluster by determining the antenna cluster that contains a distributed antenna with the highest received first power of the one of the pilot signal or the control signal, by utilizing the antenna cluster information, or by selecting the antenna cluster that contains the distributed antenna that is used in a current communication mode; and
a communication mode switching processing part configured to communicate in one of a plurality of communication modes that are different in communication speed or throughput,
wherein the communication mode switching processing part is configured to select one of the plurality of communication modes based on whether only one terminal participates in the communication or a plurality of terminals participate the communication simultaneously, and
wherein one or more antennas of the antenna cluster and the terminal antennas selected by the antenna selection part are allocated to a transmitting/receiving antenna;
wherein the base station apparatus is configured to judge the switching of the communication mode using the communication mode switching processing part by,
when the terminal throughput of the uplink or downlink communication is below the request value or the number of simultaneous connection terminals is above a preset threshold, computing a first estimated throughput in one or more other communication modes and selecting a second communication mode for which the first estimated throughput satisfies a request value and the communication speed or the throughput is higher than the communication speed or the throughput of the first communication mode, and
wherein the terminal throughput of the uplink or downlink communication is greater than the sum of the request value and a certain threshold value or when the number of simultaneous connection terminals is less than a preset threshold, computing a second estimated throughput in the one or more other communication modes and selecting the second communication mode for which the second estimated throughput satisfies the request value and the communication speed or the throughput of the second communication mode is lower than the communication speed or the throughput of the first communication mode;
wherein computing the estimated throughput comprises
allocating one or more antennas of the selected antenna cluster and of the terminal antennas as one or more transmitting/receiving antennas and allocating the antenna ports of the base station apparatus corresponding to the one or more transmitting/receiving antennas;
creating, by the signal processing part, an antenna connection pattern representing the correspondence between the predetermined number of the one or more distributed antennas and the plurality of antenna ports in the second communication mode that is selected by the communication mode switching processing part and the predetermined number of the distributed antenna that are selected by the antenna selection part;
notifying the antenna switch of the antenna connection pattern to the antenna switch;
receiving, by the antenna switch, the antenna connection pattern; and switching, by the antenna switch, the correspondence between the predetermined number of distributed antenna and the plurality of antenna ports in accordance with the designated antenna connection pattern; and switching the communication mode between the base station apparatus and the terminal in order to continue the communication.

11. The base station apparatus according to claim 10, wherein the estimated throughput is the result of a capacity computation based on the radio propagation channel information between the antenna of one of the plurality of remote radio units and one of the plurality of terminal antennas.

12. The base station apparatus according to claim 10, wherein the communication mode switching processing part stores an actual throughput measured in the communication mode selected in a previous communication, and wherein the estimated throughput used in switching the communication modes is the measured throughput.

13. The base station apparatus according to claim 10, wherein the antenna switch is configured to select an antenna connection pattern that is capable of connecting a send signal of one the plurality of antenna ports in the base station apparatus to all the distributed antennas for transmission over a wide area and of receiving the signal from all the distributed antennas;

wherein the antenna switch is configured to switch the antenna connection pattern by measuring the received power of a signal transmitted by the terminal; and wherein the antenna having the highest received power is made the transmitting antenna of the base station apparatus and a predetermined number of antennas in descending order of the received power are made the receiving antennas of the base station apparatus.

14. The base station apparatus according to claim 13, wherein the antenna connection pattern for connecting the antenna of one of the plurality of remote radio units and one of the plurality of antenna ports of the base station apparatus is set in the antenna switch so as to receive the pilot signal or the control signal transmitted from one antenna of one of the plurality of remote radio units at any other antenna than the transmitting antenna; and the base station apparatus is configured to obtain the received power by performing a channel estimation of one of the pilot signal or the control signal and to form the antenna cluster by selecting one or more antennas from among the antennas that receives one of the pilot signal or the control signal in descending order of the received power of one of the pilot signal or the control signal received at a given one of the receiving antennas.

15. The base station apparatus according to claim 10, wherein, when the base station apparatus and the terminal switch from a communication with one transmitting antenna of one of the plurality of remote radio units to a Multiple Input Multiple Output (MIMO) communication using a plurality of transmitting/receiving antennas, the antenna cluster corresponding to the one transmitting antenna of the one of the plurality of remote radio units is selected as a antenna candidate for use in the MIMO communication to make the MIMO communication.

16. The base station apparatus according to claim 10, wherein the communication modes include two or more of Single User-Single Input Single Output (SU-SISO), Multiple User-Single Input Single Output (MU-SISO), Single User-Single Input Multiple Output (SU-SIMO), Multiple User-Single Input Multiple Output (MU-SIMO), Single User-Multiple Input Multiple Out SU-MIMO), and Multiple User-Multiple Input Multiple Output (MU-MIMO), each of which are combinations of any one of Single Input Single Output (SISO) communication, Single Input Multiple Output (SIMO) communication, or Multiple Input Multiple Output (MIMO) communication, and a Single User mode (SU) in which only one terminal participates in the communication at a certain time or a Multiple User mode (MU) in which a plurality of terminals participate in the communication simultaneously.

17. The base station apparatus according to claim 10, wherein a result of a maximal-ratio combining of any number of antenna signals is equal to or less than the number of antennas that the antenna switch device selects for connection to one of the plurality of antenna ports of the base station apparatus.

18. The base station apparatus according to claim 10, further comprising an output limiting functional part configured to measure the received power of each antenna and to suppress the output of received powers near a noise level.

19. An antenna switch device in a distributed antenna system comprising:

a base station apparatus having a plurality of antenna ports;

a terminal having a plurality of terminal antennas; and a plurality of remote radio units dispersed spatially so as to accommodate one or more distributed antennas, wherein the antenna switch device is configured to switch the connection between the plurality of remote radio units and the base station apparatus, and wherein the antenna switch device comprises:

a control part configured to receive an antenna connection pattern from the base station apparatus, wherein the antenna connection pattern represents the correspondence between a predetermined number of distributed antennas and the plurality of antenna ports in a second communication mode and the predetermined number of distributed antennas that are selected in order to switch a first communication mode to the second communication mode during communication in one of the plurality of communication modes that are different in communication speed or throughput, wherein the base station, apparatus is configured to select the communication mode based on whether only one terminal participates in the communication or a plurality of terminals participates in the communication simultaneously, and wherein one or more antennas of the selected antenna cluster and the selected terminal antennas are allocated to a transmitting/receiving antenna; and a reception switch combine processing part and a send switch part configured to switch the correspondence between the predetermined number of the one or more distributed antennas and the plurality of antenna ports for an uplink communication and a downlink communication that are under the control of the control part in accordance with the designated antenna connection pattern;

wherein the antenna switch device is configured to switch the communication mode both of the base station apparatus and of the terminal by switching the connection between the one or more distributed antennas and the plurality of antenna ports of the base station apparatus in order to continue the communication.

20. The antenna switch device according to claim 19, wherein the antenna switch is configured to select an antenna connection pattern that is capable of connecting a send signal of one of the plurality antenna port in the base station apparatus to all the distributed antennas for transmission over a wide area and of receiving the signal from all the distributed antennas;
- wherein the antenna switch is configured to switch the antenna connection pattern by measuring the received power of a signal transmitted by the terminal; and
- wherein the antenna having the highest received power is made the transmitting antenna of the base station apparatus and a predetermined number of antennas in descending order of the received power are made the receiving antennas of the base station apparatus.

21. The antenna switch device according to claim 20, wherein the antenna connection pattern for connecting the antenna of one of the plurality of remote radio units and one of the plurality of antenna ports of the base station apparatus is set in the antenna switch so as to receive the pilot signal or the control signal transmitted from one antenna of one of the plurality of remote radio units at any other antenna than the transmitting antenna; and
- the base station apparatus is configured to obtain the received power by performing a channel estimation of one of the pilot signal or the control signal and forms the antenna cluster by selecting one or more antennas from among the antennas that receives one of the pilot signal or the control signal in descending order of the received power of the one of the pilot signal or the control signal received at a given one of the receiving antennas.

22. The antenna switch device according to claim 19, wherein, when the base station apparatus and the terminal switch from a communication with one transmitting antenna of one of the plurality of remote radio units to a Multiple Input Multiple Output (MIMO) communication using a plurality of transmitting/receiving antennas, the antenna cluster corresponding to the one transmitting antenna of the one of the plurality of remote radio units is selected as a antenna candidate for use in the MIMO communication to make the MIMO communication.

23. The antenna switch device according to claim 19, wherein the communication modes include two or more of Single User-Single Input Single Output (SU-SISO), Multiple User-Single Input Single Output (MU-SISO), Single User-Single Input Multiple Output (SU-SIMO), Multiple User-Single Input Multiple Output (MU-SIMO), Single User-Multiple Input Multiple Output (SU-MIMO) and Multiple User-Multiple Input Multiple Output (MU-MIMO), each of which are combinations of any one of Single Input Single Output (SISO) communication, Single Input Multiple Output (SIMO) communication, or Multiple Input Multiple Output (MIMO) communication, and a Single User mode (SU) in which only one terminal participates in the communication at a certain time or a Multiple User mode (MU) in which a plurality of terminals participate in the communication simultaneously.

24. The antenna switch device according to claim 19, wherein a result of a maximal-ratio combining of any number of antenna signals is equal to or less than the number of antennas that the antenna switch device selects for connection to one of the plurality of antenna ports of the base station apparatus.

25. The antenna switch device according to claim 19, further comprising an output limiting functional part configured to measure the received power of each antenna and to suppress the output of received powers near a noise level.

26. A distributed antenna switching method in a distributed antenna system comprising a base station apparatus having a plurality of antenna ports, a terminal having a plurality of terminal antennas, a plurality of remote radio units dispersed spatially so as to accommodate one or more distributed antennas, and an antenna switch for switching the connection between the one or more distributed antennas and the plurality of antenna ports in the base station apparatus, the method comprising
- collecting, by the base station apparatus, a terminal throughput for uplink and downlink communications, a number of simultaneous communication terminals, and radio propagation channel information from each of the distributed antennas to each of the terminal antennas;
- receiving, by each of the one or more distributed antennas, one of a pilot signal or a control signal from the terminal;
- selecting, by the base station a apparatus an antenna cluster comprising a first group consisting of a predetermined number of the one or more distributed antennas in descending order of a first received power of the one of the pilot signal or the control, or
- identifying and storing, by the base station apparatus, antenna cluster information that identifies a second group consisting of a predetermined number of the one or more distributed antennas in descending order of a second received power of the one of the pilot signal or the control signal by transmitting or receiving, substantially prior to the selection of the antenna cluster, the one of the pilot signal or the control signal between the distributed antennas, and
- selecting, by the base station apparatus, a current antenna cluster by determining the antenna cluster that contains a distributed antenna with the highest received first power of the one of the pilot signal or the control signal, by utilizing the antenna cluster information, or by selecting the antenna cluster that contains the distributed antenna that is used in a current communication mode; and
- communicating, by the base station apparatus, in one of a plurality of communication modes that are different in communication speed or throughput,
- wherein the base station apparatus selects one of the plurality of communication modes based on whether only one terminal participates in the communication or a plurality of terminals participate in the communication simultaneously, and
- wherein one or more antennas of the selected antenna cluster and the selected terminal antennas are allocated to a transmitting/receiving antenna;
- wherein the base station apparatus judges the switching of the communication mode by,
- when the terminal throughput of the uplink or downlink communication is below the request value or number of simultaneous connection terminals is above a preset threshold, computing a first estimated throughput in one or more other communication modes and selecting a second communication mode for which the first estimated throughput satisfies a request value and the communication speed or the throughput of the second communication mode is higher than the communication speed or the throughput of the first communication mode, and
- when the terminal throughput of uplink or downlink communication is greater than the sum of the request value and a certain threshold value or when the number of simultaneous connection terminals is less than a preset threshold, computing a second estimated throughput in the one or more other communication modes and selecting the second communication mode for which the second estimated throughput satisfies the request value and the communication speed or the throughput of the second communication mode is lower than the communication speed or the throughput of the first communication mode;

wherein computing the estimated throughput comprises allocating one or more antennas of the selected antenna cluster and of the terminal antennas as one or more transmitting/receiving antennas and allocating the antenna ports of the base station apparatus corresponding to one or more transmitting/receiving antennas;

creating, by the base station apparatus, an antenna connection pattern representing the correspondence between the predetermined number of the one or more distributed antennas and the plurality of antenna ports in the selected second communication mode and the selected predetermined number of the distributed antennas;

notifying, by the base station apparatus, the antenna switch of the antenna connection pattern;

receiving, by the antenna switch, the antenna connection pattern from the base station apparatus; and switching, by the antenna switch, the correspondence between the predetermined number of distributed antennas and the plurality of antenna ports in accordance with the designated antenna connection pattern and switching the communication mode between the base station apparatus and the terminal in order to continue the communication.

* * * * *